(12) United States Patent
Wong et al.

(10) Patent No.: US 11,698,721 B2
(45) Date of Patent: Jul. 11, 2023

(54) MANAGING AN IMMERSIVE INTERFACE IN A MULTI-APPLICATION IMMERSIVE ENVIRONMENT

(71) Applicant: Microsoft Technology Licensing, LLC, Redmond, WA (US)

(72) Inventors: Tsz Yan Wong, Seattle, WA (US); Jesse Clay Satterfield, Seattle, WA (US); Nils A. Sundelin, Duvall, WA (US); Bret P. Anderson, Kirkland, WA (US); Patrice L. Miner, Kirkland, WA (US); Chaitanya Dev Sareen, Seattle, WA (US); Robert J. Jarrett, Snohomish, WA (US); Jennifer Nan, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 196 days.

(21) Appl. No.: 15/341,840

(22) Filed: Nov. 2, 2016

(65) Prior Publication Data
US 2017/0068428 A1 Mar. 9, 2017

Related U.S. Application Data

(63) Continuation of application No. 13/657,621, filed on Oct. 22, 2012, now Pat. No. 9,535,597, which is a
(Continued)

(51) Int. Cl.
*G06F 3/04886* (2022.01)
*G06F 3/04845* (2022.01)
*G06F 3/0481* (2022.01)
*G06F 3/04883* (2022.01)
*G06F 3/0488* (2022.01)

(52) U.S. Cl.
CPC ........ *G06F 3/04845* (2013.01); *G06F 3/0481* (2013.01); *G06F 3/0488* (2013.01); *G06F 3/04883* (2013.01); *G06F 3/04886* (2013.01)

(58) Field of Classification Search
CPC .. G06F 3/04845; G06F 3/0481; G06F 3/0488; G06F 3/04883; G06F 3/04886
See application file for complete search history.

(56) References Cited

U.S. PATENT DOCUMENTS

| 4,686,332 A | 8/1987 | Greanias et al. |
| 4,823,283 A | 4/1989 | Diehm et al. |

(Continued)

FOREIGN PATENT DOCUMENTS

| CN | 1129889 | 8/1996 |
| CN | 1326564 | 12/2001 |

(Continued)

OTHER PUBLICATIONS

"Corrected Notice of Allowance", U.S. Appl. No. 14/918,358, filed Oct. 4, 2017, 2 pages.
(Continued)

*Primary Examiner* — Dino Kujundzic

(57) ABSTRACT

This document describes techniques and apparatuses for managing an immersive interface in a multi-application immersive environment. In some embodiments, these techniques and apparatuses enable a user to alter sizes and/or a layout of multiple immersive interfaces with as little as one selection.

20 Claims, 25 Drawing Sheets

Related U.S. Application Data continuation of application No. 13/118,333, filed on May 27, 2011, now Pat. No. 9,158,445, which is a continuation of application No. 13/118,321, filed on May 27, 2011, now abandoned.

(56) References Cited

U.S. PATENT DOCUMENTS

| | | |
|---|---|---|
| 4,843,538 A | 6/1989 | Lane et al. |
| 5,045,997 A | 9/1991 | Watanabe |
| 5,046,001 A | 9/1991 | Barker et al. |
| 5,189,732 A | 2/1993 | Kondo |
| 5,231,578 A | 7/1993 | Levin et al. |
| 5,237,647 A | 8/1993 | Roberts et al. |
| 5,258,748 A | 11/1993 | Jones |
| 5,297,032 A | 3/1994 | Trojan et al. |
| 5,305,435 A | 4/1994 | Bronson |
| 5,321,750 A | 6/1994 | Nadan |
| 5,339,392 A | 8/1994 | Risberg et al. |
| 5,351,995 A | 10/1994 | Booker et al. |
| 5,406,307 A | 4/1995 | Hirayama et al. |
| 5,432,932 A | 7/1995 | Chen et al. |
| 5,463,725 A | 10/1995 | Henckel et al. |
| 5,485,197 A | 1/1996 | Hoarty |
| 5,487,143 A | 1/1996 | Southgate |
| 5,490,241 A | 2/1996 | Mallgren et al. |
| 5,491,783 A | 2/1996 | Douglas et al. |
| 5,495,566 A | 2/1996 | Kwatinetz |
| 5,497,776 A | 3/1996 | Yamazaki et al. |
| 5,506,951 A | 4/1996 | Ishikawa |
| 5,510,808 A | 4/1996 | Cina, Jr. et al. |
| 5,511,148 A | 4/1996 | Wellner |
| 5,515,495 A | 5/1996 | Ikemoto |
| 5,555,369 A | 9/1996 | Menendez et al. |
| 5,568,604 A | 10/1996 | Hansen |
| 5,574,836 A | 11/1996 | Broemmelsiek |
| 5,586,244 A | 12/1996 | Berry et al. |
| 5,596,697 A | 1/1997 | Foster et al. |
| 5,598,523 A | 1/1997 | Fujita |
| 5,603,053 A | 2/1997 | Gough et al. |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,659,693 A | 8/1997 | Hansen |
| 5,661,773 A | 8/1997 | Swerdloff et al. |
| 5,664,128 A | 9/1997 | Bauer |
| 5,675,329 A | 10/1997 | Barker |
| 5,680,562 A | 10/1997 | Conrad et al. |
| 5,687,331 A | 11/1997 | Volk et al. |
| 5,694,150 A | 12/1997 | Sigona et al. |
| 5,712,995 A | 1/1998 | Cohn |
| 5,731,813 A | 3/1998 | O'Rourke et al. |
| 5,740,389 A | 4/1998 | Li et al. |
| 5,761,485 A | 6/1998 | Munyan |
| 5,771,042 A | 6/1998 | Santos-Gomez |
| 5,793,415 A | 8/1998 | Gregory et al. |
| 5,817,019 A | 10/1998 | Kawashima |
| 5,819,284 A | 10/1998 | Farber et al. |
| 5,821,930 A | 10/1998 | Hansen |
| 5,838,889 A | 11/1998 | Booker et al. |
| 5,844,547 A | 12/1998 | Minakuchi et al. |
| 5,847,706 A | 12/1998 | Kingsley |
| 5,859,636 A | 1/1999 | Pandit |
| 5,860,073 A | 1/1999 | Ferrel et al. |
| 5,867,799 A | 2/1999 | Lang et al. |
| 5,880,725 A | 3/1999 | Southgate |
| 5,889,517 A | 3/1999 | Ueda et al. |
| 5,898,434 A | 4/1999 | Small et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 5,969,720 A | 10/1999 | Lisle et al. |
| 6,008,809 A | 12/1999 | Brooks |
| 6,008,816 A | 12/1999 | Eisler |
| 6,009,519 A | 12/1999 | Jones et al. |
| 6,011,542 A | 1/2000 | Durrani et al. |
| 6,016,145 A | 1/2000 | Horvitz et al. |
| 6,028,600 A | 2/2000 | Rosin et al. |
| 6,037,937 A | 3/2000 | Beaton et al. |
| 6,057,839 A | 5/2000 | Advani et al. |
| 6,061,061 A | 5/2000 | Conrad et al. |
| 6,064,383 A | 5/2000 | Skelly |
| 6,072,476 A | 6/2000 | Harada et al. |
| 6,097,392 A | 8/2000 | Leyerle |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,115,724 A | 9/2000 | Booker et al. |
| 6,163,317 A | 12/2000 | de Judicibus |
| 6,163,749 A | 12/2000 | McDonough et al. |
| 6,166,736 A | 12/2000 | Hugh |
| 6,167,439 A | 12/2000 | Levine et al. |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,219,032 B1 | 4/2001 | Rosenberg et al. |
| 6,239,798 B1 | 5/2001 | Ludolph et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,292,179 B1 | 9/2001 | Lee |
| 6,310,610 B1 | 10/2001 | Beaton et al. |
| 6,311,058 B1 | 10/2001 | Wecker et al. |
| 6,313,854 B1 | 11/2001 | Gibson |
| 6,340,979 B1 | 1/2002 | Beaton et al. |
| 6,346,935 B1 | 2/2002 | Nakajima et al. |
| 6,369,837 B1 | 4/2002 | Schirmer |
| 6,385,630 B1 | 5/2002 | Ejerhed |
| 6,389,386 B1 | 5/2002 | Hetherington et al. |
| 6,396,963 B2 | 5/2002 | Shaffer |
| 6,411,307 B1 | 6/2002 | Rosin et al. |
| 6,414,698 B1 | 7/2002 | Lovell et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,493,002 B1 | 12/2002 | Christensen |
| 6,505,243 B1 | 1/2003 | Lortz |
| 6,507,352 B1 | 1/2003 | Cohen et al. |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,525,749 B1 | 2/2003 | Moran et al. |
| 6,538,635 B1 | 3/2003 | Ringot |
| 6,542,868 B1 | 4/2003 | Badt |
| 6,545,669 B1 | 4/2003 | Kinawi et al. |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,658,147 B2 | 12/2003 | Gorbatov et al. |
| 6,661,436 B2 | 12/2003 | Barksdale et al. |
| 6,662,023 B1 | 12/2003 | Helle |
| 6,675,387 B1 | 1/2004 | Boucher et al. |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,727,892 B1 | 4/2004 | Murphy |

(56) References Cited

U.S. PATENT DOCUMENTS

| | | |
|---|---|---|
| 6,738,084 B1 | 5/2004 | Kelley et al. |
| 6,750,872 B1 | 6/2004 | Hong et al. |
| 6,784,925 B1 | 8/2004 | Tomat et al. |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,839,763 B1 | 1/2005 | Kamvysselis et al. |
| 6,857,104 B1 | 2/2005 | Cahn |
| 6,859,909 B1 | 2/2005 | Lerner et al. |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,920,619 B1 | 7/2005 | Milekic |
| 6,938,101 B2 | 8/2005 | Hayes et al. |
| 6,961,731 B2 | 11/2005 | Holbrook |
| 6,971,067 B1 | 11/2005 | Karson et al. |
| 6,972,776 B2 | 12/2005 | Davis et al. |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,276 B1 * | 5/2006 | Mogilevsky .......... G06F 40/106 715/209 |
| 7,051,291 B2 | 5/2006 | Sciammarella et al. |
| 7,058,955 B2 | 6/2006 | Porkka |
| 7,061,545 B1 * | 6/2006 | Kweon .............. H04N 5/44543 348/569 |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,180,527 B2 | 2/2007 | Sakai et al. |
| 7,181,699 B2 | 2/2007 | Morrow et al. |
| 7,194,506 B1 | 3/2007 | White et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,250,955 B1 | 7/2007 | Beeman et al. |
| 7,251,782 B1 | 7/2007 | Albers |
| 7,257,200 B2 | 8/2007 | Valeriano |
| 7,262,775 B2 | 8/2007 | Calkins et al. |
| 7,263,668 B1 | 8/2007 | Lentz |
| 7,277,924 B1 | 10/2007 | Wichmann et al. |
| 7,280,097 B2 | 10/2007 | Chen |
| 7,283,620 B2 | 10/2007 | Adamczyk |
| 7,289,806 B2 | 10/2007 | Morris et al. |
| 7,293,244 B2 | 11/2007 | Randall |
| 7,296,184 B2 | 11/2007 | Derks et al. |
| 7,296,242 B2 | 11/2007 | Agata et al. |
| 7,304,638 B2 | 12/2007 | Murphy |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,348,965 B2 | 3/2008 | Itoh |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,404,147 B2 | 7/2008 | Bell et al. |
| 7,408,538 B2 | 8/2008 | Hinckley et al. |
| 7,409,646 B2 | 8/2008 | Vedbrat et al. |
| 7,412,663 B2 | 8/2008 | Lindsay et al. |
| 7,424,686 B2 | 9/2008 | Beam et al. |
| 7,433,920 B2 | 10/2008 | Blagsvedt et al. |
| 7,437,678 B2 | 10/2008 | Awada et al. |
| 7,447,520 B2 | 11/2008 | Scott |
| 7,454,717 B2 | 11/2008 | Hinckley et al. |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs et al. |
| 7,480,870 B2 | 1/2009 | Anzures |
| 7,483,418 B2 | 1/2009 | Maurer |
| 7,484,182 B1 | 1/2009 | Smith |
| 7,487,467 B1 | 2/2009 | Kawahara et al. |
| 7,496,830 B2 | 2/2009 | Rubin |
| 7,500,175 B2 | 3/2009 | Colle et al. |
| 7,506,269 B2 | 3/2009 | Lang |
| 7,512,966 B2 | 3/2009 | Lyons, Jr. et al. |
| 7,532,196 B2 | 5/2009 | Hinckley |
| 7,549,131 B2 | 6/2009 | Lengeling et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,636,071 B2 | 12/2009 | O'Gorman |
| 7,640,518 B2 | 12/2009 | Forlines et al. |
| 7,653,883 B2 | 1/2010 | Hotelling et al. |
| 7,656,393 B2 | 2/2010 | King et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,669,140 B2 | 2/2010 | Matthews et al. |
| 7,671,756 B2 | 3/2010 | Herz et al. |
| 7,676,767 B2 | 3/2010 | Hofmeister et al. |
| 7,689,916 B1 | 3/2010 | Goel et al. |
| 7,694,221 B2 | 4/2010 | Fortes |
| 7,702,683 B1 | 4/2010 | Kirshenbaum |
| 7,755,674 B2 | 7/2010 | Kaminaga |
| 7,760,187 B2 | 7/2010 | Kennedy |
| 7,774,366 B2 | 8/2010 | Fisher et al. |
| 7,792,925 B1 | 9/2010 | Werner et al. |
| 7,821,780 B2 | 10/2010 | Choy |
| 7,834,861 B2 | 11/2010 | Lee |
| 7,844,915 B2 | 11/2010 | Platzer et al. |
| D631,043 S | 1/2011 | Kell |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,890,882 B1 | 2/2011 | Nelson |
| 7,895,309 B2 | 2/2011 | Belali et al. |
| 7,898,529 B2 | 3/2011 | Fitzmaurice et al. |
| 7,903,115 B2 | 3/2011 | Platzer et al. |
| 7,904,832 B2 | 3/2011 | Ubillos |
| 7,924,271 B2 | 4/2011 | Christie et al. |
| 7,933,632 B2 | 4/2011 | Flynt et al. |
| 7,949,954 B1 * | 5/2011 | Jezek, Jr. ................ G06F 3/048 715/800 |
| 7,956,847 B2 | 6/2011 | Christie |

(56) References Cited

U.S. PATENT DOCUMENTS

| | | |
|---|---|---|
| 7,962,281 B2 | 6/2011 | Rasmussen et al. |
| 7,983,718 B1 | 7/2011 | Roka |
| 7,987,431 B2 | 7/2011 | Santoro et al. |
| 7,996,045 B1 | 8/2011 | Bauer et al. |
| 8,006,276 B2 | 8/2011 | Nakagawa et al. |
| 8,028,239 B1 | 9/2011 | Al-Hilali et al. |
| 8,065,629 B1 | 11/2011 | Ragan |
| 8,086,275 B2 | 12/2011 | Wykes |
| 8,102,858 B1 | 1/2012 | Rahim et al. |
| 8,108,781 B2 | 1/2012 | Laansoo et al. |
| 8,126,865 B1 | 2/2012 | Bharat et al. |
| 8,131,808 B2 | 3/2012 | Aoki et al. |
| 8,134,727 B1 | 3/2012 | Shmunis et al. |
| 8,150,924 B2 | 4/2012 | Buchheit et al. |
| 8,171,431 B2 | 5/2012 | Grossman et al. |
| 8,175,653 B2 | 5/2012 | Smuga |
| 8,176,436 B2 | 5/2012 | Arend et al. |
| 8,176,438 B2 | 5/2012 | Zaman et al. |
| 8,209,623 B2 | 6/2012 | Barletta et al. |
| 8,212,788 B2 | 7/2012 | Lam |
| 8,225,193 B1 | 7/2012 | Kleinschnitz et al. |
| 8,238,876 B2 | 8/2012 | Teng |
| 8,239,785 B2 | 8/2012 | Hinckley |
| 8,245,152 B2 | 8/2012 | Brunner et al. |
| 8,245,156 B2 | 8/2012 | Mouilleseaux et al. |
| 8,250,494 B2 | 8/2012 | Butcher |
| 8,255,473 B2 | 8/2012 | Eren et al. |
| 8,255,812 B1 | 8/2012 | Parparita et al. |
| 8,261,213 B2 | 9/2012 | Hinckley |
| 8,266,550 B1 | 9/2012 | Cleron et al. |
| 8,269,736 B2 | 9/2012 | Wilairat |
| 8,279,241 B2 | 10/2012 | Fong |
| 8,290,926 B2 | 10/2012 | Ozzie et al. |
| 8,294,669 B2 | 10/2012 | Partridge et al. |
| 8,307,279 B1 | 11/2012 | Fioravanti et al. |
| 8,327,295 B2 | 12/2012 | Ikeda et al. |
| 8,334,871 B2 | 12/2012 | Hamilton et al. |
| 8,384,726 B1 | 2/2013 | Grabowski et al. |
| 8,429,565 B2 | 4/2013 | Agarawala et al. |
| 8,434,019 B2 | 4/2013 | Nelson |
| 8,448,083 B1 | 5/2013 | Migos et al. |
| 8,473,870 B2 | 6/2013 | Hinckley et al. |
| 8,473,871 B1 | 6/2013 | Sandler et al. |
| 8,493,510 B2 | 7/2013 | Bryan et al. |
| 8,519,860 B2 | 8/2013 | Johnson et al. |
| 8,525,808 B1 | 9/2013 | Buening |
| 8,539,384 B2 | 9/2013 | Hinckley et al. |
| 8,548,431 B2 | 10/2013 | Teng et al. |
| 8,549,432 B2 | 10/2013 | Warner |
| 8,560,959 B2 | 10/2013 | Zaman et al. |
| 8,589,815 B2 | 11/2013 | Fong et al. |
| 8,595,642 B1 | 11/2013 | Lagassey |
| 8,612,874 B2 | 12/2013 | Zaman et al. |
| 8,627,227 B2 | 1/2014 | Matthews et al. |
| 8,627,228 B2 | 1/2014 | Yosef et al. |
| 8,665,272 B2 | 3/2014 | Fitzmaurice et al. |
| 8,669,950 B2 | 3/2014 | Forstall et al. |
| 8,687,023 B2 | 4/2014 | Markiewicz et al. |
| 8,689,123 B2 | 4/2014 | Zaman et al. |
| 8,698,845 B2 | 4/2014 | Lemay |
| 8,706,515 B2 | 4/2014 | Cobbs et al. |
| 8,713,463 B2 | 4/2014 | Kim et al. |
| 8,726,190 B2 | 5/2014 | Clark et al. |
| 8,769,427 B2 | 7/2014 | Raman et al. |
| 8,769,431 B1 | 7/2014 | Prasad |
| 8,826,181 B2 | 9/2014 | Mouilleseaux et al. |
| 8,830,270 B2 | 9/2014 | Zaman et al. |
| 8,836,648 B2 | 9/2014 | Wilairat |
| 8,893,033 B2 | 11/2014 | Donahue et al. |
| 8,910,081 B2 | 12/2014 | Fennel |
| 8,922,575 B2 | 12/2014 | Garside et al. |
| 8,924,885 B2 | 12/2014 | LeVee et al. |
| 8,933,952 B2 | 1/2015 | Zaman et al. |
| 8,935,631 B2 | 1/2015 | Leonard et al. |
| 8,990,733 B2 | 3/2015 | Deutsch et al. |
| 8,994,697 B2 | 3/2015 | Lin et al. |
| 9,015,606 B2 | 4/2015 | Zaman et al. |
| 9,052,820 B2 | 6/2015 | Jarrett et al. |
| 9,092,132 B2 | 7/2015 | Migos et al. |
| 9,098,186 B1 | 8/2015 | Worley et al. |
| 9,104,307 B2 | 8/2015 | Jarrett et al. |
| 9,104,440 B2 | 8/2015 | Jarrett et al. |
| 9,141,262 B2 | 9/2015 | Nan et al. |
| 9,146,670 B2 | 9/2015 | Zaman et al. |
| 9,158,445 B2 | 10/2015 | Wong et al. |
| 9,213,468 B2 | 12/2015 | Zaman et al. |
| 9,229,918 B2 | 1/2016 | Zaman et al. |
| 9,244,802 B2 | 1/2016 | Yalovsky et al. |
| 9,329,774 B2 | 5/2016 | Sareen et al. |
| 9,383,917 B2 | 7/2016 | Mouton et al. |
| 9,418,464 B2 | 8/2016 | Fong et al. |
| 9,423,951 B2 | 8/2016 | Deutsch et al. |
| 9,430,130 B2 | 8/2016 | Mathews et al. |
| 9,535,597 B2 | 1/2017 | Wong et al. |
| 9,557,909 B2 | 1/2017 | Elliott et al. |
| 9,658,766 B2 | 5/2017 | Nan et al. |
| 9,665,384 B2 | 5/2017 | Zielinski et al. |
| 9,696,888 B2 | 7/2017 | Deutsch et al. |
| 9,760,242 B2 | 9/2017 | Nan et al. |
| 9,766,790 B2 | 9/2017 | Zaman et al. |
| 9,864,494 B2 | 1/2018 | Zaman et al. |
| 9,870,132 B2 | 1/2018 | Zaman et al. |
| 9,996,250 B2 * | 6/2018 | Hata ............... G06F 3/0488 |
| 2001/0012000 A1 | 8/2001 | Eberhard |
| 2001/0022621 A1 | 9/2001 | Squibbs |
| 2001/0033296 A1 * | 10/2001 | Fullerton ......... G06F 17/30017 |
| | | 715/730 |
| 2001/0047263 A1 | 11/2001 | Smith et al. |
| 2002/0000963 A1 | 1/2002 | Yoshida et al. |
| 2002/0018051 A1 | 2/2002 | Singh |
| 2002/0026524 A1 | 2/2002 | Dharap |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0083025 A1 | 6/2002 | Robarts et al. |
| 2002/0091755 A1 | 7/2002 | Narin |
| 2002/0097229 A1 | 7/2002 | Rose et al. |
| 2002/0097264 A1 | 7/2002 | Dutta et al. |
| 2002/0101457 A1 | 8/2002 | Lang |
| 2002/0105531 A1 | 8/2002 | Niemi |
| 2002/0105553 A1 | 8/2002 | Segre |
| 2002/0115476 A1 | 8/2002 | Padawer et al. |
| 2002/0116421 A1 | 8/2002 | Fox et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0149622 A1 | 10/2002 | Uesaki et al. |
| 2002/0152305 A1 | 10/2002 | Jackson et al. |
| 2002/0154176 A1 | 10/2002 | Barksdale et al. |
| 2002/0158838 A1 | 10/2002 | Smith et al. |
| 2002/0159632 A1 | 10/2002 | Chui et al. |
| 2002/0161634 A1 | 10/2002 | Kaars |
| 2002/0165923 A1 | 11/2002 | Prince |
| 2002/0186251 A1 | 12/2002 | Himmel et al. |
| 2002/0191028 A1 | 12/2002 | Senechalle et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0020671 A1 | 1/2003 | Santoro et al. |
| 2003/0040300 A1 | 2/2003 | Bodie |
| 2003/0046396 A1 | 3/2003 | Richter et al. |
| 2003/0052900 A1 | 3/2003 | Card et al. |
| 2003/0073414 A1 | 4/2003 | Capps |
| 2003/0096604 A1 | 5/2003 | Vollandt |
| 2003/0098858 A1 | 5/2003 | Perski et al. |
| 2003/0105827 A1 | 6/2003 | Tan et al. |
| 2003/0107604 A1 * | 6/2003 | Ording ............... G06F 3/0486 |
| | | 715/788 |
| 2003/0135582 A1 | 7/2003 | Allen et al. |

(56) References Cited

U.S. PATENT DOCUMENTS

| | | |
|---|---|---|
| 2003/0179541 A1 | 9/2003 | Sullivan |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0231219 A1 | 12/2003 | Leung |
| 2003/0231327 A1 | 12/2003 | Ashey et al. |
| 2004/0066414 A1 | 4/2004 | Czerwinski et al. |
| 2004/0066418 A1 | 4/2004 | Tosey |
| 2004/0068543 A1 | 4/2004 | Seifert |
| 2004/0078299 A1 | 4/2004 | Down-Logan |
| 2004/0095395 A1 | 5/2004 | Kurtenbach |
| 2004/0111673 A1 | 6/2004 | Bowman et al. |
| 2004/0128359 A1 | 7/2004 | Horvitz et al. |
| 2004/0155908 A1 | 8/2004 | Wagner |
| 2004/0174396 A1 | 9/2004 | Jobs et al. |
| 2004/0185883 A1 | 9/2004 | Rukman |
| 2004/0189707 A1 | 9/2004 | Moore et al. |
| 2004/0212586 A1 | 10/2004 | Denny |
| 2004/0212605 A1 | 10/2004 | Fitzmaurice et al. |
| 2004/0212617 A1 | 10/2004 | Fitzmaurice et al. |
| 2004/0217954 A1 | 11/2004 | O'Gorman et al. |
| 2004/0217980 A1 | 11/2004 | Radburn et al. |
| 2004/0236774 A1 | 11/2004 | Baird et al. |
| 2004/0237048 A1 | 11/2004 | Tojo et al. |
| 2004/0250217 A1 | 12/2004 | Tojo et al. |
| 2004/0255254 A1 | 12/2004 | Weingart et al. |
| 2004/0266491 A1 | 12/2004 | Howard et al. |
| 2005/0005241 A1 | 1/2005 | Hunleth et al. |
| 2005/0012723 A1 | 1/2005 | Pallakoff |
| 2005/0028208 A1 | 2/2005 | Ellis |
| 2005/0044058 A1 | 2/2005 | Matthews et al. |
| 2005/0050462 A1 | 3/2005 | Whittle et al. |
| 2005/0054384 A1 | 3/2005 | Pasquale et al. |
| 2005/0058353 A1 | 3/2005 | Matsubara |
| 2005/0060647 A1 | 3/2005 | Doan et al. |
| 2005/0060658 A1 | 3/2005 | Tsukiori |
| 2005/0060663 A1 | 3/2005 | Arkeketa et al. |
| 2005/0060665 A1 | 3/2005 | Rekimoto |
| 2005/0079896 A1 | 4/2005 | Kokko et al. |
| 2005/0081155 A1 | 4/2005 | Martin et al. |
| 2005/0085215 A1 | 4/2005 | Kokko |
| 2005/0085272 A1 | 4/2005 | Anderson et al. |
| 2005/0091612 A1 | 4/2005 | Stabb et al. |
| 2005/0093868 A1 | 5/2005 | Hinckley |
| 2005/0101864 A1 | 5/2005 | Zheng et al. |
| 2005/0108655 A1 | 5/2005 | Andrea et al. |
| 2005/0114778 A1 | 5/2005 | Branson et al. |
| 2005/0114788 A1 | 5/2005 | Fabritius |
| 2005/0120306 A1 | 6/2005 | Klassen et al. |
| 2005/0125736 A1 | 6/2005 | Ferri et al. |
| 2005/0125739 A1 | 6/2005 | Thompson et al. |
| 2005/0129314 A1 | 6/2005 | Chen |
| 2005/0136953 A1 | 6/2005 | Jo |
| 2005/0143138 A1 | 6/2005 | Lee et al. |
| 2005/0149879 A1 | 7/2005 | Jobs et al. |
| 2005/0156947 A1 | 7/2005 | Sakai et al. |
| 2005/0182798 A1 | 8/2005 | Todd et al. |
| 2005/0183021 A1 | 8/2005 | Allen et al. |
| 2005/0183030 A1* | 8/2005 | Bertram .............. G06F 3/0483 715/800 |
| 2005/0184973 A1 | 8/2005 | Lum et al. |
| 2005/0184999 A1 | 8/2005 | Daioku |
| 2005/0188406 A1 | 8/2005 | Gielow et al. |
| 2005/0198159 A1 | 9/2005 | Kirsch |
| 2005/0198584 A1 | 9/2005 | Matthews et al. |
| 2005/0198586 A1 | 9/2005 | Sekiguchi et al. |
| 2005/0198592 A1 | 9/2005 | Keely, Jr. et al. |
| 2005/0200762 A1 | 9/2005 | Barletta et al. |
| 2005/0207734 A1 | 9/2005 | Howell et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0235220 A1* | 10/2005 | Duperrouzel ..... G06F 17/30899 715/788 |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0001650 A1 | 1/2006 | Robbins et al. |
| 2006/0004685 A1 | 1/2006 | Pyhalammi et al. |
| 2006/0010371 A1 | 1/2006 | Shur et al. |
| 2006/0010394 A1 | 1/2006 | Chaudhri et al. |
| 2006/0012580 A1 | 1/2006 | Perski et al. |
| 2006/0015562 A1 | 1/2006 | Kilian-Kehr et al. |
| 2006/0015736 A1 | 1/2006 | Callas et al. |
| 2006/0015812 A1 | 1/2006 | Cunningham |
| 2006/0015820 A1 | 1/2006 | Wood |
| 2006/0022955 A1 | 2/2006 | Kennedy |
| 2006/0026013 A1 | 2/2006 | Kraft |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031786 A1 | 2/2006 | Hillis et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0055670 A1 | 3/2006 | Castrucci |
| 2006/0059430 A1 | 3/2006 | Bells |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0092177 A1 | 5/2006 | Blasko |
| 2006/0093219 A1 | 5/2006 | Gounares et al. |
| 2006/0101354 A1 | 5/2006 | Hashimoto et al. |
| 2006/0103623 A1 | 5/2006 | Davis |
| 2006/0107231 A1 | 5/2006 | Matthews et al. |
| 2006/0112335 A1 | 5/2006 | Hofmeister et al. |
| 2006/0112354 A1 | 5/2006 | Park et al. |
| 2006/0114239 A1 | 6/2006 | Nakajima |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0155728 A1 | 7/2006 | Bosarge |
| 2006/0156228 A1 | 7/2006 | Gallo et al. |
| 2006/0156247 A1 | 7/2006 | McCormack et al. |
| 2006/0161863 A1 | 7/2006 | Gallo |
| 2006/0161870 A1 | 7/2006 | Hotelling et al. |
| 2006/0172724 A1 | 8/2006 | Linkert et al. |
| 2006/0173911 A1 | 8/2006 | Levin et al. |
| 2006/0176403 A1 | 8/2006 | Gritton et al. |
| 2006/0184901 A1 | 8/2006 | Dietz |
| 2006/0184966 A1 | 8/2006 | Hunleth et al. |
| 2006/0190833 A1 | 8/2006 | SanGiovanni et al. |
| 2006/0197750 A1 | 9/2006 | Kerr et al. |
| 2006/0199598 A1 | 9/2006 | Lee et al. |
| 2006/0209016 A1 | 9/2006 | Fox et al. |
| 2006/0212806 A1 | 9/2006 | Griffin et al. |
| 2006/0218234 A1 | 9/2006 | Deng et al. |
| 2006/0218500 A1 | 9/2006 | Sauve et al. |
| 2006/0218501 A1 | 9/2006 | Wilson et al. |
| 2006/0224993 A1 | 10/2006 | Wong et al. |
| 2006/0227153 A1* | 10/2006 | Anwar .................. G06T 3/0012 345/660 |
| 2006/0232551 A1 | 10/2006 | Matta |
| 2006/0236264 A1 | 10/2006 | Cain et al. |
| 2006/0238517 A1 | 10/2006 | King et al. |
| 2006/0238520 A1 | 10/2006 | Westerman et al. |
| 2006/0246955 A1 | 11/2006 | Nirhamo |
| 2006/0248471 A1 | 11/2006 | Lindsay et al. |
| 2006/0253685 A1 | 11/2006 | Wong et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0262188 A1 | 11/2006 | Elyada et al. |
| 2006/0268013 A1 | 11/2006 | Miles |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0284852 A1 | 12/2006 | Hofmeister et al. |

(56) References Cited

U.S. PATENT DOCUMENTS

| | | | |
|---|---|---|---|
| 2006/0288280 A1* | 12/2006 | Makela | G06F 16/955 715/205 |
| 2006/0293088 A1 | 12/2006 | Kokubo | |
| 2006/0294063 A1 | 12/2006 | Ali et al. | |
| 2006/0294396 A1 | 12/2006 | Witman | |
| 2007/0005716 A1 | 1/2007 | LaVasseur et al. | |
| 2007/0006094 A1 | 1/2007 | Canfield et al. | |
| 2007/0011610 A1 | 1/2007 | Sethi et al. | |
| 2007/0015532 A1 | 1/2007 | Deelman | |
| 2007/0016609 A1 | 1/2007 | Kim et al. | |
| 2007/0024646 A1 | 2/2007 | Saarinen | |
| 2007/0028267 A1 | 2/2007 | Ostojic et al. | |
| 2007/0035513 A1 | 2/2007 | Sherrard et al. | |
| 2007/0038567 A1 | 2/2007 | Allaire et al. | |
| 2007/0044039 A1 | 2/2007 | Amadio et al. | |
| 2007/0050724 A1 | 3/2007 | Lee et al. | |
| 2007/0054679 A1 | 3/2007 | Cho et al. | |
| 2007/0055770 A1 | 3/2007 | Karmakar et al. | |
| 2007/0061488 A1 | 3/2007 | Alagappan et al. | |
| 2007/0061511 A1 | 3/2007 | Faber | |
| 2007/0061714 A1 | 3/2007 | Stuple et al. | |
| 2007/0063995 A1 | 3/2007 | Bailey et al. | |
| 2007/0067272 A1 | 3/2007 | Flynt | |
| 2007/0067737 A1 | 3/2007 | Zielinski et al. | |
| 2007/0067738 A1 | 3/2007 | Flynt et al. | |
| 2007/0067798 A1 | 3/2007 | Wroblewski | |
| 2007/0073718 A1 | 3/2007 | Ramer | |
| 2007/0075976 A1 | 4/2007 | Kun et al. | |
| 2007/0076013 A1 | 4/2007 | Campbell | |
| 2007/0080954 A1 | 4/2007 | Griffin | |
| 2007/0082707 A1 | 4/2007 | Flynt et al. | |
| 2007/0082708 A1 | 4/2007 | Griffin | |
| 2007/0083501 A1 | 4/2007 | Pedersen et al. | |
| 2007/0083746 A1 | 4/2007 | Fallon et al. | |
| 2007/0083821 A1 | 4/2007 | Garbow et al. | |
| 2007/0094045 A1 | 4/2007 | Cobbs et al. | |
| 2007/0097096 A1 | 5/2007 | Rosenberg | |
| 2007/0103452 A1 | 5/2007 | Wakai et al. | |
| 2007/0106635 A1 | 5/2007 | Frieden et al. | |
| 2007/0106939 A1 | 5/2007 | Qassoudi | |
| 2007/0120762 A1 | 5/2007 | O'Gorman | |
| 2007/0120835 A1 | 5/2007 | Sato | |
| 2007/0127638 A1 | 6/2007 | Doulton | |
| 2007/0136677 A1 | 6/2007 | Agarwal | |
| 2007/0140566 A1 | 6/2007 | Lin et al. | |
| 2007/0143705 A1 | 6/2007 | Peters | |
| 2007/0152961 A1 | 7/2007 | Dunton et al. | |
| 2007/0157089 A1 | 7/2007 | Van Os et al. | |
| 2007/0157105 A1 | 7/2007 | Owens et al. | |
| 2007/0168890 A1 | 7/2007 | Zhao et al. | |
| 2007/0171192 A1 | 7/2007 | Seo et al. | |
| 2007/0180381 A1 | 8/2007 | Rice | |
| 2007/0180401 A1 | 8/2007 | Singh et al. | |
| 2007/0180448 A1 | 8/2007 | Low et al. | |
| 2007/0182595 A1 | 8/2007 | Ghasabian | |
| 2007/0182999 A1 | 8/2007 | Anthony et al. | |
| 2007/0185847 A1 | 8/2007 | Budzik et al. | |
| 2007/0192707 A1 | 8/2007 | Maeda et al. | |
| 2007/0192726 A1 | 8/2007 | Kim et al. | |
| 2007/0192730 A1 | 8/2007 | Simila et al. | |
| 2007/0192733 A1 | 8/2007 | Horiuchi | |
| 2007/0192739 A1 | 8/2007 | Hunleth et al. | |
| 2007/0197196 A1 | 8/2007 | Shenfield et al. | |
| 2007/0198420 A1 | 8/2007 | Goldstein | |
| 2007/0208840 A1 | 9/2007 | Mcconville et al. | |
| 2007/0211034 A1 | 9/2007 | Griffin et al. | |
| 2007/0214429 A1 | 9/2007 | Lyudovyk et al. | |
| 2007/0214431 A1* | 9/2007 | Amadio | G06F 9/451 715/788 |
| 2007/0214454 A1 | 9/2007 | Edwards et al. | |
| 2007/0216651 A1 | 9/2007 | Patel | |
| 2007/0216661 A1 | 9/2007 | Chen et al. | |
| 2007/0220444 A1 | 9/2007 | Sunday et al. | |
| 2007/0222769 A1 | 9/2007 | Otsuka et al. | |
| 2007/0225022 A1 | 9/2007 | Satake | |
| 2007/0233654 A1 | 10/2007 | Karlson | |
| 2007/0236468 A1 | 10/2007 | Tuli | |
| 2007/0238487 A1 | 10/2007 | Kuhl et al. | |
| 2007/0238488 A1 | 10/2007 | Scott | |
| 2007/0242056 A1 | 10/2007 | Engelhardt et al. | |
| 2007/0247435 A1 | 10/2007 | Benko et al. | |
| 2007/0250583 A1 | 10/2007 | Hardy | |
| 2007/0250787 A1 | 10/2007 | Kawahara et al. | |
| 2007/0253758 A1 | 11/2007 | Suess | |
| 2007/0256029 A1 | 11/2007 | Maxwell | |
| 2007/0257891 A1 | 11/2007 | Esenther et al. | |
| 2007/0257933 A1 | 11/2007 | Klassen | |
| 2007/0260674 A1 | 11/2007 | Shenfield | |
| 2007/0262964 A1 | 11/2007 | Zotov et al. | |
| 2007/0263843 A1 | 11/2007 | Foxenland | |
| 2007/0266342 A1 | 11/2007 | Chang et al. | |
| 2007/0273663 A1 | 11/2007 | Park et al. | |
| 2007/0273668 A1 | 11/2007 | Park et al. | |
| 2007/0280457 A1 | 12/2007 | Aberethy | |
| 2007/0281747 A1 | 12/2007 | Pletikosa | |
| 2007/0288860 A1 | 12/2007 | Ording et al. | |
| 2007/0291007 A1 | 12/2007 | Forlines et al. | |
| 2008/0001924 A1 | 1/2008 | de los Reyes et al. | |
| 2008/0005668 A1 | 1/2008 | Mavinkurve | |
| 2008/0005703 A1 | 1/2008 | Radivojevic et al. | |
| 2008/0028294 A1 | 1/2008 | Sell et al. | |
| 2008/0032681 A1 | 2/2008 | West | |
| 2008/0034318 A1 | 2/2008 | Louch et al. | |
| 2008/0036743 A1 | 2/2008 | Westerman et al. | |
| 2008/0040692 A1 | 2/2008 | Sunday et al. | |
| 2008/0042978 A1 | 2/2008 | Perez-Noguera | |
| 2008/0048986 A1 | 2/2008 | Khoo | |
| 2008/0052370 A1 | 2/2008 | Snyder | |
| 2008/0052637 A1 | 2/2008 | Ben-Yoseph et al. | |
| 2008/0052945 A1 | 3/2008 | Matas et al. | |
| 2008/0057910 A1 | 3/2008 | Thoresson et al. | |
| 2008/0057926 A1 | 3/2008 | Forstall et al. | |
| 2008/0062141 A1 | 3/2008 | Chandhri | |
| 2008/0065607 A1 | 3/2008 | Weber | |
| 2008/0065720 A1 | 3/2008 | Brodersen et al. | |
| 2008/0072173 A1 | 3/2008 | Brunner et al. | |
| 2008/0076472 A1 | 3/2008 | Hyatt | |
| 2008/0082903 A1 | 4/2008 | McCurdy et al. | |
| 2008/0082911 A1 | 4/2008 | Sorotokin et al. | |
| 2008/0082934 A1 | 4/2008 | Kocienda et al. | |
| 2008/0084400 A1 | 4/2008 | Rosenberg | |
| 2008/0085700 A1 | 4/2008 | Arora | |
| 2008/0092054 A1 | 4/2008 | Bhumkar et al. | |
| 2008/0094368 A1 | 4/2008 | Ording et al. | |
| 2008/0095100 A1 | 4/2008 | Cleveland et al. | |
| 2008/0098093 A1 | 4/2008 | Simon et al. | |
| 2008/0102863 A1 | 5/2008 | Hardy | |
| 2008/0104544 A1 | 5/2008 | Collins et al. | |
| 2008/0107057 A1 | 5/2008 | Kannan et al. | |
| 2008/0109753 A1 | 5/2008 | Karstens | |
| 2008/0113656 A1 | 5/2008 | Lee et al. | |
| 2008/0114535 A1 | 5/2008 | Nesbitt | |
| 2008/0122796 A1 | 5/2008 | Jobs | |
| 2008/0126441 A1 | 5/2008 | Giampaolo et al. | |
| 2008/0132252 A1 | 6/2008 | Altman et al. | |
| 2008/0138030 A1 | 6/2008 | Bryan et al. | |
| 2008/0141153 A1 | 6/2008 | Samson et al. | |
| 2008/0153551 A1 | 6/2008 | Baek et al. | |
| 2008/0155425 A1 | 6/2008 | Murthy et al. | |
| 2008/0158189 A1 | 7/2008 | Kim | |
| 2008/0162651 A1 | 7/2008 | Madnani | |
| 2008/0163104 A1 | 7/2008 | Haug | |
| 2008/0164982 A1 | 7/2008 | Andrews et al. | |
| 2008/0165132 A1 | 7/2008 | Weiss | |
| 2008/0165136 A1 | 7/2008 | Christie et al. | |
| 2008/0165141 A1 | 7/2008 | Christie | |
| 2008/0165163 A1 | 7/2008 | Bathiche | |
| 2008/0165210 A1 | 7/2008 | Platzer et al. | |
| 2008/0165255 A1 | 7/2008 | Christie et al. | |
| 2008/0167058 A1 | 7/2008 | Lee et al. | |
| 2008/0168349 A1 | 7/2008 | Lamiraux et al. | |
| 2008/0168379 A1 | 7/2008 | Forstall et al. | |
| 2008/0168382 A1 | 7/2008 | Louch et al. | |
| 2008/0168396 A1 | 7/2008 | Matas et al. | |

(56) References Cited

U.S. PATENT DOCUMENTS

| | | |
|---|---|---|
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0178125 A1 | 7/2008 | Elsbree |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Adbel-Kader et al. |
| 2008/0208973 A1 | 8/2008 | Hayashi |
| 2008/0211766 A1 | 9/2008 | Westerman et al. |
| 2008/0211778 A1 | 9/2008 | Ording et al. |
| 2008/0215475 A1 | 9/2008 | Ramer et al. |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0225014 A1 | 9/2008 | Kim |
| 2008/0229192 A1 | 9/2008 | Gear et al. |
| 2008/0229217 A1 | 9/2008 | Kembel et al. |
| 2008/0238941 A1 | 10/2008 | Kinnan |
| 2008/0242277 A1 | 10/2008 | Chen et al. |
| 2008/0242362 A1 | 10/2008 | Duarte |
| 2008/0249682 A1 | 10/2008 | Wisniewski et al. |
| 2008/0250354 A1 | 10/2008 | Park |
| 2008/0256471 A1 | 10/2008 | Okamoto |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0275956 A1 | 11/2008 | Saxena |
| 2008/0278455 A1 | 11/2008 | Atkins et al. |
| 2008/0284798 A1 | 11/2008 | Weybrew et al. |
| 2008/0288606 A1 | 11/2008 | Kasai et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0303798 A1 | 12/2008 | Matsudate et al. |
| 2008/0307351 A1 | 12/2008 | Louch et al. |
| 2008/0309626 A1 | 12/2008 | Westerman et al. |
| 2008/0313538 A1 | 12/2008 | Hudson |
| 2008/0313540 A1 | 12/2008 | Dirks et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007004 A1 | 1/2009 | Holecek et al. |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031243 A1 | 1/2009 | Kano et al. |
| 2009/0031247 A1 | 1/2009 | Walter et al. |
| 2009/0033632 A1 | 2/2009 | Szolyga et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0054107 A1 | 2/2009 | Feland, III et al. |
| 2009/0055749 A1 | 2/2009 | Chatterjee et al. |
| 2009/0058821 A1 | 3/2009 | Chaudhri |
| 2009/0058830 A1 | 3/2009 | Herz |
| 2009/0059730 A1 | 3/2009 | Lyons et al. |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077501 A1 | 3/2009 | Partridge et al. |
| 2009/0077649 A1 | 3/2009 | Lockhart |
| 2009/0079699 A1 | 3/2009 | Sun |
| 2009/0079740 A1 | 3/2009 | Fitzmaurice et al. |
| 2009/0083656 A1 | 3/2009 | Dokhon |
| 2009/0085851 A1 | 4/2009 | Lim |
| 2009/0085878 A1 | 4/2009 | Heubel et al. |
| 2009/0085886 A1 | 4/2009 | Huang et al. |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0094562 A1 | 4/2009 | Jeong et al. |
| 2009/0096758 A1 | 4/2009 | Hotelling et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0117943 A1 | 5/2009 | Lee et al. |
| 2009/0119578 A1 | 5/2009 | Relyea et al. |
| 2009/0125844 A1 | 5/2009 | Weir et al. |
| 2009/0128505 A1 | 5/2009 | Partridge et al. |
| 2009/0132942 A1 | 5/2009 | Santoro et al. |
| 2009/0138830 A1 | 5/2009 | Borgaonkar et al. |
| 2009/0140061 A1 | 6/2009 | Schultz et al. |
| 2009/0140986 A1 | 6/2009 | Karkkainen et al. |
| 2009/0143141 A1 | 6/2009 | Wells et al. |
| 2009/0144376 A1 | 6/2009 | Moscatelli et al. |
| 2009/0144642 A1 | 6/2009 | Crystal |
| 2009/0144652 A1 | 6/2009 | Wiley |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0150618 A1 | 6/2009 | Allen, Jr. et al. |
| 2009/0153438 A1 | 6/2009 | Miller et al. |
| 2009/0153492 A1 | 6/2009 | Popp |
| 2009/0158144 A1 | 6/2009 | Griffin |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0167696 A1 | 7/2009 | Griffin |
| 2009/0171920 A1 | 7/2009 | Wade et al. |
| 2009/0172103 A1 | 7/2009 | Tuli |
| 2009/0174679 A1 | 7/2009 | Westerman |
| 2009/0178007 A1 | 7/2009 | Matas et al. |
| 2009/0182788 A1 | 7/2009 | Chung et al. |
| 2009/0183077 A1 | 7/2009 | Hakim et al. |
| 2009/0183107 A1 | 7/2009 | Matthews et al. |
| 2009/0184939 A1 | 7/2009 | Wohlstadter et al. |
| 2009/0187842 A1 | 7/2009 | Collins et al. |
| 2009/0187860 A1 | 7/2009 | Fleck et al. |
| 2009/0189868 A1 | 7/2009 | Joo et al. |
| 2009/0192942 A1 | 7/2009 | Cottrille et al. |
| 2009/0193358 A1 | 7/2009 | Mernyk et al. |
| 2009/0193364 A1 | 7/2009 | Jarrett et al. |
| 2009/0193366 A1 | 7/2009 | Davidson |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249236 A1 | 10/2009 | Westerman et al. |
| 2009/0249247 A1 | 10/2009 | Tseng et al. |
| 2009/0249257 A1 | 10/2009 | Bove et al. |
| 2009/0251432 A1 | 10/2009 | Wang et al. |
| 2009/0254846 A1 | 10/2009 | Vaidyanathan et al. |
| 2009/0265662 A1 | 10/2009 | Bamford |
| 2009/0271735 A1 | 10/2009 | Anderson et al. |
| 2009/0271778 A1 | 10/2009 | Mandyam et al. |
| 2009/0276701 A1 | 11/2009 | Nurmi |
| 2009/0278812 A1 | 11/2009 | Yasutake |
| 2009/0282332 A1 | 11/2009 | Porat |
| 2009/0284478 A1 | 11/2009 | De la Torre Baltierra et al. |
| 2009/0284482 A1 | 11/2009 | Chin |
| 2009/0284657 A1 | 11/2009 | Roberts et al. |

(56) References Cited

U.S. PATENT DOCUMENTS

| | | |
|---|---|---|
| 2009/0288044 A1 | 11/2009 | Matthews et al. |
| 2009/0289902 A1 | 11/2009 | Carlvik et al. |
| 2009/0292989 A1 | 11/2009 | Matthews et al. |
| 2009/0293007 A1 | 11/2009 | Duarte et al. |
| 2009/0293013 A1 | 11/2009 | O'Shaugnessy et al. |
| 2009/0295753 A1 | 12/2009 | King et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0307682 A1 | 12/2009 | Gharabally et al. |
| 2009/0309846 A1 | 12/2009 | Trachtenberg et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0320070 A1 | 12/2009 | Inoguchi |
| 2009/0322760 A1 | 12/2009 | Kwiatkowski et al. |
| 2009/0327953 A1 | 12/2009 | Honkala et al. |
| 2009/0327969 A1 | 12/2009 | Estrada |
| 2009/0327975 A1 | 12/2009 | Stedman |
| 2010/0008490 A1 | 1/2010 | Gharachorloo et al. |
| 2010/0010934 A1 | 1/2010 | Barry et al. |
| 2010/0013768 A1 | 1/2010 | Leung |
| 2010/0013782 A1 | 1/2010 | Liu et al. |
| 2010/0016049 A1 | 1/2010 | Shirakawa et al. |
| 2010/0020025 A1 | 1/2010 | Lemort et al. |
| 2010/0020091 A1 | 1/2010 | Rasmussen et al. |
| 2010/0030578 A1 | 2/2010 | Siddique et al. |
| 2010/0031186 A1 | 2/2010 | Tseng |
| 2010/0042911 A1 | 2/2010 | Wormaid et al. |
| 2010/0045705 A1 | 2/2010 | Vertegaal et al. |
| 2010/0050076 A1 | 2/2010 | Roth |
| 2010/0053861 A1 | 3/2010 | Kim et al. |
| 2010/0057566 A1 | 3/2010 | Itzhak |
| 2010/0058226 A1 | 3/2010 | Flake et al. |
| 2010/0058248 A1 | 3/2010 | Park |
| 2010/0062811 A1 | 3/2010 | Park et al. |
| 2010/0064261 A1 | 3/2010 | Andrews et al. |
| 2010/0066667 A1 | 3/2010 | MacDougall et al. |
| 2010/0066698 A1* | 3/2010 | Seo ............... G06F 3/04883 345/173 |
| 2010/0070931 A1 | 3/2010 | Nichols |
| 2010/0073160 A1 | 3/2010 | Gilmour et al. |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0083190 A1 | 4/2010 | Roberts et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088634 A1 | 4/2010 | Tsuruta et al. |
| 2010/0088635 A1 | 4/2010 | Louch |
| 2010/0088641 A1 | 4/2010 | Choi |
| 2010/0090971 A1 | 4/2010 | Choi et al. |
| 2010/0095240 A1 | 4/2010 | Shiplacoff et al. |
| 2010/0097338 A1 | 4/2010 | Miyashita et al. |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman et al. |
| 2010/0105440 A1 | 4/2010 | Kruzeniski |
| 2010/0105441 A1 | 4/2010 | Voss |
| 2010/0105443 A1 | 4/2010 | Vaisanen |
| 2010/0106607 A1 | 4/2010 | Riddiford et al. |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0115455 A1 | 5/2010 | Kim |
| 2010/0121705 A1 | 5/2010 | Ramer et al. |
| 2010/0122110 A1 | 5/2010 | Ordogh |
| 2010/0122208 A1 | 5/2010 | Herr et al. |
| 2010/0123737 A1 | 5/2010 | Williamson et al. |
| 2010/0134415 A1 | 6/2010 | Iwase et al. |
| 2010/0137027 A1 | 6/2010 | Kim |
| 2010/0138767 A1 | 6/2010 | Wang et al. |
| 2010/0145675 A1 | 6/2010 | Lloyd et al. |
| 2010/0146384 A1 | 6/2010 | Peev et al. |
| 2010/0146431 A1 | 6/2010 | Raji et al. |
| 2010/0146437 A1 | 6/2010 | Woodcock et al. |
| 2010/0157157 A1 | 6/2010 | Yi |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0164878 A1 | 7/2010 | Bestle et al. |
| 2010/0164959 A1 | 7/2010 | Brown et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0185989 A1 | 7/2010 | Shiplacoff et al. |
| 2010/0188328 A1 | 7/2010 | Dodge et al. |
| 2010/0188371 A1 | 7/2010 | Lowles et al. |
| 2010/0192102 A1 | 7/2010 | Chmielewski et al. |
| 2010/0201634 A1 | 8/2010 | Coddington |
| 2010/0213040 A1 | 8/2010 | Yeh et al. |
| 2010/0216491 A1 | 8/2010 | Winkler et al. |
| 2010/0217428 A1 | 8/2010 | Strong et al. |
| 2010/0223569 A1 | 9/2010 | Vuong et al. |
| 2010/0223627 A1 | 9/2010 | Sharma |
| 2010/0235736 A1 | 9/2010 | Fleisher et al. |
| 2010/0241973 A1 | 9/2010 | Whiddett |
| 2010/0245263 A1 | 9/2010 | Parada, Jr. et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga et al. |
| 2010/0248788 A1 | 9/2010 | Yook et al. |
| 2010/0251153 A1 | 9/2010 | SanGiovanni et al. |
| 2010/0251167 A1 | 9/2010 | DeLuca et al. |
| 2010/0251189 A1 | 9/2010 | Jaeger |
| 2010/0259493 A1 | 10/2010 | Chang et al. |
| 2010/0262928 A1 | 10/2010 | Abbott |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0281481 A1 | 11/2010 | Rainisto et al. |
| 2010/0283743 A1 | 11/2010 | Coddington et al. |
| 2010/0283748 A1 | 11/2010 | Hsieh et al. |
| 2010/0289806 A1 | 11/2010 | Lao et al. |
| 2010/0293056 A1 | 11/2010 | Flynt et al. |
| 2010/0293501 A1 | 11/2010 | Russ et al. |
| 2010/0295789 A1 | 11/2010 | Shin et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0302712 A1 | 12/2010 | Zednicek et al. |
| 2010/0306702 A1 | 12/2010 | Warner |
| 2010/0309148 A1 | 12/2010 | Fleizach et al. |
| 2010/0311470 A1 | 12/2010 | Seo et al. |
| 2010/0313124 A1 | 12/2010 | Privault et al. |
| 2010/0313165 A1 | 12/2010 | Louch et al. |
| 2010/0318745 A1 | 12/2010 | Wheeler et al. |
| 2010/0321403 A1 | 12/2010 | Inadome |
| 2010/0328431 A1 | 12/2010 | Kim et al. |
| 2010/0329642 A1 | 12/2010 | Kam et al. |

(56) References Cited

U.S. PATENT DOCUMENTS

| | | |
|---|---|---|
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0018821 A1 | 1/2011 | Kii |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0032365 A1 | 2/2011 | Yett |
| 2011/0035702 A1 | 2/2011 | Williams et al. |
| 2011/0041096 A1 | 2/2011 | Larco et al. |
| 2011/0043527 A1 | 2/2011 | Ording et al. |
| 2011/0050594 A1 | 3/2011 | Kim et al. |
| 2011/0055729 A1 | 3/2011 | Mason et al. |
| 2011/0055753 A1 | 3/2011 | Horodezky et al. |
| 2011/0055773 A1 | 3/2011 | Agarawala et al. |
| 2011/0055775 A1 | 3/2011 | Saito et al. |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087739 A1 | 4/2011 | Lin |
| 2011/0087988 A1 | 4/2011 | Ray et al. |
| 2011/0093778 A1 | 4/2011 | Kim et al. |
| 2011/0093815 A1 | 4/2011 | Gobeil |
| 2011/0093816 A1 | 4/2011 | Chang et al. |
| 2011/0093821 A1 | 4/2011 | Wigdor et al. |
| 2011/0099512 A1* | 4/2011 | Jeong .................... G06F 3/0481 715/790 |
| 2011/0102464 A1 | 5/2011 | Godavari |
| 2011/0105187 A1* | 5/2011 | Dobroth ................ G06F 3/0481 455/566 |
| 2011/0107220 A1 | 5/2011 | Perlman |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0115735 A1 | 5/2011 | Lev et al. |
| 2011/0119586 A1 | 5/2011 | Blinnikka et al. |
| 2011/0119597 A1 | 5/2011 | Yellamraju et al. |
| 2011/0124376 A1 | 5/2011 | Kim et al. |
| 2011/0126094 A1 | 5/2011 | Horodezky et al. |
| 2011/0126156 A1 | 5/2011 | Krishnaraj et al. |
| 2011/0138313 A1 | 6/2011 | Decker et al. |
| 2011/0143769 A1 | 6/2011 | Jones et al. |
| 2011/0154223 A1 | 6/2011 | Whitnah et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167336 A1 | 7/2011 | Aitken et al. |
| 2011/0167341 A1 | 7/2011 | Cranfill et al. |
| 2011/0167342 A1 | 7/2011 | De La Pena et al. |
| 2011/0167403 A1 | 7/2011 | French et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175821 A1 | 7/2011 | King |
| 2011/0175930 A1 | 7/2011 | Hwang et al. |
| 2011/0179020 A1 | 7/2011 | Ozzie et al. |
| 2011/0179386 A1 | 7/2011 | Shaffer et al. |
| 2011/0179387 A1 | 7/2011 | Shaffer et al. |
| 2011/0181524 A1 | 7/2011 | Hinckley |
| 2011/0181617 A1 | 7/2011 | Tsuda et al. |
| 2011/0185299 A1 | 7/2011 | Hinckley |
| 2011/0185300 A1 | 7/2011 | Hinckley et al. |
| 2011/0185318 A1 | 7/2011 | Hinckley et al. |
| 2011/0185320 A1 | 7/2011 | Hinckley |
| 2011/0191675 A1 | 8/2011 | Kauranen |
| 2011/0191704 A1 | 8/2011 | Hinckley |
| 2011/0191718 A1 | 8/2011 | Hinckley |
| 2011/0191719 A1 | 8/2011 | Hinckley |
| 2011/0199386 A1 | 8/2011 | Dharwada et al. |
| 2011/0202837 A1 | 8/2011 | Fong |
| 2011/0202866 A1 | 8/2011 | Huang et al. |
| 2011/0205163 A1 | 8/2011 | Hinckley |
| 2011/0209039 A1 | 8/2011 | Hinckley et al. |
| 2011/0209057 A1 | 8/2011 | Hinckley |
| 2011/0209058 A1 | 8/2011 | Hinckley |
| 2011/0209088 A1 | 8/2011 | Hinckley |
| 2011/0209089 A1 | 8/2011 | Hinckley et al. |
| 2011/0209093 A1 | 8/2011 | Hinckley |
| 2011/0209097 A1 | 8/2011 | Hinckley |
| 2011/0209098 A1 | 8/2011 | Hinckley et al. |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0210850 A1 | 9/2011 | Tran |
| 2011/0225547 A1 | 9/2011 | Fong et al. |
| 2011/0231796 A1 | 9/2011 | Vigil |
| 2011/0234522 A1 | 9/2011 | Lin et al. |
| 2011/0252346 A1 | 10/2011 | Chaudhri |
| 2011/0252380 A1 | 10/2011 | Chaudhri |
| 2011/0252381 A1 | 10/2011 | Chaudhri |
| 2011/0258563 A1 | 10/2011 | Lincke |
| 2011/0271182 A1 | 11/2011 | Tsai et al. |
| 2011/0273379 A1 | 11/2011 | Chen et al. |
| 2011/0276864 A1 | 11/2011 | Oules |
| 2011/0279461 A1 | 11/2011 | Hamilton et al. |
| 2011/0280312 A1 | 11/2011 | Gaur et al. |
| 2011/0283188 A1 | 11/2011 | Farrenkopf et al. |
| 2011/0291964 A1 | 12/2011 | Chambers et al. |
| 2011/0296057 A1 | 12/2011 | Shah et al. |
| 2011/0316884 A1 | 12/2011 | Giambalvo et al. |
| 2011/0320863 A1 | 12/2011 | Amroladze et al. |
| 2011/0320978 A1 | 12/2011 | Horodezky et al. |
| 2012/0005584 A1 | 1/2012 | Seago et al. |
| 2012/0009903 A1 | 1/2012 | Schultz et al. |
| 2012/0017162 A1 | 1/2012 | Khokhlov |
| 2012/0028687 A1 | 2/2012 | Wykes |
| 2012/0030616 A1 | 2/2012 | Howes et al. |
| 2012/0050185 A1 | 3/2012 | Davydov et al. |
| 2012/0050332 A1 | 3/2012 | Nikara et al. |
| 2012/0062604 A1 | 3/2012 | Lobo |
| 2012/0079414 A1 | 3/2012 | Eischeid et al. |
| 2012/0081310 A1 | 4/2012 | Schrock et al. |
| 2012/0084705 A1 | 4/2012 | Lee et al. |
| 2012/0084710 A1 | 4/2012 | Sirpal et al. |
| 2012/0089950 A1 | 4/2012 | Tseng |
| 2012/0096411 A1 | 4/2012 | Nash |
| 2012/0102433 A1 | 4/2012 | Falkenburg |
| 2012/0218192 A1 | 4/2012 | Lazaridis et al. |
| 2012/0124469 A1 | 5/2012 | Nakajima et al. |
| 2012/0144331 A1* | 6/2012 | Tolonen ................ G06F 3/0484 715/769 |
| 2012/0151397 A1 | 6/2012 | Oberstein et al. |
| 2012/0159383 A1 | 6/2012 | Matthews et al. |
| 2012/0159395 A1 | 6/2012 | Deutsch et al. |
| 2012/0159402 A1 | 6/2012 | Nurmi et al. |
| 2012/0161791 A1 | 6/2012 | Shaw |
| 2012/0162266 A1 | 6/2012 | Douglas et al. |
| 2012/0166980 A1 | 6/2012 | Yosef et al. |
| 2012/0166997 A1 | 6/2012 | Cho et al. |
| 2012/0167005 A1 | 6/2012 | Matthews et al. |
| 2012/0167008 A1 | 6/2012 | Zaman |
| 2012/0167011 A1 | 6/2012 | Zaman |
| 2012/0169593 A1 | 7/2012 | Mak et al. |
| 2012/0174005 A1 | 7/2012 | Deutsch et al. |
| 2012/0174029 A1 | 7/2012 | Bastide et al. |
| 2012/0176322 A1 | 7/2012 | Karmi et al. |
| 2012/0176401 A1 | 7/2012 | Hayward et al. |
| 2012/0179992 A1 | 7/2012 | Smuga |
| 2012/0180001 A1 | 7/2012 | Griffin et al. |
| 2012/0208593 A1* | 8/2012 | Yang .................... G06F 3/0481 455/556.1 |
| 2012/0209907 A1 | 8/2012 | Andrews et al. |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0226971 A1 | 9/2012 | Tocchini et al. |
| 2012/0233571 A1 | 9/2012 | Wever et al. |

(56) References Cited

U.S. PATENT DOCUMENTS

| | | |
|---|---|---|
| 2012/0236026 A1 | 9/2012 | Hinckley |
| 2012/0236035 A1 | 9/2012 | Kimura |
| 2012/0244841 A1 | 9/2012 | Teng |
| 2012/0254780 A1 | 10/2012 | Mouton et al. |
| 2012/0254808 A1 | 10/2012 | Gildfind |
| 2012/0265644 A1 | 10/2012 | Roa et al. |
| 2012/0272181 A1 | 10/2012 | Rogers et al. |
| 2012/0284673 A1 | 11/2012 | Lamb et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311436 A1 | 12/2012 | Steele et al. |
| 2012/0311485 A1 | 12/2012 | Caliendo, Jr. et al. |
| 2012/0323992 A1 | 12/2012 | Brobst et al. |
| 2013/0007665 A1 | 1/2013 | Chaudhri et al. |
| 2013/0031508 A1 | 1/2013 | Kodosky et al. |
| 2013/0033525 A1 | 2/2013 | Markiewicz |
| 2013/0038541 A1 | 2/2013 | Bakker |
| 2013/0042203 A1 | 2/2013 | Wong et al. |
| 2013/0042206 A1 | 2/2013 | Zaman et al. |
| 2013/0044136 A1 | 2/2013 | Matthews |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0047126 A1 | 2/2013 | Sareen |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman et al. |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard et al. |
| 2013/0067420 A1 | 3/2013 | Pittappilly |
| 2013/0093757 A1 | 4/2013 | Cornell |
| 2013/0117715 A1 | 5/2013 | Williams et al. |
| 2013/0167078 A1* | 6/2013 | Monnig ............... G06F 3/0484 715/800 |
| 2013/0169649 A1 | 7/2013 | Bates |
| 2013/0176316 A1 | 7/2013 | Bates |
| 2013/0179781 A1 | 7/2013 | Nan et al. |
| 2013/0219332 A1 | 8/2013 | Woley |
| 2013/0300684 A1 | 11/2013 | Kim et al. |
| 2013/0304822 A1 | 11/2013 | Tetreault |
| 2013/0305184 A1 | 11/2013 | Kim et al. |
| 2014/0013271 A1 | 1/2014 | Moore et al. |
| 2014/0033099 A1 | 1/2014 | Treitman et al. |
| 2014/0067833 A1 | 3/2014 | Nandi |
| 2014/0082552 A1 | 3/2014 | Zaman |
| 2014/0089833 A1 | 3/2014 | Hwang et al. |
| 2014/0089856 A1 | 3/2014 | Matthews |
| 2014/0098108 A1 | 4/2014 | Fong et al. |
| 2014/0109008 A1 | 4/2014 | Zaman |
| 2014/0143708 A1 | 5/2014 | Yang et al. |
| 2014/0164990 A1 | 6/2014 | Kim et al. |
| 2014/0223381 A1 | 8/2014 | Huang et al. |
| 2014/0310646 A1 | 10/2014 | Vranjes et al. |
| 2015/0046829 A1 | 2/2015 | Donahue et al. |
| 2015/0058763 A1 | 2/2015 | Leonard et al. |
| 2015/0095768 A1* | 4/2015 | Rimmer ............... G06F 40/103 715/238 |
| 2015/0113476 A1 | 4/2015 | Deutsch et al. |
| 2015/0185980 A1* | 7/2015 | An ....................... G06F 3/04817 715/803 |
| 2015/0186024 A1* | 7/2015 | Hong ................... G06F 3/04886 715/800 |
| 2015/0186376 A1 | 7/2015 | Garside et al. |
| 2015/0193403 A1 | 7/2015 | Zaman et al. |
| 2015/0199075 A1 | 7/2015 | Kuscher et al. |
| 2015/0317026 A1 | 11/2015 | Choi et al. |
| 2015/0317062 A1 | 11/2015 | Jarrett et al. |
| 2015/0325211 A1 | 11/2015 | Lee et al. |
| 2015/0378554 A1 | 12/2015 | Jan et al. |
| 2015/0378594 A1 | 12/2015 | Zaman et al. |
| 2016/0041710 A1 | 2/2016 | Zaman et al. |
| 2016/0041711 A1 | 2/2016 | Zaman et al. |
| 2016/0041730 A1 | 2/2016 | Zaman et al. |
| 2016/0070357 A1 | 3/2016 | Nguyen |
| 2016/0110090 A1 | 4/2016 | Patten et al. |
| 2017/0315705 A1 | 11/2017 | Zaman et al. |
| 2017/0371517 A1 | 12/2017 | Nan et al. |

FOREIGN PATENT DOCUMENTS

| | | |
|---|---|---|
| CN | 1591305 | 3/2005 |
| CN | 1591398 | 3/2005 |
| CN | 1734440 | 2/2006 |
| CN | 1766824 | 5/2006 |
| CN | 1845054 | 10/2006 |
| CN | 1902575 | 1/2007 |
| CN | 1904823 | 1/2007 |
| CN | 1930568 | 3/2007 |
| CN | 101006425 | 7/2007 |
| CN | 101036104 | 9/2007 |
| CN | 101114303 | 1/2008 |
| CN | 101233477 | 7/2008 |
| CN | 101233504 | 7/2008 |
| CN | 101346688 | 1/2009 |
| CN | 101432677 | 5/2009 |
| CN | 201298220 | 8/2009 |
| CN | 101566865 | 10/2009 |
| CN | 101576789 | 11/2009 |
| CN | 101578577 | 11/2009 |
| CN | 101627361 | 1/2010 |
| CN | 101636711 | 1/2010 |
| CN | 101809531 | 8/2010 |
| CN | 101981522 | 2/2011 |
| CN | 102004603 | 4/2011 |
| CN | 102033710 | 4/2011 |
| CN | 102144213 | 8/2011 |
| CN | 102197702 | 9/2011 |
| CN | 102460370 | 5/2012 |
| CN | 102591571 | 7/2012 |
| CN | 103543904 | 1/2014 |
| EP | 0583060 | 2/1994 |
| EP | 1176520 | 1/2002 |
| EP | 1337093 | 8/2003 |
| EP | 1353505 | 10/2003 |
| EP | 1434411 | 6/2004 |
| EP | 1752868 | 2/2007 |
| EP | 1939718 | 7/2008 |
| EP | 1942401 | 7/2008 |
| EP | 1962480 | 8/2008 |
| EP | 2045700 | 4/2009 |
| EP | 2172836 | 4/2009 |
| EP | 2076000 | 7/2009 |
| EP | 2148268 | 1/2010 |
| EP | 2262193 | 12/2010 |
| EP | 2659347 | 11/2013 |
| GB | 2350991 | 12/2000 |
| JP | 6282368 | 10/1994 |
| JP | H0744351 | 2/1995 |
| JP | 7281810 | 10/1995 |
| JP | 2000293280 | 10/2000 |
| JP | 2000347645 | 12/2000 |
| JP | 2001265523 | 9/2001 |
| JP | 2001290585 | 10/2001 |
| JP | 2002055753 | 2/2002 |

(56) References Cited

FOREIGN PATENT DOCUMENTS

| | | |
|---|---|---|
| JP | 2003513350 | 4/2003 |
| JP | 2003195998 | 7/2003 |
| JP | 2004227393 | 8/2004 |
| JP | 2004357257 | 12/2004 |
| JP | 2005527888 | 9/2005 |
| JP | 2006268849 | 10/2006 |
| JP | 2006293989 | 10/2006 |
| JP | 2006323672 | 11/2006 |
| JP | 2007058740 | 3/2007 |
| JP | 2007148783 | 6/2007 |
| JP | 2007516496 | 6/2007 |
| JP | 2007195186 | 8/2007 |
| JP | 2008508600 | 3/2008 |
| JP | 2008527540 | 7/2008 |
| JP | 2008234042 | 10/2008 |
| JP | 2008276584 | 11/2008 |
| JP | 2008305087 | 12/2008 |
| JP | 2009097724 | 4/2009 |
| JP | 2009265929 | 11/2009 |
| JP | 2009266192 | 11/2009 |
| JP | 2010039761 | 2/2010 |
| JP | 2010049684 | 3/2010 |
| JP | 2010073099 | 4/2010 |
| JP | 20100090931 | 4/2010 |
| JP | 2010108273 | 5/2010 |
| JP | 2010250465 | 11/2010 |
| JP | 2010538394 | 12/2010 |
| JP | 2011048835 | 3/2011 |
| JP | 2011070525 | 4/2011 |
| JP | 2011515780 | 5/2011 |
| JP | 2011516936 | 5/2011 |
| JP | 2011128029 | 6/2011 |
| JP | 2011170523 | 9/2011 |
| JP | 2011221821 | 11/2011 |
| JP | 2012514811 | 6/2012 |
| JP | 2012155416 | 8/2012 |
| JP | 2012527684 | 11/2012 |
| JP | 2012256147 | 12/2012 |
| JP | 201365294 | 10/2014 |
| KR | 200303655 | 2/2003 |
| KR | 20060019198 | 3/2006 |
| KR | 20070039613 | 4/2007 |
| KR | 1020070036114 | 4/2007 |
| KR | 20070093084 | 9/2007 |
| KR | 20070093585 | 9/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 20090002951 | 1/2009 |
| KR | 20090013927 | 2/2009 |
| KR | 1020090041635 | 4/2009 |
| KR | 20090053143 | 5/2009 |
| KR | 1020090088501 | 8/2009 |
| KR | 20090106755 | 10/2009 |
| KR | 1020090123545 | 12/2009 |
| KR | 20100010072 | 2/2010 |
| KR | 20100023637 | 3/2010 |
| KR | 20100048375 | 5/2010 |
| KR | 20100051119 | 5/2010 |
| KR | 20100056369 | 5/2010 |
| KR | 1020100056369 | 5/2010 |
| KR | 1020100107377 | 10/2010 |
| KR | 20100124427 | 11/2010 |
| KR | 1020100131724 | 12/2010 |
| KR | 20110038632 | 4/2011 |
| RU | 2409833 | 4/2009 |
| RU | 2363033 | 7/2009 |
| RU | 2412463 | 1/2010 |
| RU | 2405214 | 11/2010 |
| RU | 2413970 | 3/2011 |
| TW | 200947297 | 11/2009 |
| TW | 201023026 | 6/2010 |
| TW | 201037592 | 10/2010 |
| TW | I333157 | 11/2010 |
| WO | WO-9928812 | 1/1999 |
| WO | WO-9926127 | 5/1999 |
| WO | WO-0129976 | 4/2001 |
| WO | WO-03075547 | 9/2003 |
| WO | WO-2005026931 | 3/2005 |
| WO | WO-2005027506 | 3/2005 |
| WO | WO-2006019639 | 2/2006 |
| WO | WO-2006074267 | 7/2006 |
| WO | WO-2007019599 | 2/2007 |
| WO | WO-2007065019 | 6/2007 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2008041318 | 4/2008 |
| WO | WO-2008084211 | 7/2008 |
| WO | WO-2009000043 | 12/2008 |
| WO | WO-2009012398 | 1/2009 |
| WO | WO-2009049331 | 4/2009 |
| WO | WO-2009054809 | 4/2009 |
| WO | WO-2009081593 | 7/2009 |
| WO | WO-2009086628 | 7/2009 |
| WO | WO-2009142880 | 11/2009 |
| WO | WO-2009158310 | 12/2009 |
| WO | WO-2010013609 | 2/2010 |
| WO | WO-2010024969 | 3/2010 |
| WO | WO-2010036660 | 4/2010 |
| WO | WO-2010041826 | 4/2010 |
| WO | WO-2010048229 | 4/2010 |
| WO | WO-2010048448 | 4/2010 |
| WO | WO-2010048519 | 4/2010 |
| WO | WO-2010080258 | 7/2010 |
| WO | WO-2010089980 | 8/2010 |
| WO | WO-2010092993 | 8/2010 |
| WO | WO-2010110613 | 9/2010 |
| WO | WO-2010117643 | 10/2010 |
| WO | WO-2010119356 | 10/2010 |
| WO | WO-2010125451 | 11/2010 |
| WO | WO-2010134718 | 11/2010 |
| WO | WO-2010135155 | 11/2010 |
| WO | WO-2011041885 | 4/2011 |
| WO | WO-2011106467 | 9/2011 |
| WO | WO-2011106468 | 9/2011 |
| WO | WO-2011126501 | 10/2011 |
| WO | WO-2012087847 | 6/2012 |
| WO | WO-2012088485 | 6/2012 |
| WO | WO-2012091289 | 7/2012 |
| WO | WO-2012166188 | 12/2012 |
| WO | WO-2014051920 | 4/2014 |
| WO | WO-2014085502 | 6/2014 |

OTHER PUBLICATIONS

"Corrected Notice of Allowance", U.S. Appl. No. 14/918,359, filed Oct. 4, 2017, 2 pages.
"Foreign Office Action", CA Application No. 2,836,263, dated Aug. 28, 2017, 4 pages.
"Foreign Office Action", CA Application No. 2,846,505, dated Aug. 17, 2017, 5 pages.
"Foreign Office Action", CA Application No. 2,847,180, dated Aug. 17, 2017, 5 pages.
"Foreign Office Action", KR Application No. 10-2014-7005296, dated Sep. 15, 2017, 12 pages.
"Foreign Office Action", MY Application No. PI2013702227, dated Jul. 31, 2017, 3 pages.
"Non-Final Office Action", U.S. Appl. No. 13/118,292, filed Oct. 5, 2017, 50 pages.
Duino,"Google Testing Complete Redesign of 'My Apps' Section of Google Play, Includes Sort Option", Retrieved from <<https://9to5google.com/2017/02/03/google-testing-redesign-my-apps-section-google-play-sort-option/>>, Feb. 3, 2017, 5 pages.

(56) References Cited

OTHER PUBLICATIONS

Vincent,"A First Look at the Google Play Store Redesign", Retrieved from <<https://www.theverge.com/2015/10/16/9549121/google-play-redesign>>, Oct. 16, 2015, 2 pages.
Welch,"Android Just Got Incredibly Good at Helping You Manage Your Apps", Retrieved from <<https://www.theverge.com/2017/4/19/15360278/android-my-apps-google-play-store-redesign-update-sort>>, Apr. 19, 2017, 5 pages.
Whitwam,"[Update #2: 4.8.22] Latest Google Play Store 4.8.22 With PayPal Support, Simplified App Permissions, Bigger Buttons, And More [APK Download]", Retrieved from <<http://www.androidpolice.com/2014/07/15/google-rolling-out-play-store-v4-8-19-with-paypal-support-simplified-app-permissions-bigger-buttons-and-more-apk-download/>>, Jul. 15, 2014, 8 page.
"Extended European Search Report", EP Application No. 11850624.5, dated Dec. 21, 2016, 9 pages.
"Final Office Action", U.S. Appl. No. 13/228,945, filed Jan. 12, 2017, 23 pages.
"Final Office Action", U.S. Appl. No. 14/850,347, filed Dec. 23, 2016, 6 pages.
"Foreign Office Action", Application No. MX/a/2014/002781, dated Oct. 25, 2016, 5 pages.
"Foreign Office Action", AU Application No. 2011369362, dated Nov. 15, 2016, 3 pages.
"Foreign Office Action", AU Application No. 2011369370, dated Oct. 10, 2016, 3 pages.
"Foreign Office Action", AU Application No. 2011369370, dated Dec. 5, 2016, 4 pages.
"Foreign Office Action", PH Application No. 1-2013-502364, dated Dec. 23, 2016, 2 pages.
"How To Run iPhone Apps Full Screen On iPad Full Force—Quick Tip #8—iOS Vlog 35", Retrieved from <<https://www.youtube.com/watch?v=csccfh80QZ8>>, Jul. 31, 2010, 1 page.
"MicrosoftWindows XP—File and Folder Permissions", Retrieved from<<https://web.archive.org/web/20110211034655/http://www.microsoft.com/resources/documentation/windows/xp/all/proddocs/en-us/acl_folder_permissions.mspx?mfr=true>>, Feb. 11, 2011, 1 page.
"Notice of Allowance", U.S. Appl. No. 13/118,314, filed Jan. 11, 2017, 10 pages.
"Restriction Requirement", U.S. Appl. No. 14/558,666, filed Jan. 13, 2017, 6 pages.
"Corrected Notice of Allowance", U.S. Appl. No. 14/919,607, filed Aug. 21, 2017, 2 pages.
"Foreign Notice of Allowance", CN Application No. 201110454251.3, dated Aug. 7, 2017, 6 pages.
"Foreign Office Action", Application No. MX/a/2014/002781, dated Jun. 23, 2017, 8 pages.
"Foreign Office Action", CA Application No. 2835931, dated Jun. 28, 2017, 5 pages.
"Foreign Office Action", EP Application No. 11866579.3, dated Jul. 10, 2017, 4 pages.
"Foreign Office Action", KR Application No. 10-2013-7031481, dated Jun. 21, 2017, 6 pages.
"Non-Final Office Action", U.S. Appl. No. 14/529,341, filed Aug. 10, 2017, 27 pages.
"Non-Final Office Action", U.S. Appl. No. 14/800,391, filed Aug. 16, 2017, 14 pages.
"Notice of Allowance", U.S. Appl. No. 14/918,358, filed Sep. 1, 2017, 5 pages.
"Notice of Allowance", U.S. Appl. No. 14/918,359, filed Sep. 7, 2017, 5 pages.
"Supplemental Notice of Allowance", U.S. Appl. No. 14/918,358, filed Sep. 15, 2017, 2 pages.
"Corrected Notice of Allowance", U.S. Appl. No. 14/919,607, filed May 30, 2017, 2 pages.
"Foreign Notice of Allowance", AU Application No. 2011376310, dated Apr. 28, 2017, 3 pages.
"Foreign Notice of Allowance", CN Application No. 201210085754.2, dated May 31, 2017, 4 pages.
"Foreign Office Action", IL Application No. 229140, dated Apr. 26, 2017, 6 pages.
"Foreign Office Action", KR Application No. 10-2013-7031472, dated Jun. 22, 2017, 5 pages.
"Non-Final Office Action", U.S. Appl. No. 12/977,235, filed Jun. 21, 2017, 28 pages.
"Non-Final Office Action", U.S. Appl. No. 13/228,876, filed Jun. 15, 2017, 27 pages.
"Non-Final Office Action", U.S. Appl. No. 13/228,945, filed Jun. 30, 2017, 16 pages.
"Non-Final Office Action", U.S. Appl. No. 14/977,462, filed Dec. 7, 2017, 15 pages.
"Final Office Action", U.S. Appl. No. 14/800,391, filed Dec. 21, 2017, 15 pages.
"Corrected Notice of Allowance", U.S. Appl. No. 14/918,358, filed Nov. 13, 2017, 2 pages.
"Corrected Notice of Allowance", U.S. Appl. No. 14/918,359, filed Nov. 14, 2017, 2 pages.
"Foreign Office Action", KR Application No. 10-2017-7026885, dated Dec. 19, 2017, 5 pages.
"Corrected Notice of Allowance", U.S. Appl. No. 13/118,314, filed Mar. 9, 2017, 3 pages.
"Foreign Notice of Allowance", AU Application No. 2011369365, dated Jan. 25, 2017, 3 pages.
"Foreign Notice of Allowance", AU Application No. 2011375741, dated Feb. 1, 2017, 3 pages.
"Foreign Notice of Allowance", TW Application No. 105106514, dated Feb. 15, 2017, 4 pages.
"Foreign Office Action", CN Application No. 201110454251.3, dated Feb. 4, 2017, 7 pages.
"Foreign Office Action", CN Application No. 201180071193.4, dated Mar. 3, 2017, 10 pages.
"Foreign Office Action", EP Application No. 11866553.8, dated Feb. 8, 2017, 6 pages.
"Foreign Office Action", EP Application No. 11867033.0, dated Feb. 8, 2017, 7 pages.
"Foreign Office Action", IL Application No. 229621, dated Feb. 20, 2017, 6 pages.
"Notice of Allowance", U.S. Appl. No. 14/586,364, filed Apr. 21, 2017, 9 pages.
"Notice of Allowance", U.S. Appl. No. 14/919,607, filed Apr. 14, 2017, 7 pages.
"Adobe Acrobat 8 Standard User Guide", Adobe Systems Incorporated, 2007, pp. 34 & 36.
"Adobe Audition / Customizing Workspaces", Retrieved From: <http://help.adobe.com/en_US/audition/cs/using/WS9FA7B8D7-5991-4e05-B13C-4C85DAF1F051.html> Jul. 5, 2014, May 18, 2011, 6 Pages.
"Advisory Action", U.S. Appl. No. 12/414,382, filed Jan. 20, 2012, 3 pages.
"Advisory Action", U.S. Appl. No. 12/433,605, filed Apr. 5, 2012, 3 pages.
"Advisory Action", U.S. Appl. No. 12/709,376, filed Dec. 19, 2013, 2 pages.
"Advisory Action", U.S. Appl. No. 13/598,422, filed Aug. 31, 2015, 3 pages.
"Alltel Adds Dedicated Search Key to Phones", Retrieved from: <http://www.phonescoop.com/news/item.php?n=2159> on Nov. 26, 2008., Apr. 12, 2007, 2 Pages.
"Android 2.3 User's Guide", AUG-2.3-103, Android mobile technology platform 2.3, Dec. 13, 2010, 380 pages.
"Apple Human Interface Guidelines: Windows", retrieved from <http://developer.apple.com/library/mac/#documentation/UserExperience/Conceptuai/AppleHIGuidelines/XHIGWindows/XHIGWindows.html> on Sep. 28, 2010, Aug. 20, 2009, 59 pages.
"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.
"Apple Unibody MacBook Pro #MB991LL/A 2.53 GHz Intel Core 2 Duo", Retrieved from: <http://www.themacstore.com/parts/show/c-nmb3-mb991ll_a> on Nov. 10, 2009, 2009, 12 pages.

(56) References Cited

OTHER PUBLICATIONS

"Application User Model IDs", Retrieved from: <http://msdn.microsoft.com/en-us/library/dd378459(VS.85).aspx> on Sep. 28, 2010, 2010, 6 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.
"Authoritative Dictionary of IEEE Standards Terms, 7th ed.", Definitions—processor, memory, and storage, 2000, 3 pages.
"Basics of Your Device: Get Familiar with the Home Screen", Nokia USA—How to—retrieved from <http://www.nokia.ca/get-support-and-software/product-support/c6-01/how-to#> on May 11, 2011, 3 pages.
"Blackberry office tools: Qwerty Convert", Retrieved from: <http://blackberrysoftwarelist.net/blackberry/download-software/blackberry-office/qwerty_convert.aspx> on Nov. 20, 2008, Nov. 20, 2008, 1 page.
"Borderless Window Option", retrieved from <http://forums.lotro.com/show1hread.php?89700-Borderless-window-option> on Sep. 28, 2010, Sep. 9, 2007, 9 pages.
"Calc4M", Retrieved from: <http://www.hellebo.com/Calc4M.html> on Dec. 11, 2008, Sep. 10, 2008, 4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/lssue-14/Data-Management/Content-Centric-E-Mail-Message-Analysis-in-Litigation-Document-Reviews/> on May 6, 2009, 2009, 5 Pages.
"Corrected Notice of Allowance", U.S. Appl. No. 13/118,333, filed Jun. 1, 2015, 4 pages.
"Corrected Notice of Allowance", U.S. Appl. No. 13/118,333, filed Aug. 4, 2015, 4 pages.
"Corrected Notice of Allowance", U.S. Appl. No. 13/118,333, filed Sep. 14, 2015, 4 pages.
"Corrected Notice of Allowance", U.S. Appl. No. 13/228,931, filed Oct. 31, 2016, 2 pages.
"Corrected Notice of Allowance", U.S. Appl. No. 13/656,574, filed Jan. 13, 2015, 4 pages.
"Corrected Notice of Allowance", U.S. Appl. No. 13/656,574, filed Dec. 12, 2014, 4 pages.
"Corrected Notice of Allowance", U.S. Appl. No. 13/656,639, filed Dec. 11, 2013, 3 pages.
"Corrected Notice of Allowance", U.S. Appl. No. 13/657,621, filed Oct. 31, 2016, 2 pages.
"Corrected Notice of Allowance", U.S. Appl. No. 14/089,149, filed Feb. 20, 2015, 2 pages.
"Corrected Notice of Allowance", U.S. Appl. No. 14/109,779, filed Jul. 21, 2015, 2 pages.
"Corrected Notice of Allowance", U.S. Appl. No. 14/109,779, filed Oct. 19, 2015, 2 pages.
"Corrected Notice of Allowance", U.S. Appl. No. 14/659,442, filed Nov. 10, 2015, 2 pages.
"Corrected Notice of Allowance", U.S. Appl. No. 14/659,442, filed Nov. 27, 2015, 2 pages.
"Dell and Windows 7—The Wait Is Over", Retrieved from: <http://content.dell.com/us/en/corp/d/press-releases/2009-10-22-Dell-and-Windows-7.aspx> on Nov. 10, 2009, Oct. 22, 2009, 2 pages.
"Dial a number", Retrieved from: <http://www.phonespell.org/ialhelp.html> on Nov. 20, 2008, Nov. 20, 2008, 1 page.
"Display Control", Retrieved From: <http://www.portrait.com/technology/display-control.html> Jul. 4, 2014, Jun. 24, 2013, 5 Pages.
"DuoSense™ Multi-Touch Gestures", Retrieved from: <http://www.n-trig.com/Data/Uploads/Misc/DuoSenseMTG_final.pdf>, Jul. 2008, 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.
"Email Notification for Microsoft Outlook and Outlook Express", Retrieved from: <http://www.contextmagic.com/express-notification/> on Sep. 29, 2010, Jul. 21, 2004, 3 pages.
"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>, Apr. 8, 2008, pp. 1-19.
"Ex Parte Mewherter, PTAB precedential decision", U.S. Appl. No. 10/685,192, filed May 8, 2013, 22 pages.
"Examiner's Answer to Appeal Brief", U.S. Appl. No. 13/224,258, filed Sep. 23, 2016, 12 pages.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.
"Extended European Search Report", EP Application No. 09818253.8, dated Apr. 10, 2012, 7 pages.
"Extended European Search Report", EP Application No. 11851985.9, dated Oct. 7, 2014, 6 pages.
"Extended European Search Report", EP Application No. 11866553.8, dated Dec. 9, 2014, 7 pages.
"Extended European Search Report", EP Application No. 11866579.3, dated Oct. 9, 2014, 7 pages.
"Extended European Search Report", EP Application No. 11866699.9, dated Jan. 15, 2015, 6 pages.
"Extended European Search Report", EP Application No. 11866745.0, dated Jan. 21, 2015, 10 pages.
"Extended European Search Report", EP Application No. 11866772.4, dated Jan. 15, 2015, 6 pages.
"Extended European Search Report", EP Application No. 11866939.9, dated Jan. 15, 2015, 8 pages.
"Extended European Search Report", EP Application No. 11867033.0, dated Nov. 27, 2014, 8 pages.
"Extended European Search Report", EP Application No. 11867076.9, dated Jan. 15, 2015, 8 pages.
"Extended European Search Report", EP Application No. 11871739.6, dated Oct. 5, 2015, 13 pages.
"Extended European Search Report", EP Application No. 11871863.4, dated May 11, 2015, 8 pages.
"Extended European Search Report", EP Application No. 11871917.8, dated May 11, 2015, 9 pages.
"Extended European Search Report", EP Application No. 11872072.1, dated Jul. 28, 2015, 7 pages.
"Extended European Search Report", EP Application No. 11872137.2, dated Apr. 9, 2015, 12 pages.
"Extended European Search Report", EP Application No. 11872164.6, dated Sep. 18, 2015, 8 pages.
"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>, Feb. 2006, 15 pages.
"Final Office Action", U.S. Appl. No. 11/305,789, filed Apr. 1, 2009, 10 pages.
"Final Office Action", U.S. Appl. No. 11/502,264, filed Feb. 4, 2010, 15 pages.
"Final Office Action", U.S. Appl. No. 11/502,264, filed Mar. 29, 2013, 16 pages.
"Final Office Action", U.S. Appl. No. 11/502,264, filed Apr. 3, 2009, 9 pages.
"Final Office Action", U.S. Appl. No. 12/244,545, filed Dec. 7, 2011, 16 pages.
"Final Office Action", U.S. Appl. No. 12/244,545, filed Sep. 7, 2012, 23 pages.
"Final Office Action", U.S. Appl. No. 12/413,977, filed Nov. 17, 2011, 16 pages.
"Final Office Action", U.S. Appl. No. 12/414,382, filed Dec. 23, 2011, 7 pages.

(56) References Cited

OTHER PUBLICATIONS

"Final Office Action", U.S. Appl. No. 12/414,476, filed Dec. 1, 2011, 20 pages.
"Final Office Action", U.S. Appl. No. 12/433,605, filed Feb. 3, 2012, 11 pages.
"Final Office Action", U.S. Appl. No. 12/433,667, filed Sep. 13, 2011, 17 pages.
"Final Office Action", U.S. Appl. No. 12/469,458, filed Nov. 17, 2011, 15 pages.
"Final Office Action", U.S. Appl. No. 12/469,480, filed Feb. 9, 2012, 17 pages.
"Final Office Action", U.S. Appl. No. 12/472,699, filed Jul. 29, 2013, 12 pages.
"Final Office Action", U.S. Appl. No. 12/472,699, filed Feb. 15, 2012, 12 pages.
"Final Office Action", U.S. Appl. No. 12/484,799, filed Apr. 30, 2012, 13 pages.
"Final Office Action", U.S. Appl. No. 12/560,081, filed Mar. 14, 2012, 16 pages.
"Final Office Action", U.S. Appl. No. 12/577,400, filed Jan. 30, 2014, 36 pages.
"Final Office Action", U.S. Appl. No. 12/577,400, filed Aug. 16, 2013, 25 pages.
"Final Office Action", U.S. Appl. No. 12/577,400, filed Sep. 14, 2012, 26 pages.
"Final Office Action", U.S. Appl. No. 12/695,842, filed Dec. 2, 2013, 17 pages.
"Final Office Action", U.S. Appl. No. 12/695,937, filed Jul. 26, 2012, 13 pages.
"Final Office Action", U.S. Appl. No. 12/695,976, filed Nov. 21, 2012, 10 pages.
"Final Office Action", U.S. Appl. No. 12/700,357, filed Oct. 24, 2012, 13 pages.
"Final Office Action", U.S. Appl. No. 12/700,460, filed Aug. 28, 2012, 26 pages.
"Final Office Action", U.S. Appl. No. 12/700,510, filed Oct. 10, 2012, 23 pages.
"Final Office Action", U.S. Appl. No. 12/709,204, filed Sep. 12, 2013, 24 pages.
"Final Office Action", U.S. Appl. No. 12/709,204, filed Oct. 3, 2012, 24 pages.
"Final Office Action", U.S. Appl. No. 12/709,245, filed Mar. 15, 2013, 16 pages.
"Final Office Action", U.S. Appl. No. 12/709,245, filed Jan. 6, 2012, 13 pages.
"Final Office Action", U.S. Appl. No. 12/709,282, filed Dec. 24, 2012, 11 pages.
"Final Office Action", U.S. Appl. No. 12/709,282, filed Jul. 16, 2013, 11 pages.
"Final Office Action", U.S. Appl. No. 12/709,301, filed Jan. 7, 2013, 14 pages.
"Final Office Action", U.S. Appl. No. 12/709,301, filed Sep. 3, 2013, 12 pages.
"Final Office Action", U.S. Appl. No. 12/709,301, filed Mar. 1, 2012, 11 pages.
"Final Office Action", U.S. Appl. No. 12/709,348, filed Jan. 7, 2013, 15 pages.
"Final Office Action", U.S. Appl. No. 12/709,348, filed Sep. 12, 2013, 12 pages.
"Final Office Action", U.S. Appl. No. 12/709,348, filed Feb. 17, 2012, 13 pages.
"Final Office Action", U.S. Appl. No. 12/709,376, filed Sep. 10, 2013, 12 pages.
"Final Office Action", U.S. Appl. No. 12/709,376, filed Nov. 8, 2012, 20 pages.
"Final Office Action", U.S. Appl. No. 12/709,376, filed Mar. 30, 2012, 16 pages.
"Final Office Action", U.S. Appl. No. 12/713,053, filed Aug. 17, 2012, 10 pages.
"Final Office Action", U.S. Appl. No. 12/713,081, filed May 9, 2012, 19 pages.
"Final Office Action", U.S. Appl. No. 12/713,096, filed Feb. 15, 2013, 7 pages.
"Final Office Action", U.S. Appl. No. 12/713,110, filed Jan. 17, 2013, 10 pages.
"Final Office Action", U.S. Appl. No. 12/713,113, filed Oct. 8, 2013, 21 pages.
"Final Office Action", U.S. Appl. No. 12/713,113, filed Jun. 4, 2012, 18 pages.
"Final Office Action", U.S. Appl. No. 12/713,118, filed Oct. 26, 2012, 10 pages.
"Final Office Action", U.S. Appl. No. 12/713,127, filed Jun. 6, 2012, 18 pages.
"Final Office Action", U.S. Appl. No. 12/713,130, filed Jun. 29, 2012, 8 pages.
"Final Office Action", U.S. Appl. No. 12/713,133, filed May 20, 2013, 10 pages.
"Final Office Action", U.S. Appl. No. 12/713,133, filed Jul. 2, 2012, 8 pages.
"Final Office Action", U.S. Appl. No. 12/721,422, filed Mar. 7, 2013, 10 pages.
"Final Office Action", U.S. Appl. No. 12/972,967, filed Oct. 11, 2013, 21 pages.
"Final Office Action", U.S. Appl. No. 12/977,235, filed Apr. 22, 2015, 19 pages.
"Final Office Action", U.S. Appl. No. 12/977,235, filed Nov. 3, 2016, 27 pages.
"Final Office Action", U.S. Appl. No. 12/983,106, filed Jul. 16, 2015, 23 pages.
"Final Office Action", U.S. Appl. No. 12/983,106, filed Oct. 7, 2013, 19 pages.
"Final Office Action", U.S. Appl. No. 13/073,300, filed Apr. 1, 2014, 14 pages.
"Final Office Action", U.S. Appl. No. 13/073,300, filed Sep. 4, 2015, 17 pages.
"Final Office Action", U.S. Appl. No. 13/118,181, filed Jun. 16, 2016, 18 pages.
"Final Office Action", U.S. Appl. No. 13/118,181, filed Dec. 20, 2013, 18 pages.
"Final Office Action", U.S. Appl. No. 13/118,204, filed Nov. 21, 2013, 24 pages.
"Final Office Action", U.S. Appl. No. 13/118,221, filed Mar. 17, 2014, 21 pages.
"Final Office Action", U.S. Appl. No. 13/118,265, filed Nov. 6, 2014, 19 pages.
"Final Office Action", U.S. Appl. No. 13/118,288, filed Nov. 7, 2014, 14 pages.
"Final Office Action", U.S. Appl. No. 13/118,292, filed Aug. 26, 2016, 38 pages.
"Final Office Action", U.S. Appl. No. 13/118,292, filed Dec. 5, 2014, 30 pages.
"Final Office Action", U.S. Appl. No. 13/118,302, filed Mar. 25, 2016, 22 pages.
"Final Office Action", U.S. Appl. No. 13/118,302, filed Aug. 15, 2014, 17 pages.
"Final Office Action", U.S. Appl. No. 13/118,314, filed Jan. 13, 2016, 16 pages.
"Final Office Action", U.S. Appl. No. 13/118,314, filed Sep. 11, 2014, 18 pages.
"Final Office Action", U.S. Appl. No. 13/118,321, filed Apr. 2, 2015, 30 pages.
"Final Office Action", U.S. Appl. No. 13/118,321, filed Dec. 19, 2013, 30 pages.
"Final Office Action", U.S. Appl. No. 13/118,333, filed Apr. 23, 2014, 22 pages.
"Final Office Action", U.S. Appl. No. 13/118,339, filed Aug. 22, 2013, 21 pages.
"Final Office Action", U.S. Appl. No. 13/118,347, filed Aug. 15, 2013, 25 pages.
"Final Office Action", U.S. Appl. No. 13/224,258, filed Jul. 18, 2014, 39 pages.

(56) References Cited

OTHER PUBLICATIONS

"Final Office Action", U.S. Appl. No. 13/224,258, filed Aug. 13, 2015, 39 pages.
"Final Office Action", U.S. Appl. No. 13/224,258, filed Sep. 11, 2013, 37 pages.
"Final Office Action", U.S. Appl. No. 13/228,707, filed May 21, 2014, 16 pages.
"Final Office Action", U.S. Appl. No. 13/228,707, filed Jun. 1, 2015, 20 pages.
"Final Office Action", U.S. Appl. No. 13/228,707, filed Aug. 23, 2016, 33 pages.
"Final Office Action", U.S. Appl. No. 13/228,876, filed Jun. 19, 2015, 20 pages.
"Final Office Action", U.S. Appl. No. 13/228,876, filed Jul. 18, 2014, 15 pages.
"Final Office Action", U.S. Appl. No. 13/228,876, filed Sep. 13, 2016, 21 pages.
"Final Office Action", U.S. Appl. No. 13/228,888, filed Oct. 24, 2014, 29 pages.
"Final Office Action", U.S. Appl. No. 13/228,931, filed Dec. 19, 2014, 27 pages.
"Final Office Action", U.S. Appl. No. 13/228,945, filed Oct. 23, 2014, 24 pages.
"Final Office Action", U.S. Appl. No. 13/229,155, filed Jun. 4, 2015, 16 pages.
"Final Office Action", U.S. Appl. No. 13/229,155, filed Jun. 12, 2014, 15 pages.
"Final Office Action", U.S. Appl. No. 13/229,693, filed Jan. 6, 2015, 24 pages.
"Final Office Action", U.S. Appl. No. 13/229,693, filed Sep. 4, 2013, 23 pages.
"Final Office Action", U.S. Appl. No. 13/229,702, filed Jan. 15, 2015, 24 pages.
"Final Office Action", U.S. Appl. No. 13/345,383, filed Jul. 25, 2014, 26 pages.
"Final Office Action", U.S. Appl. No. 13/345,383, filed Jul. 30, 2013, 27 pages.
"Final Office Action", U.S. Appl. No. 13/484,075, filed May 21, 2013, 10 pages.
"Final Office Action", U.S. Appl. No. 13/550,432, filed Sep. 14, 2015, 18 pages.
"Final Office Action", U.S. Appl. No. 13/598,422, filed Jun. 23, 2015, 19 pages.
"Final Office Action", U.S. Appl. No. 13/598,422, filed Aug. 6, 2014, 33 pages.
"Final Office Action", U.S. Appl. No. 13/655,386, filed Jun. 6, 2013, 34 pages.
"Final Office Action", U.S. Appl. No. 13/656,354, filed Jun. 17, 2013, 14 pages.
"Final Office Action", U.S. Appl. No. 13/656,574, filed Aug. 23, 2013, 20 pages.
"Final Office Action", U.S. Appl. No. 13/657,621, filed Jan. 15, 2015, 22 pages.
"Final Office Action", U.S. Appl. No. 13/657,621, filed Jan. 21, 2016, 21 pages.
"Final Office Action", U.S. Appl. No. 13/657,621, filed Sep. 10, 2013, 18 pages.
"Final Office Action", U.S. Appl. No. 13/657,646, filed May 6, 2013, 12 pages.
"Final Office Action", U.S. Appl. No. 13/657,789, filed Jun. 21, 2013, 35 pages.
"Final Office Action", U.S. Appl. No. 13/658,694, filed Mar. 30, 2015, 30 pages.
"Final Office Action", U.S. Appl. No. 13/658,694, filed Oct. 30, 2013, 17 pages.
"Final Office Action", U.S. Appl. No. 14/059,163, filed Dec. 3, 2015, 6 pages.
"First Examination Report", NZ Application No. 618254, dated May 20, 2014, 3 Pages.
"First Examination Report", NZ Application No. 618264, dated May 20, 2014, 2 pages.
"First Examination Report", NZ Application No. 618269, dated May 20, 2014, 2 pages.
"First Examination Report", NZ Application No. 618284, dated May 20, 2014, 2 pages.
"Foreign Notice of Acceptance", NZ Application No. 618254, dated Jan. 20, 2015, 1 Page.
"Foreign Notice of Acceptance", NZ Application No. 618264, dated Jun. 27, 2015, 1 Page.
"Foreign Notice of Acceptance", NZ Application No. 618269, dated Oct. 31, 2014, 1 Page.
"Foreign Notice of Allowance", CN Application No. 201110429183.5, dated Mar. 9, 2015, 4 Pages.
"Foreign Notice of Allowance", CN Application No. 201110437542.1, dated Aug. 3, 2015, 4 Pages.
"Foreign Notice of Allowance", CN Application No. 201110437572.2, dated Mar. 3, 2015, 3 Pages.
"Foreign Notice of Allowance", CN Application No. 201180071183.0, dated Sep. 27, 2016, 6 pages.
"Foreign Notice of Allowance", CN Application No. 201210317470.1, dated Feb. 23, 2016, 4 pages.
"Foreign Notice of Allowance", CN Application No. 201210331158.8, dated Sep. 8, 2015, 3 Pages.
"Foreign Notice of Allowance", CN Application No. 201210331584.1, dated Feb. 14, 2016, 4 pages.
"Foreign Notice of Allowance", CN Application No. 201210331670.2, dated Apr. 26, 2016, 4 pages.
"Foreign Notice of Allowance", JP Application No. 2014-512819, dated Jan. 26, 2016, 4 pages.
"Foreign Notice of Allowance", JP Application No. 2014-512821, dated Jun. 28, 2016, 4 pages.
"Foreign Notice of Allowance", JP Application No. 2014-528371, dated Oct. 4, 2016, 4 pages.
"Foreign Notice of Allowance", JP Application No. 2014-529687, dated May 31, 2016, 4 pages.
"Foreign Notice of Allowance", RU Application No. 2013152634, dated Jul. 22, 2016, 19 pages.
"Foreign Notice of Allowance", RU Application No. 2013152636, dated Feb. 19, 2016, 18 pages.
"Foreign Notice of Allowance", RU Application No. 2014107906, dated Apr. 25, 2016, 18 pages.
"Foreign Notice of Allowance", RU Application No. 2014108997, dated May 26, 2016, 17 pages.
"Foreign Notice of Allowance", TW Application No. 100136568, dated May 31, 2016, 4 pages.
"Foreign Office Action", Application No. MX/a/2013/013923, dated Sep. 13, 2016, 10 pages.
"Foreign Office Action", Application No. MX/a/2014/002507, dated Aug. 9, 2016, 7 pages.
"Foreign Office Action", AU Application No. 2011369360, dated Jul. 23, 2016, 3 pages.
"Foreign Office Action", AU Application No. 2011369365, dated Oct. 7, 2016, 3 pages.
"Foreign Office Action", AU Application No. 2011369370, dated Aug. 4, 2016, 3 pages.
"Foreign Office Action", AU Application No. 2011375741, dated Sep. 14, 2016, 4 pages.
"Foreign Office Action", AU Application No. 2011376310, dated Sep. 10, 2016, 3 pages.
"Foreign Office Action", AU Application No. 2011376311, dated Sep. 10, 2016, 3 pages.
"Foreign Office Action", CL Application No. 3368-2013, dated May 7, 2015, 7 pages.
"Foreign Office Action", CL Application No. 3369-13, dated Oct. 29, 2015, 6 pages.
"Foreign Office Action", CL Application No. 3369-2013, dated May 7, 2015, 6 pages.
"Foreign Office Action", CL Application No. 3370-2013, dated May 7, 2015, 6 pages.
"Foreign Office Action", CL Application No. 3370-2013, dated Oct. 29, 2015, 6 pages.

(56) References Cited

OTHER PUBLICATIONS

"Foreign Office Action", CN Application No. 201110454251.3, dated May 27, 2016, 6 Pages.
"Foreign Office Action", CN Application No. 201080045865.X, dated Dec. 4, 2012, 10 pages.
"Foreign Office Action", CN Application No. 201080045865.X, dated Jun. 4, 2013, 10 pages.
"Foreign Office Action", CN Application No. 201110044285.5, dated Apr. 24, 2013, 8 pages.
"Foreign Office Action", CN Application No. 201110044285.5, dated Jun. 20, 2012, 12 pages.
"Foreign Office Action", CN Application No. 201110044285.5, dated Jan. 4, 2013, 13 pages.
"Foreign Office Action", CN Application No. 201110046510.9, dated May 31, 2013, 11 pages.
"Foreign Office Action", CN Application No. 201110046519.X, dated Mar. 19, 2013, 12 pages.
"Foreign Office Action", CN Application No. 201110046519.X, dated Aug. 2, 2012, 13 pages.
"Foreign Office Action", CN Application No. 201110046529.3, dated Feb. 4, 2013, 9 pages.
"Foreign Office Action", CN Application No. 201110046529.3, dated Aug. 16, 2012, 14 pages.
"Foreign Office Action", CN Application No. 201110050499.3, dated Nov. 27, 2012, 8 pages.
"Foreign Office Action", CN Application No. 201110050499.3, dated Aug. 3, 2012, 8 pages.
"Foreign Office Action", CN Application No. 201110050506.X, dated Apr. 2, 2013, 11 pages.
"Foreign Office Action", CN Application No. 201110050508.9, dated Mar. 7, 2013, 8 pages.
"Foreign Office Action", CN Application No. 201110050508.9, dated Aug. 3, 2012, 8 pages.
"Foreign Office Action", CN Application No. 201110050852.8, dated Mar. 26, 2013, 11 pages.
"Foreign Office Action", CN Application No. 201110429183.5, dated Jan. 6, 2014, 10 Pages.
"Foreign Office Action", CN Application No. 201110429183.5, dated Aug. 21, 2014, 13 Pages.
"Foreign Office Action", CN Application No. 201110437542.1, dated Jan. 6, 2014, 10 Pages.
"Foreign Office Action", CN Application No. 201110437542.1, dated Jan. 28, 2015, 7 pages.
"Foreign Office Action", CN Application No. 201110437542.1, dated Aug. 20, 2014, 8 pages.
"Foreign Office Action", CN Application No. 201110437551.0, dated Mar. 25, 2015, 9 pages.
"Foreign Office Action", CN Application No. 201110437572.2, dated Dec. 3, 2013, 7 pages.
"Foreign Office Action", CN Application No. 201110454251.3, dated Feb. 28, 2015, 9 Pages.
"Foreign Office Action", CN Application No. 201110454251.3, dated Sep. 30, 2015, 10 Pages.
"Foreign Office Action", CN Application No. 201110454251.3, dated Oct. 21, 2014, 13 Pages.
"Foreign Office Action", CN Application No. 201110454251.3, dated Dec. 27, 2013, 12 Pages.
"Foreign Office Action", CN Application No. 201180071183.0, dated Jan. 28, 2016, 18 pages.
"Foreign Office Action", CN Application No. 201180071186.4, dated Jan. 20, 2015, 8 pages.
"Foreign Office Action", CN Application No. 201180071186.4, dated Jun. 2, 2015, 7 pages.
"Foreign Office Action", CN Application No. 201180071186.4, dated Jun. 13, 2014, 12 pages.
"Foreign Office Action", CN Application No. 201180071190.0, dated Jan. 26, 2016, 16 pages.
"Foreign Office Action", CN Application No. 201180071190.0, dated May 17, 2016, 7 pages.
"Foreign Office Action", CN Application No. 201180071194.9, dated Nov. 27, 2015, 17 pages.
"Foreign Office Action", CN Application No. 201180071195.3, dated Mar. 18, 2015, 8 pages.
"Foreign Office Action", CN Application No. 201180071195.3, dated Aug. 25, 2014, 15 pages.
"Foreign Office Action", CN Application No. 201180071196.8, dated Sep. 11, 2014, 13 pages.
"Foreign Office Action", CN Application No. 201180071200.0, dated Feb. 17, 2015, 12 pages.
"Foreign Office Action", CN Application No. 201180071200.0, dated Aug. 19, 2014, 15 pages.
"Foreign Office Action", CN Application No. 201210085754.2, dated Apr. 5, 2016, 16 pages.
"Foreign Office Action", CN Application No. 201210317470.1, dated Feb. 11, 2015, 9 pages.
"Foreign Office Action", CN Application No. 201210317470.1, dated Jun. 5, 2014, 12 pages.
"Foreign Office Action", CN Application No. 201210317470.1, dated Aug. 24, 2015, 9 pages.
"Foreign Office Action", CN Application No. 201210331158.8, dated May 11, 2015, 7 pages.
"Foreign Office Action", CN Application No. 201210331158.8, dated Sep. 3, 2014, 16 Pages.
"Foreign Office Action", CN Application No. 201210331188.9, dated Oct. 10, 2014, 12 pages.
"Foreign Office Action", CN Application No. 201210331564.4, dated Sep. 2, 2015, 14 pages.
"Foreign Office Action", CN Application No. 201210331564.4, dated Dec. 3, 2014, 12 pages.
"Foreign Office Action", CN Application No. 201210331584.1, dated Aug. 19, 2015, 7 pages.
"Foreign Office Action", CN Application No. 201210331584.1, dated Nov. 3, 2014, 14 pages.
"Foreign Office Action", CN Application No. 201210331670.2, dated Mar. 25, 2015, 14 pages.
"Foreign Office Action", CN Application No. 201210331670.2, dated Dec. 1, 2015, 14 pages.
"Foreign Office Action", CN Application No. 201210331686.3, dated Mar. 3, 2015, 14 pages.
"Foreign Office Action", CN Application No. 201210331686.3, dated Jun. 13, 2014, 13 pages.
"Foreign Office Action", CN Application No. 201210331686.3, dated Sep. 1, 2015, 11 pages.
"Foreign Office Action", CO Application No. 13-298.756, dated Sep. 18, 2014, 13 Pages.
"Foreign Office Action", CO Application No. 13-298.756, dated Oct. 11, 2015, 11 pages.
"Foreign Office Action", CO Application No. 13300256, dated Apr. 11, 2015, 8 Pages.
"Foreign Office Action", CO Application No. 13300256, dated Sep. 24, 2014, 8 Pages.
"Foreign Office Action", CO Application No. 13300259, dated Sep. 24, 2014, 15 Pages.
"Foreign Office Action", CO Application No. 13300265, dated Apr. 21, 2015, 11 Pages.
"Foreign Office Action", CO Application No. 13300265, dated Sep. 24, 2014, 10 Pages.
"Foreign Office Action", EP Application No. 10823883.3, dated Aug. 10, 2012, 5 pages.
"Foreign Office Action", EP Application No. 11747907.1, dated Jan. 28, 2013, 5 pages.
"Foreign Office Action", EP Application No. 11748026.9, dated Jan. 16, 2013, 5 pages.
"Foreign Office Action", EP Application No. 11748027.7, dated Jan. 18, 2013, 5 pages.
"Foreign Office Action", EP Application No. 11748028.5, dated Jan. 28, 2013, 5 pages.
"Foreign Office Action", EP Application No. 11748029.3, dated Jan. 16, 2013, 5 pages.
"Foreign Office Action", EP Application No. 11866579.3, dated Apr. 5, 2016, 4 pages.

(56) References Cited

OTHER PUBLICATIONS

"Foreign Office Action", EP Application No. 11866579.3, dated Sep. 3, 2015, 4 pages.
"Foreign Office Action", EP Application No. 11866699.9, dated Feb. 3, 2016, 4 pages.
"Foreign Office Action", EP Application No. 11866699.9, dated Sep. 20, 2016, 4 pages.
"Foreign Office Action", EP Application No. 11866772.4, dated Feb. 2, 2016, 5 pages.
"Foreign Office Action", EP Application No. 1866699.9, dated Feb. 3, 2016, 4 pages.
"Foreign Office Action", IL Application No. 229140, dated May 8, 2016, 6 pages.
"Foreign Office Action", IL Application No. 229622, dated Feb. 15, 2016, 6 pages.
"Foreign Office Action", JP Application No. 2012-534255, dated Aug. 15, 2014, 6 Pages.
"Foreign Office Action", JP Application No. 2014-512819, dated Sep. 29, 2015, 4 pages.
"Foreign Office Action", JP Application No. 2014-512820, dated Mar. 22, 2016, 5 pages.
"Foreign Office Action", JP Application No. 2014-512820, dated Sep. 29, 2015, 10 pages.
"Foreign Office Action", JP Application No. 2014-512821, dated Oct. 20, 2015, 5 pages.
"Foreign Office Action", JP Application No. 2014-512824, dated Jun. 7, 2016, 6 pages.
"Foreign Office Action", JP Application No. 2014-512824, dated Nov. 6, 2015, 5 pages.
"Foreign Office Action", JP Application No. 2014-528371, dated Jun. 7, 2016, 5 pages.
"Foreign Office Action", JP Application No. 2014-528371, dated Sep. 29, 2015, 16 pages.
"Foreign Office Action", JP Application No. 2014-529671, dated Sep. 29, 2015, 16 pages.
"Foreign Office Action", JP Application No. 2014-529672, dated Oct. 6, 2015, 7 pages.
"Foreign Office Action", JP Application No. 2014-529684, dated Nov. 4, 2015, 10 pages.
"Foreign Office Action", JP Application No. 2014-529685, dated Apr. 5, 2016, 6 pages.
"Foreign Office Action", JP Application No. 2014-529685, dated Nov. 4, 2015, 5 pages.
"Foreign Office Action", JP Application No. 2014-529687, dated Oct. 20, 2015, 8 pages.
"Foreign Office Action", PH Application No. 12013502355, dated Jan. 19, 2016, 5 pages.
"Foreign Office Action", PH Application No. 1-2013-502364, dated Jan. 19, 2016, 4 pages.
"Foreign Office Action", PH Application No. 1-2013-502367, dated Jun. 15, 2016, 2 pages.
"Foreign Office Action", PH Application No. PH/1/2013/502367, dated Apr. 24, 2015, 3 pages.
"Foreign Office Action", RU Application No. 2013152630, dated Oct. 26, 2015, 5 pages.
"Foreign Office Action", RU Application No. 2013152634, dated Oct. 22, 2015, 7 pages.
"Foreign Office Action", RU Application No. 2013152635, dated Oct. 28, 2015, 7 pages.
"Foreign Office Action", RU Application No. 2013152636, dated Oct. 16, 2015, 11 pages.
"Foreign Office Action", RU Application No. 2014107906, dated Oct. 6, 2015, 6 pages.
"Foreign Office Action", RU Application No. 2014108844, dated Jun. 23, 2016, 6 pages.
"Foreign Office Action", RU Application No. 2014108844, dated Oct. 27, 2015, 6 pages.
"Foreign Office Action", RU Application No. 2014108874, dated Oct. 6, 2015, 6 pages.

"Foreign Office Action", RU Application No. 2014108997, dated Oct. 14, 2015, 6 pages.
"Freeware.mobi", Retrieved from: <http://www.palmfreeware.mobi/download-palette.html> on Nov. 6, 2008, Oct. 9, 2001, 2 pages.
"Further Examination Report", NZ Application No. 618264, dated Dec. 3, 2014, 3 Pages.
"Further Examination Report", NZ Application No. 618284, dated Jul. 13, 2015, 2 pages.
"Gestures Programming", Retrieved from <http://doc.qt.digia.com/4.6/gestures-overview.html> on May 28, 2014, 2010, 3 pages.
"GnomeCanvas", Retrieved from: <http://library.gnome.org/devel/libgnomecanvas/unstable/GnomeCanvas.html> on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"HTC Shows HTC Snap with Snappy Email Feature", Retrieved from: <http://www.wirelessandmobilenews.com/smartphones/ on May 5, 2009>, May 4, 2009, 10 Pages.
"Image Gestures Example", Retrieved from <http://doc.qt.digia.com/4.6/gestures-imagegestures.html> on May 28, 2014, 2010, 3 pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"International Preliminary Report on Patentability", Application No. PCT/US2015/042226, dated Nov. 2, 2016, 7 pages.
"International Preliminary Report on Patentability", Application No. PCT/US2015/042218, dated Nov. 3, 2016, 7 pages.
"International Preliminary Report on Patentability", Application No. PCT/US2015/042205, dated Nov. 8, 2016, 7 pages.
"International Preliminary Report on Patentability", Application No. PCT/US2015/042259, dated Sep. 16, 2016, 8 pages.
"International Preliminary Report on Patentability", Application No. PCT/US2015/042371, dated Oct. 20, 2016, 8 pages.
"International Preliminary Report on Patentability", Application No. PCT/US2015/041930, dated Oct. 26, 2016, 9 pages.
"International Search Report and Written Opinion", Application No. PCT/US2010/028555, dated Oct. 12, 2010, 10 pages.
"International Search Report and Written Opinion", Application No. PCT/US2011/025132, dated Oct. 26, 2011, 10 pages.
"International Search Report and Written Opinion", Application No. PCT/US2011/025131, dated Oct. 31, 2011, 10 pages.
"International Search Report and Written Opinion", Application No. PCT/US2010/028699, dated Oct. 4, 2010, 10 pages.
"International Search Report and Written Opinion", Application No. PCT/US2013/060247, dated Dec. 10, 2013, 10 pages.
"International Search Report and Written Opinion", Application No. PCT/US2011/067075, dated Dec. 12, 2012, 10 pages.
"International Search Report and Written Opinion", Application No. PCT/US2009/061864, dated May 14, 2010, 10 pages.
"International Search Report and Written Opinion", Application No. PCT/US2009/061382, dated May 26, 2010, 10 pages.
"International Search Report and Written Opinion", Application No. PCT/US2011/067074, dated Aug. 27, 2012, 10 pages.
"International Search Report and Written Opinion", Application No. PCT/US2011/055725, dated Sep. 27, 2012, 10 pages.
"International Search Report and Written Opinion", Application No. PCT/US2009/061735, dated Jun. 7, 2010, 11 pages.
"International Search Report and Written Opinion", Application No. PCT/US2013/055507, dated Oct. 8, 2013, 12 pages.
"International Search Report and Written Opinion", Application No. PCT/US2015/048751, dated Nov. 27, 2015, 12 pages.

(56) References Cited

OTHER PUBLICATIONS

"International Search Report and Written Opinion", Application No. PCT/US2010/034772, dated Dec. 29, 2010, 12 pages.
"International Search Report and Written Opinion", Application No. PCT/US2011/025973, dated Oct. 27, 2011, 13 pages.
"International Search Report and Written Opinion", Application No. PCT/US/2011025972, dated Sep. 30, 2011, 14 pages.
"International Search Report and Written Opinion", Application No. PCT/US2011/025575, dated Sep. 30, 2011, 14 pages.
"International Search Report and Written Opinion", Application No. PCT/US2011/025971, dated Oct. 31, 2011, 15 pages.
"International Search Report and Written Opinion", Application No. PCT/US2012/047091, dated Dec. 27, 2012, 15 pages.
"International Search Report and Written Opinion", Application No. PCT/US2010/038730, dated Jan. 19, 2011, 8 pages.
"International Search Report and Written Opinion", Application No. PCT/US2011/020417, dated Oct. 20, 2011, 8 pages.
"International Search Report and Written Opinion", Application No. PCT/US2011/025974, dated Oct. 26, 2011, 8 pages.
"International Search Report and Written Opinion", Application No. PCT/US2011/055513, dated Mar. 27, 2012, 8 pages.
"International Search Report and Written Opinion", Application No. PCT/US2010/052119, dated May 2, 2011, 8 pages.
"International Search Report and Written Opinion", Application No. PCT/US2011/055514, dated May 22, 2012, 8 pages.
"International Search Report and Written Opinion", Application No. PCT/US2011/055512, dated May 24, 2012, 8 pages.
"International Search Report and Written Opinion", Application No. PCT/US2011/055520, dated May 9, 2012, 8 pages.
"International Search Report and Written Opinion", Application No. PCT/US2011/055524, dated Jun. 1, 2012, 8 pages.
"International Search Report and Written Opinion", Application No. PCT/US2011/065702, dated Aug. 29, 2012, 8 pages.
"International Search Report and Written Opinion", Application No. PCT/US2011/055736, dated Sep. 17, 2012, 8 pages.
"International Search Report and Written Opinion", Application No. PCT/US2011/067073, dated Sep. 17, 2012, 8 pages.
"International Search Report and Written Opinion", Application No. PCT/US2011/055511, dated Apr. 24, 2012, 9 pages.
"International Search Report and Written Opinion", Application No. PCT/US2011/055523, dated May 10, 2012, 9 pages.
"International Search Report and Written Opinion", Application No. PCT/US2011/055521, dated May 15, 2012, 9 pages.
"International Search Report and Written Opinion", Application No. PCT/US2011/055522, dated May 15, 2012, 9 pages.
"International Search Report and Written Opinion", Application No. PCT/US2011/020412, dated Aug. 31, 2011, 9 pages.
"International Search Report and Written Opinion", Application No. PCT/US2011/055496, dated Sep. 12, 2012, 9 pages.
"International Search Report and Written Opinion", Application No. PCT/US2011/055712, dated Sep. 21, 2012, 9 pages.
"International Search Report and Written Opinion", Application No. PCT/US2011/055493, dated 9/26/212, 9 pages.
"International Search Report and Written Opinion", Application No. PCT/US2011/020410, dated Sep. 27, 2011, 9 pages.
"International Search Report and Written Opinion", Application No. PCT/US2011/055478, dated Sep. 27, 2012, 9 pages.
"International Search Report and Written Opinion", Application No. PCT/US2011/055746, dated Sep. 27, 2012, 9 pages.
"International Search Report and Written Opinion", Application No. PCT/US2010/028553, Application Filing Date: Mar. 24, 2010, dated Nov. 9, 2010, 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introduction to Windows 7", https://www.google.com/url?q=http://www.wright.edu/sites/default/files/page/attachements/windows7.pdf, Jul. 1, 2010, 13 pages.

"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"iOS Human Interface Guidelines", Apple Inc, Retrieved at<<https://itunes.apple.com/in/book/ios-human-interface-guidelines/id877942287?mt=11>>, Mar. 23, 2011, 2 pages.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc., 2009, 153 pages.
"iQuery & Css Example—Dropdown Menu", DesignReviver, Retrieved from: <http://designreviver.com/tutorials/jquery-css-example-dropdown-menu/> on Nov. 22, 2011, Oct. 7, 2008, 30 pages.
"KDE 4.0 Visual Guide: Desktop", Retrieved From: http://kde.org/announcements/4.0/desktop/php, Nov. 23, 2011, 8 Pages.
"Keyboard (5)", Retrieved from: <http://landru.uwaterloo.ca/cgi-bin/man.cgi?section=5&topic=keyboard> on Dec. 11, 2008., Aug. 11, 1997, 8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x, Aug. 16, 2007, 2 pages.
"Live Photo Gallery—Getting Started—from Camera to Panorama", Retrieved from: <http://webdotwiz.spaces.live.com/blog/cns!2782760752B93233!729.entry> on May 5, 2009., Sep. 2008, 7 Pages.
"Magic mouse", Retrieved from: <http://www.apple.com/magicmouse/> on May 10, 2011, 3 pages.
"Manage Multiple Windows", Retrieved From: <http://windows.microsoft.com/en-hk/windows/manage-multiple-windows#1TC=windows-7> Jul. 8, 2014, 4 Pages.
"MIDTB Tip Sheet: Book Courier", Retrieved from: <http://www.midtb.org/tipsbookcourier.htm> on Dec. 11, 2008., Sep. 26, 2005, 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.
"moGo beta v.0.4", Retrieved from: <http://forum.xda-developers.com/showthread.php?t=375196> on Sep. 27, 2010, Mar. 7, 2008, 10 pages.
"Multi-touch", Retrieved from <http://en.wikipedia.org/wiki/Multi-touch#Microsoft_Surface> on Apr. 24, 2009, Apr. 17, 2009, 8 pages.
"My Favorite Gadgets, System Monitor II", Retrieved from <http://www.myfavoritegadgets.info/monitors/SystemMonitorII/systemmonitorII.html> on Mar. 12, 2013, Jun. 8, 2010, 5 pages.
"New Features in WhatsUp Gold v12.0", retrieved from <http://www.netbright.co.th/?name=product&file=readproduct&id=12> on Jun. 10, 2011, 4 pages.
"New MS Courier Leak Details Multi-Touch Interface", Retrieved from: <http://www.electronista.com/articles/09/11/04/courier.gestures.ui.explained/> on Nov. 10, 2009, Nov. 4, 2009, 9 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Non-Final Office Action", U.S. Appl. No. 13/228,707, filed Oct. 25, 2013, 12 pages.
"Non-Final Office Action", U.S. Appl. No. 13/228,888, filed Feb. 10, 2014, 21 pages.
"Non-Final Office Action", U.S. Appl. No. 11/215,052, filed Jun. 23, 2011, 17 pages.
"Non-Final Office Action", U.S. Appl. No. 11/305,789, filed Sep. 21, 2009, 5 pages.
"Non-Final Office Action", U.S. Appl. No. 11/502,264, filed Sep. 30, 2009, 15 pages.
"Non-Final Office Action", U.S. Appl. No. 11/502,264, filed Sep. 14, 2012, 14 pages.

(56) References Cited

OTHER PUBLICATIONS

"Non-Final Office Action", U.S. Appl. No. 12/244,545, filed Mar. 27, 2012, 18 pages.
"Non-Final Office Action", U.S. Appl. No. 12/244,545, filed Aug. 17, 2011, 15 pages.
"Non-Final Office Action", U.S. Appl. No. 12/413,977, filed Jul. 19, 2011, 17 pages.
"Non-Final Office Action", U.S. Appl. No. 12/413,977, filed Jul. 20, 2012, 18 pages.
"Non-Final Office Action", U.S. Appl. No. 12/414,382, filed Jul. 26, 2011, 9 pages.
"Non-Final Office Action", U.S. Appl. No. 12/414,434, filed Jan. 17, 2012, 7 pages.
"Non-Final Office Action", U.S. Appl. No. 12/414,434, filed May 31, 2012, 7 pages.
"Non-Final Office Action", U.S. Appl. No. 12/414,434, filed Aug. 2, 2011, 6 pages.
"Non-Final Office Action", U.S. Appl. No. 12/414,455, filed Aug. 29, 2011, 8 pages.
"Non-Final Office Action", U.S. Appl. No. 12/414,458, filed Jul. 6, 2011, 8 pages.
"Non-Final Office Action", U.S. Appl. No. 12/414,476, filed Nov. 9, 2012, 22 pages.
"Non-Final Office Action", U.S. Appl. No. 12/414,476, filed Aug. 3, 2011, 21 pages.
"Non-Final Office Action", U.S. Appl. No. 12/433,605, filed Jun. 24, 2011, 10 pages.
"Non-Final Office Action", U.S. Appl. No. 12/433,667, filed Jun. 7, 2011, 15 pages.
"Non-Final Office Action", U.S. Appl. No. 12/433,667, filed Feb. 3, 2012, 16 pages.
"Non-Final Office Action", U.S. Appl. No. 12/469,419, filed Nov. 9, 2011, 15 pages.
"Non-Final Office Action", U.S. Appl. No. 12/469,419, filed May 23, 2012, 13 pages.
"Non-Final Office Action", U.S. Appl. No. 12/469,458, filed Jul. 1, 2011, 15 pages.
"Non-Final Office Action", U.S. Appl. No. 12/469,458, filed Sep. 21, 2012, 14 pages.
"Non-Final Office Action", U.S. Appl. No. 12/469,480, filed Oct. 17, 2012, 16 pages.
"Non-Final Office Action", U.S. Appl. No. 12/469,480, filed Sep. 22, 2011, 14 pages.
"Non-Final Office Action", U.S. Appl. No. 12/470,558, filed Nov. 22, 2011, 9 pages.
"Non-Final Office Action", U.S. Appl. No. 12/472,699, filed Mar. 28, 2013, 10 pages.
"Non-Final Office Action", U.S. Appl. No. 12/472,699, filed Oct. 23, 2013, 14 pages.
"Non-Final Office Action", U.S. Appl. No. 12/472,699, filed Sep. 12, 2011, 12 pages.
"Non-Final Office Action", U.S. Appl. No. 12/480,969, filed Aug. 7, 2012, 15 pages.
"Non-Final Office Action", U.S. Appl. No. 12/484,799, filed Aug. 11, 2011, 12 pages.
"Non-Final Office Action", U.S. Appl. No. 12/484,799, filed Aug. 7, 2012, 13 pages.
"Non-Final Office Action", U.S. Appl. No. 12/484,845, filed Dec. 7, 2011, 16 pages.
"Non-Final Office Action", U.S. Appl. No. 12/560,081, filed Dec. 7, 2011, 16 pages.
"Non-Final Office Action", U.S. Appl. No. 12/577,400, filed Apr. 15, 2013, 25 pages.
"Non-Final Office Action", U.S. Appl. No. 12/577,400, filed Oct. 8, 2013, 24 pages.
"Non-Final Office Action", U.S. Appl. No. 12/577,400, filed Apr. 11, 2012, 22 pages.
"Non-Final Office Action", U.S. Appl. No. 12/695,842, filed May 22, 2013, 16 pages.
"Non-Final Office Action", U.S. Appl. No. 12/695,842, filed Oct. 3, 2012, 16 pages.
"Non-Final Office Action", U.S. Appl. No. 12/695,937, filed Apr. 25, 2012, 14 pages.
"Non-Final Office Action", U.S. Appl. No. 12/695,976, filed Sep. 11, 2012, 8 pages.
"Non-Final Office Action", U.S. Appl. No. 12/700,357, filed Jul. 2, 2012, 10 pages.
"Non-Final Office Action", U.S. Appl. No. 12/700,460, filed Jan. 13, 2012, 21 pages.
"Non-Final Office Action", U.S. Appl. No. 12/700,510, filed Feb. 7, 2012, 20 pages.
"Non-Final Office Action", U.S. Appl. No. 12/709,204, filed Jun. 6, 2013, 27 pages.
"Non-Final Office Action", U.S. Appl. No. 12/709,204, filed Nov. 20, 2013, 31 pages.
"Non-Final Office Action", U.S. Appl. No. 12/709,204, filed May 10, 2012, 20 pages.
"Non-Final Office Action", U.S. Appl. No. 12/709,245, filed May 30, 2013, 15 pages.
"Non-Final Office Action", U.S. Appl. No. 12/709,245, filed Nov. 30, 2011, 11 pages.
"Non-Final Office Action", U.S. Appl. No. 12/709,245, filed Mar. 21, 2012, 14 pages.
"Non-Final Office Action", U.S. Appl. No. 12/709,282, filed Feb. 28, 2013, 11 pages.
"Non-Final Office Action", U.S. Appl. No. 12/709,282, filed Oct. 10, 2013, 12 pages.
"Non-Final Office Action", U.S. Appl. No. 12/709,282, filed Apr. 12, 2012, 9 pages.
"Non-Final Office Action", U.S. Appl. No. 12/709,301, filed May 14, 2013, 14 pages.
"Non-Final Office Action", U.S. Appl. No. 12/709,301, filed Oct. 24, 2013, 11 pages.
"Non-Final Office Action", U.S. Appl. No. 12/709,301, filed Nov. 28, 2011, 9 pages.
"Non-Final Office Action", U.S. Appl. No. 12/709,301, filed Sep. 13, 2012, 13 pages.
"Non-Final Office Action", U.S. Appl. No. 12/709,348, filed Apr. 25, 2013, 15 pages.
"Non-Final Office Action", U.S. Appl. No. 12/709,348, filed Dec. 20, 2013, 9 pages.
"Non-Final Office Action", U.S. Appl. No. 12/709,348, filed Dec. 7, 2011, 12 pages.
"Non-Final Office Action", U.S. Appl. No. 12/709,348, filed Aug. 2, 2012, 14 pages.
"Non-Final Office Action", U.S. Appl. No. 12/709,376, filed May 23, 2013, 17 pages.
"Non-Final Office Action", U.S. Appl. No. 12/709,376, filed Jan. 23, 2012, 14 pages.
"Non-Final Office Action", U.S. Appl. No. 12/709,376, filed Aug. 17, 2012, 17 pages.
"Non-Final Office Action", U.S. Appl. No. 12/713,053, filed Nov. 23, 2012, 13 pages.
"Non-Final Office Action", U.S. Appl. No. 12/713,053, filed Feb. 3, 2012, 8 pages.
"Non-Final Office Action", U.S. Appl. No. 12/713,081, filed Nov. 29, 2012, 9 pages.
"Non-Final Office Action", U.S. Appl. No. 12/713,081, filed Dec. 23, 2011, 18 pages.
"Non-Final Office Action", U.S. Appl. No. 12/713,096, filed Jan. 30, 2014, 23 pages.
"Non-Final Office Action", U.S. Appl. No. 12/713,096, filed Jun. 26, 2013, 8 pages.
"Non-Final Office Action", U.S. Appl. No. 12/713,096, filed Jun. 6, 2012, 9 pages.
"Non-Final Office Action", U.S. Appl. No. 12/713,110, filed May 3, 2013, 10 pages.
"Non-Final Office Action", U.S. Appl. No. 12/713,110, filed Jun. 21, 2012, 21 pages.
"Non-Final Office Action", U.S. Appl. No. 12/713,113, filed Apr. 23, 2013, 18 pages.

(56) References Cited

OTHER PUBLICATIONS

"Non-Final Office Action", U.S. Appl. No. 12/713,113, filed Dec. 22, 2011, 20 pages.
"Non-Final Office Action", U.S. Appl. No. 12/713,118, filed Jun. 8, 2012, 7 pages.
"Non-Final Office Action", U.S. Appl. No. 12/713,127, filed Jan. 31, 2014, 21 pages.
"Non-Final Office Action", U.S. Appl. No. 12/713,127, filed Dec. 27, 2011, 22 pages.
"Non-Final Office Action", U.S. Appl. No. 12/713,130, filed Jan. 16, 2013, 5 pages.
"Non-Final Office Action", U.S. Appl. No. 12/713,130, filed Jan. 23, 2012, 7 pages.
"Non-Final Office Action", U.S. Appl. No. 12/713,133, filed Jan. 14, 2013, 8 pages.
"Non-Final Office Action", U.S. Appl. No. 12/713,133, filed Jan. 31, 2012, 7 pages.
"Non-Final Office Action", U.S. Appl. No. 12/713,133, filed Dec. 10, 2013, 8 pages.
"Non-Final Office Action", U.S. Appl. No. 12/721,422, filed Oct. 1, 2012, 7 pages.
"Non-Final Office Action", U.S. Appl. No. 12/972,967, filed Jan. 30, 2013, 19 pages.
"Non-Final Office Action", U.S. Appl. No. 12/972,967, filed Nov. 6, 2014, 17 pages.
"Non-Final Office Action", U.S. Appl. No. 12/977,235, filed Feb. 4, 2016, 19 pages.
"Non-Final Office Action", U.S. Appl. No. 12/977,235, filed Jun. 24, 2014, 15 pages.
"Non-Final Office Action", U.S. Appl. No. 12/977,584, filed Dec. 7, 2012, 8 pages.
"Non-Final Office Action", U.S. Appl. No. 12/978,184, filed Jan. 23, 2013, 7 pages.
"Non-Final Office Action", U.S. Appl. No. 12/983,106, filed Sep. 10, 2014, 19 pages.
"Non-Final Office Action", U.S. Appl. No. 12/983,106, filed Nov. 9, 2012, 17 pages.
"Non-Final Office Action", U.S. Appl. No. 13/073,300, filed Apr. 30, 2015, 15 pages.
"Non-Final Office Action", U.S. Appl. No. 13/073,300, filed Jul. 25, 2013, 13 pages.
"Non-Final Office Action", U.S. Appl. No. 13/118,181, filed Mar. 4, 2013, 22 pages.
"Non-Final Office Action", U.S. Appl. No. 13/118,181, filed Oct. 23, 2015, 15 pages.
"Non-Final Office Action", U.S. Appl. No. 13/118,204, filed Feb. 28, 2013, 13 pages.
"Non-Final Office Action", U.S. Appl. No. 13/118,221, filed Mar. 1, 2013, 22 pages.
"Non-Final Office Action", U.S. Appl. No. 13/118,221, filed May 19, 2016, 14 pages.
"Non-Final Office Action", U.S. Appl. No. 13/118,221, filed Oct. 7, 2015, 8 pages.
"Non-Final Office Action", U.S. Appl. No. 13/118,257, filed Mar. 5, 2013, 19 pages.
"Non-Final Office Action", U.S. Appl. No. 13/118,265, filed Jun. 10, 2014, 13 pages.
"Non-Final Office Action", U.S. Appl. No. 13/118,265, filed Aug. 20, 2015, 18 pages.
"Non-Final Office Action", U.S. Appl. No. 13/118,288, filed Jul. 2, 2014, 17 pages.
"Non-Final Office Action", U.S. Appl. No. 13/118,288, filed Aug. 24, 2015, 19 pages.
"Non-Final Office Action", U.S. Appl. No. 13/118,292, filed Jun. 6, 2014, 25 pages.
"Non-Final Office Action", U.S. Appl. No. 13/118,292, filed Dec. 7, 2015, 32 pages.
"Non-Final Office Action", U.S. Appl. No. 13/118,302, filed Mar. 4, 2014, 10 pages.
"Non-Final Office Action", U.S. Appl. No. 13/118,302, filed Aug. 12, 2016, 34 pages.
"Non-Final Office Action", U.S. Appl. No. 13/118,302, filed Nov. 6, 2015, 21 pages.
"Non-Final Office Action", U.S. Appl. No. 13/118,314, filed Feb. 27, 2014, 13 pages.
"Non-Final Office Action", U.S. Appl. No. 13/118,314, filed Jun. 19, 2015, 23 pages.
"Non-Final Office Action", U.S. Appl. No. 13/118,314, filed Jun. 30, 2016, 16 pages.
"Non-Final Office Action", U.S. Appl. No. 13/118,321, filed Jun. 10, 2013, 32 pages.
"Non-Final Office Action", U.S. Appl. No. 13/118,321, filed Sep. 8, 2015, 34 pages.
"Non-Final Office Action", U.S. Appl. No. 13/118,321, filed Nov. 12, 2014, 33 pages.
"Non-Final Office Action", U.S. Appl. No. 13/118,333, filed Jul. 5, 2013, 18 pages.
"Non-Final Office Action", U.S. Appl. No. 13/118,339, filed Feb. 11, 2013, 15 pages.
"Non-Final Office Action", U.S. Appl. No. 13/118,339, filed Dec. 10, 2014, 16 pages.
"Non-Final Office Action", U.S. Appl. No. 13/118,347, filed Feb. 12, 2013, 14 pages.
"Non-Final Office Action", U.S. Appl. No. 13/118,347, filed Dec. 3, 2014, 28 pages.
"Non-Final Office Action", U.S. Appl. No. 13/196,272, filed Feb. 6, 2013, 10 pages.
"Non-Final Office Action", U.S. Appl. No. 13/196,272, filed Sep. 3, 2013, 5 pages.
"Non-Final Office Action", U.S. Appl. No. 13/224,258, filed Jan. 8, 2013, 35 pages.
"Non-Final Office Action", U.S. Appl. No. 13/228,707, filed Apr. 19, 2016, 26 pages.
"Non-Final Office Action", U.S. Appl. No. 13/228,707, filed Nov. 13, 2014, 20 pages.
"Non-Final Office Action", U.S. Appl. No. 13/228,876, filed Jan. 29, 2015, 18 pages.
"Non-Final Office Action", U.S. Appl. No. 13/228,876, filed May 12, 2016, 20 pages.
"Non-Final Office Action", U.S. Appl. No. 13/228,876, filed Nov. 22, 2013, 14 pages.
"Non-Final Office Action", U.S. Appl. No. 13/228,931, filed Mar. 24, 2016, 22 pages.
"Non-Final Office Action", U.S. Appl. No. 13/228,931, filed Apr. 7, 2014, 21 pages.
"Non-Final Office Action", U.S. Appl. No. 13/228,945, filed Jul. 21, 2016, 20 pages.
"Non-Final Office Action", U.S. Appl. No. 13/228,945, filed Apr. 14, 2014, 22 pages.
"Non-Final Office Action", U.S. Appl. No. 13/229,155, filed Jan. 7, 2015, 14 pages.
"Non-Final Office Action", U.S. Appl. No. 13/229,155, filed Nov. 18, 2013, 14 pages.
"Non-Final Office Action", U.S. Appl. No. 13/229,556, filed Mar. 28, 2014, 12 pages.
"Non-Final Office Action", U.S. Appl. No. 13/229,693, filed Mar. 12, 2013, 21 pages.
"Non-Final Office Action", U.S. Appl. No. 13/229,693, filed Apr. 23, 2015, 28 pages.
"Non-Final Office Action", U.S. Appl. No. 13/229,693, filed Jun. 20, 2014, 25 pages.
"Non-Final Office Action", U.S. Appl. No. 13/229,702, filed Jul. 3, 2014, 28 pages.
"Non-Final Office Action", U.S. Appl. No. 13/229,709, filed Apr. 7, 2014, 12 pages.
"Non-Final Office Action", U.S. Appl. No. 13/345,263, filed Oct. 24, 2013, 19 Pages.
"Non-Final Office Action", U.S. Appl. No. 13/345,383, filed Feb. 14, 2014, 26 pages.
"Non-Final Office Action", U.S. Appl. No. 13/345,383, filed Jan. 29, 2015, 5 pages.

(56) References Cited

OTHER PUBLICATIONS

"Non-Final Office Action", U.S. Appl. No. 13/345,383, filed Feb. 28, 2013, 25 pages.
"Non-Final Office Action", U.S. Appl. No. 13/484,075, filed Jan. 15, 2013, 9 pages.
"Non-Final Office Action", U.S. Appl. No. 13/492,495, filed Dec. 19, 2012, 6 pages.
"Non-Final Office Action", U.S. Appl. No. 13/492,495, filed Sep. 17, 2012, 8 pages.
"Non-Final Office Action", U.S. Appl. No. 13/550,432, filed Apr. 27, 2015, 15 pages.
"Non-Final Office Action", U.S. Appl. No. 13/550,432, filed Jun. 16, 2016, 18 pages.
"Non-Final Office Action", U.S. Appl. No. 13/598,422, filed Feb. 21, 2014, 31 pages.
"Non-Final Office Action", U.S. Appl. No. 13/598,422, filed Mar. 5, 2015, 17 pages.
"Non-Final Office Action", U.S. Appl. No. 13/655,386, filed Dec. 26, 2012, 23 pages.
"Non-Final Office Action", U.S. Appl. No. 13/655,390, filed Dec. 17, 2012, 12 pages.
"Non-Final Office Action", U.S. Appl. No. 13/656,354, filed Feb. 6, 2013, 10 pages.
"Non-Final Office Action", U.S. Appl. No. 13/656,574, filed Jan. 31, 2013, 21 pages.
"Non-Final Office Action", U.S. Appl. No. 13/656,639, filed Feb. 7, 2013, 29 pages.
"Non-Final Office Action", U.S. Appl. No. 13/657,621, filed Feb. 7, 2013, 19 pages.
"Non-Final Office Action", U.S. Appl. No. 13/657,621, filed Jul. 18, 2014, 22 pages.
"Non-Final Office Action", U.S. Appl. No. 13/657,646, filed Aug. 12, 2014, 14 pages.
"Non-Final Office Action", U.S. Appl. No. 13/657,646, filed Jan. 3, 2013, 13 pages.
"Non-Final Office Action", U.S. Appl. No. 13/657,789, filed Jan. 9, 2013, 38 pages.
"Non-Final Office Action", U.S. Appl. No. 13/658,694, filed Feb. 13, 2014, 19 pages.
"Non-Final Office Action", U.S. Appl. No. 13/658,694, filed Apr. 26, 2013, 13 pages.
"Non-Final Office Action", U.S. Appl. No. 13/658,694, filed Aug. 14, 2014, 26 pages.
"Non-Final Office Action", U.S. Appl. No. 14/059,163, filed Aug. 10, 2015, 5 pages.
"Non-Final Office Action", U.S. Appl. No. 14/089,149, filed Nov. 3, 2014, 8 pages.
"Non-Final Office Action", U.S. Appl. No. 14/109,779, filed Nov. 21, 2014, 9 pages.
"Non-Final Office Action", U.S. Appl. No. 14/448,911, filed Oct. 31, 2016, 22 pages.
"Non-Final Office Action", U.S. Appl. No. 14/448,946, filed Oct. 27, 2016, 17 pages.
"Non-Final Office Action", U.S. Appl. No. 14/522,420, filed Apr. 22, 2016, 21 pages.
"Non-Final Office Action", U.S. Appl. No. 14/522,420, filed Aug. 15, 2016, 20 pages.
"Non-Final Office Action", U.S. Appl. No. 14/659,442, filed Jul. 7, 2015, 7 pages.
"Non-Final Office Action", U.S. Appl. No. 14/850,347, filed Jun. 16, 2016, 26 pages.
"Non-Final Office Action", U.S. Appl. No. 14/918,358, filed Oct. 13, 2016, 9 pages.
"Non-Final Office Action", U.S. Appl. No. 14/918,359, filed Nov. 22, 2016, 9 pages.
"Non-Final Office Action", U.S. Appl. No. 14/919,607, dated Sep. 23, 2016, 11 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
"Notice of Allowance", U.S. Appl. No. 11/215,052, filed Mar. 14, 2012, 5 pages.
"Notice of Allowance", U.S. Appl. No. 11/305,789, filed Nov. 23, 2009, 8 pages.
"Notice of Allowance", U.S. Appl. No. 12/414,382, filed Apr. 4, 2012, 4 pages.
"Notice of Allowance", U.S. Appl. No. 12/414,434, filed Aug. 17, 2012, 4 pages.
"Notice of Allowance", U.S. Appl. No. 12/414,455, filed Jan. 4, 2012, 4 pages.
"Notice of Allowance", U.S. Appl. No. 12/414,458, filed Oct. 31, 2011, 2 pages.
"Notice of Allowance", U.S. Appl. No. 12/414,458, filed Nov. 29, 2011, 2 pages.
"Notice of Allowance", U.S. Appl. No. 12/414,458, filed Aug. 10, 2011, 6 pages.
"Notice of Allowance", U.S. Appl. No. 12/470,558, filed Apr. 2, 2012, 7 pages.
"Notice of Allowance", U.S. Appl. No. 12/470,558, filed Aug. 23, 2012, 2 pages.
"Notice of Allowance", U.S. Appl. No. 12/472,699, filed May 2, 2014, 6 pages.
"Notice of Allowance", U.S. Appl. No. 12/484,799, filed Oct. 22, 2012, 10 pages.
"Notice of Allowance", U.S. Appl. No. 12/484,845, filed Mar. 16, 2012, 5 pages.
"Notice of Allowance", U.S. Appl. No. 12/695,064, filed Mar. 28, 2012, 12 pages.
"Notice of Allowance", U.S. Appl. No. 12/695,959, filed Apr. 17, 2012, 13 pages.
"Notice of Allowance", U.S. Appl. No. 12/713,053, filed Jun. 7, 2013, 7 pages.
"Notice of Allowance", U.S. Appl. No. 12/713,110, dated Dec. 4, 2013, 13 pages.
"Notice of Allowance", U.S. Appl. No. 12/713,130, dated Feb. 19, 2013, 5 pages.
"Notice of Allowance", U.S. Appl. No. 12/713,133, dated Jan. 17, 2014, 4 pages.
"Notice of Allowance", U.S. Appl. No. 12/721,422, dated Jul. 11, 2013, 9 pages.
"Notice of Allowance", U.S. Appl. No. 12/977,584, dated Jun. 19, 2013, 5 pages.
"Notice of Allowance", U.S. Appl. No. 12/978,184, dated Nov. 6, 2013, 5 pages.
"Notice of Allowance", U.S. Appl. No. 12/978,184, dated Aug. 2, 2013, 5 pages.
"Notice of Allowance", U.S. Appl. No. 12/983,106, dated Jun. 6, 2016, 17 pages.
"Notice of Allowance", U.S. Appl. No. 13/073,300, dated Feb. 12, 2016, 9 pages.
"Notice of Allowance", U.S. Appl. No. 13/118,204, dated Jul. 8, 2014, 8 pages.
"Notice of Allowance", U.S. Appl. No. 13/118,333, dated May 4, 2015, 16 pages.
"Notice of Allowance", U.S. Appl. No. 13/118,339, dated Mar. 31, 2015, 7 pages.
"Notice of Allowance", U.S. Appl. No. 13/118,347, dated Apr. 1, 2015, 7 pages.
"Notice of Allowance", U.S. Appl. No. 13/196,272, dated Nov. 8, 2013, 8 pages.
"Notice of Allowance", U.S. Appl. No. 13/228,931, dated Sep. 23, 2016, 10 pages.
"Notice of Allowance", U.S. Appl. No. 13/229,556, dated Sep. 2, 2014, 12 pages.
"Notice of Allowance", U.S. Appl. No. 13/229,693, dated Sep. 14, 2015, 13 pages.
"Notice of Allowance", U.S. Appl. No. 13/229,702, dated Apr. 29, 2015, 7 pages.
"Notice of Allowance", U.S. Appl. No. 13/229,709, dated Sep. 2, 2014, 4 pages.
"Notice of Allowance", U.S. Appl. No. 13/345,383, dated May 18, 2015, 5 pages.

(56) References Cited

OTHER PUBLICATIONS

"Notice of Allowance", U.S. Appl. No. 13/492,495, dated Apr. 26, 2013, 5 pages.
"Notice of Allowance", U.S. Appl. No. 13/655,386, dated Apr. 25, 2014, 6 pages.
"Notice of Allowance", U.S. Appl. No. 13/655,390, dated May 24, 2013, 5 pages.
"Notice of Allowance", U.S. Appl. No. 13/656,574, dated Sep. 23, 2014, 7 pages.
"Notice of Allowance", U.S. Appl. No. 13/656,639, dated Aug. 19, 2013, 14 pages.
"Notice of Allowance", U.S. Appl. No. 13/657,621, dated Aug. 26, 2016, 9 pages.
"Notice of Allowance", U.S. Appl. No. 13/657,646, dated Feb. 6, 2015, 15 pages.
"Notice of Allowance", U.S. Appl. No. 13/657,789, dated Aug. 4, 2014, 16 pages.
"Notice of Allowance", U.S. Appl. No. 13/658,694, dated Jan. 7, 2016, 20 pages.
"Notice of Allowance", U.S. Appl. No. 14/059,163, dated Apr. 25, 2016, 7 pages.
"Notice of Allowance", U.S. Appl. No. 14/089,149, dated Dec. 5, 2014, 4 pages.
"Notice of Allowance", U.S. Appl. No. 14/109,779, dated Jun. 17, 2015, 4 pages.
"Notice of Allowance", U.S. Appl. No. 14/659,442, dated Aug. 19, 2015, 4 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle Mobile Sales Assistant User Guide for BlackBerry", Retrieved from <http://download.oracle.com/docs/cd/E12547_01/books/PDF/MobileSalesAsstBB.pdf.>, Nov. 2008, 20 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Organize Your Desktop Workspace for More Comfort with WindowSpace", Retrieved From: <http://www.ntwind.com/software/windowspace.html> Jul. 4, 2014, Sep. 19, 2008, 5 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"QPinchGesture Class Reference", Retrieved from <http://doc.qt.digia.eom/4.6/qpinchgesture.html> on May 28, 2014, 2010, 6 pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"Rename a file", Retrieved from <http://windows.microsoft.com/en-us/windows7/rename-a-file> on Apr. 27, 2015, Aug. 24, 2009, 1 page.
"Restriction Requirement", U.S. Appl. No. 13/118,265, dated Feb. 27, 2014, 7 pages.
"Restriction Requirement", U.S. Appl. No. 13/118,288, dated Mar. 4, 2014, 7 pages.
"Restriction Requirement", U.S. Appl. No. 13/658,694, dated Feb. 6, 2013, 6 pages.
"Samsung Galaxy 2 TouchWiz 4.0 Tour (Homescreen, Settings, etc)", https://www.youtube.com/watch?v=oXBbiy0Adiw, May 9, 2011, 3 pages.
"Search Report", CN Application No. 201110437551.0, dated Dec. 23, 2013, 2 pages.
"Search Report", TW Application No. 100136568, dated Sep. 14, 2015, 2 pages.
"Second Written Opinion", Application No. PCT/US2015/048751, dated Jul. 12, 2016, 5 pages.
"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, Dec. 15, 2008, 3 pages.
"Shottrack for Windows VoD Software Analysis", Retrieved From: http://www.matrixconsult.com.au/MATRIX_Web_Files/ShotTrack_Software_Manual.pdf, Nov. 23, 2011, 47 Pages.
"SizeUp The Missing Window Manager", Retrieved From: <https://www.irradiatedsoftware.com/sizeup/> Jul. 4, 2014, Jan. 17, 2013, 4 Pages.
"Snap", Windows 7 Features—retrieved from <http://windows.microsoft.com/en-US/windows7/products/features/snap> on Sep. 23, 2011, 2 pages.
"Split the Windows® Desktop: How to Divide a Single Large Desktop into Multiple Smaller Ones", retrieved from <http://www.actualtools.com/multiplemonitors/split-windows-desktop-how-to-divide-single-large-desktop-into-smaller-ones.shtml> on Jul. 7, 2014, Apr. 10, 2014, 3 pages.
"Supplemental Notice of Allowance", U.S. Appl. No. 12/713,133, dated Feb. 3, 2014, 2 pages.
"Supplemental Notice of Allowance", U.S. Appl. No. 12/977,584, dated Sep. 16, 2013, 2 pages.
"Supplemental Notice of Allowance", U.S. Appl. No. 12/977,584, dated Oct. 11, 2013, 2 pages.
"Supplemental Notice of Allowance", U.S. Appl. No. 12/978,184, dated Feb. 25, 2014, 2 pages.
"Supplemental Notice of Allowance", U.S. Appl. No. 13/118,204, dated Sep. 10, 2014, 2 pages.
"Supplemental Notice of Allowance", U.S. Appl. No. 13/118,204, dated Oct. 2, 2014, 2 pages.
"Supplemental Notice of Allowance", U.S. Appl. No. 13/118,204, dated Oct. 23, 2014, 3 pages.
"Supplemental Notice of Allowance", U.S. Appl. No. 13/655,390, dated Sep. 19, 2013, 2 pages.
"Supplemental Notice of Allowance", U.S. Appl. No. 13/655,390, dated Jul. 25, 2013, 2 pages.
"Supplemental Notice of Allowance", U.S. Appl. No. 13/656,574, dated Feb. 25, 2015, 4 pages.
"Supplemental Notice of Allowance", U.S. Appl. No. 14/089,149, dated Mar. 20, 2015, 2 pages.
"Supplementary European Search Report", EP Application No. 11747907.1, dated Nov. 7, 2012, 3 pages.
"Supplementary European Search Report", EP Application No. 11748027.7, dated Nov. 29, 2012, 3 pages.
"Supplementary European Search Report", EP Application No. 11748028.5, dated Nov. 7, 2012, 3 pages.
"Supplementary European Search Report", European Patent Application No. 10823883.3, dated Jul. 31, 2012, 3 pages.
"Symbian Applications", Retrieved from: <http://symbianfullversion.blogspot.com/2008_12_01_archive.html> on May 5, 2009., Jan. 2009, 51 Pages.
"The Map Screen", retrieved from <http://www.symbianos.org/whereamiusersguide> on Jun. 17, 2011, 3 pages.
"The Start Menu (overview)", retrieved from <http://web.archive.org/web/20101219151141/http://www.windows.microsoft.com/en-US/windows-vista/The-Start-menu-overview> on Feb. 12, 2013, Dec. 19, 2010, 5 pages.
"ThumbJot", Retrieved form <http://thumbjot.com/wp/?page_id=8>, 2008, 2 pages.
"Top 3 Task Switchers for Android", TechCredo—retrieved from <http://www.techcredo.com/android/top-3-task-switchers-for-android> on May 11, 2011, Mar. 9, 2011, 5 pages.

(56) References Cited

OTHER PUBLICATIONS

"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"UI Guidelines Version 2.1", Retrieved from: http://na.blackberry.com/eng/deliverables/6622/BlackBerry_Smartphones-US.pdf., 76 Pages.
"User Guide", retrieved from <http://wireframesketcher.com/help/help.html> on Jun. 17, 2011, 19 pages.
"Vista—User Experiences: Site-Centric Browsing on Windows", retrieved from <http://www.vistax64.com/vista-news/283040-user-experiences-site-centric-browsing-windows.html> on Sep. 28, 2010, 6 pages.
"What You Should Expect from the Windows 7 Beta", Retrieved From: http://www.howtogeek.com/howto/the-geek-blog/what-you-should-expect-from-the-windows-7-beta/, Nov. 23, 2011, 17 Pages.
"Window Desktop", Retrieved From: http://pjnicholson.com/windowsdesktop.htm, Nov. 23, 2011, 4 Pages.
"Window Frames", MSDN, retrieved from <http://msdn.microsoft.com/en-us/library/aa974173.aspx> on Sep. 28, 2010, 7 pages.
"Window Magnet", Retrieved From: <http://magnet.crowdcafe.com/> Jul. 4, 2014, Jun. 23, 2011, 2 Pages.
"Windows 8 Is Gorgeous, But Is It More Than Just A Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOFFICE tutorial!—retrieved from <http://www.msoffice-tutorial.com/working-with-multiple-windows.php> on Sep. 23, 2011, 3 pages.
"Working with Windows", Retrieved From: http://h30097.www3hp.com/docs/base_doc/documentation/F40F html/AQ917BTE/docu_004.htm,, Nov. 23, 2011, 14 pages.
"Working with Windows", Retrieved From: <http://windows.microsoft.com/en-us/windows/working-with-windows#1TC=windows-7> Jul. 4, 2014, 10 Pages.
"You've Got Mail 1.4 Build", retrieved from <http://www.fileshome.com/Shows_Animation_Plays_Sound_Automatic_N . . . > on Jan. 6, 2010, Jun. 18, 2007, 2 pages.
"YUI 3: ScrollView [beta]", Retrieved from: <http://developer.yahoo.com/yui/3/scrollview/> on Sep. 28, 2010, 5 pages.
Alexander,"MeeGo Basics", retrieved from <http://meego.com/developers/ui-design-guidelines/handset/meego-basics> on Sep. 28, 2010, Jun. 29, 2010, 8 pages.
Anson,"Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.
Appleinsider,"Special Report: Apple's Touch-Sensitive iPod Ambitions Disclosed in Filing", Retrieved from: <http://www.appleinsider.com/articles/06/10/26/special_report_apples_touch_sensitive_ipod_ambitions_disclosed_in_filing.html> on Nov. 11, 2009, Oct. 26, 2006, 10 pages.
Ashraf,"Winsplit Revolution: Tile, Resize, and Position Windows for Efficient Use of Your Screen", Retrieved From: <http://dottech.org/11240/winsplit-revolution-tile-resize-and-position-windows-for-efficient-use-of-your-screen/> Jul. 8, 2014, Dec. 18, 2011, 4 Pages.
Banerjee,"Using Facebook, Twitter and Google Plus from a Single Browser Tab—A Complete Guide", Retrieved from: <http://www.ampercent.com/post-to-google-plus-facebook-twitter-one-location/9597/> on Feb. 15, 2012, Aug. 3, 2011, 11 pages.
Bates,"A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf>, 1996, 8 pages.
Bederson,"Implementing a Zooming User Interface: Experience Building Pad++", Software Practice & Experience, Wiley & Sons, Aug. 1998, 34 pages.
Bederson,"Jazz: An Extensible Zoomable User Interface Graphics Toolkit in Java", Proceedings of the 2000 ACM SIGCPR Conference, Apr. 2000, 11 pages.
Beiber,"Screen Coverage: A Pen-Interaction Problem for PDA's and Touch Screen Computers", In Proceedings of ICWMC 2007, Mar. 2007, 6 pages.
Bjork,"Redefining the Focus and Context of Focus+Context Visualizations", In Proceedings of INFOVIS 2000—Available at <http://www.johan.redstrom.se/papers/redefining.pdf>, Oct. 2000, 9 pages.
Bowes,"Transparency for Item Highlighting", Faculty of Computing Science, Dalhousie University—Available at <http://torch.cs.dal.ca/~dearman/pubs/GI2003-bowes,dearman,perkins-paper.pdf>, 2003, 2 pages.
Brandl,"Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories, May 2008, 10 pages.
Bruzzese,"Using Windows 7, Managing and Monitoring Windows 7—Chapter 11", Que Publishing, May 5, 2010, 33 pages.
Budiu,"Usability of iPad Apps and Websites", Retrieved at<<https://tdougher.expressions.syr.edu/wrt307fall12/files/2012/08/ipad-usability_report_1st-edition-1.pdf>>, Dec. 31, 2010, 98 pages.
Buring,"User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&type=pdf>, Sep. 2006, pp. 829-836.
Camick,"Wrap Layout", Java Tips Weblog, retrieved from <https://tips4java.wordpress.com/2008/11/06/wrap-layout/> on Jan. 11, 2015, Nov. 6, 2008, 28 pages.
Carrera,"Conserving Disk Energy in Network Servers", available at <http://citeseerx.ist.psu.edu/viewdoc/download?doi=10.1.1.6.8301&rep=rep1&type=ps>, Nov. 2002, 15 pages.
Cawley,"How to Customize Your Windows Phone 7", Retrieved from: <http://www.brighthub.com/mobile/windows-mobile-platform/articles/95213.aspx> on May 10, 2011, Nov. 12, 2010, 3 pages.
Cawley,"Windows Phone 7 Customization Tips and Tricks", retrieved from <http://www.brighthub.com/mobile/windows-mobile-platform/articles/95213.aspx> on Jun. 20, 2011, May 16, 2011, 2 pages.
Cohen,"Automatic Strategies in the Siemens RTL Tiled Window Manager", In Proceedings: The 2nd IEEE Conference on Computer Workstations, Mar. 7, 1988, pp. 111-119.
Cohen,"Wang Tiles for Image and Texture Generation", In Proceedings of SIGGRAPH 2003—Available <http://research.microsoft.com/en-us/um/people/cohen/WangFinal.pdf>, 2003, 8 pages.
D,"Android Apps in Depth—02—Go Launcher EX", https://www.youtube.com/watch?v=u5LISE8BU_E, Mar. 6, 2011, 3 pages.
D,"Android HTC EVO 4G Tutorials 01—Getting Started, Home Screens", https://www.youtube.com/watch?v=fwvt-rsCMA8, Feb. 3, 2011, 3 pages.
Damien,"7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.
Daniels,"Brave New World", Retrieved from: <http://bookseller-association.blogspot.com/2009_03_01_archive.html> on Nov. 10, 2009, Mar. 2009, 54 pages.
Danish,"Win7sé Brings Mac-Like Screen Corners to Windows 7 & Windows 8", retrieved from <http://technomondo.com/2011/11/13/win7se-brings-mac-like-screen-corners-to-windows-7-windows8/> on Nov. 23, 2011, Nov. 13, 2011, 4 pages.

(56) References Cited

OTHER PUBLICATIONS

Davis,"A WPF Custom Control for Zooming and Panning", Retrieved from: <http://www.codeproject.com/KB/WPF/zoomandpancontrol.aspx> on Sep. 28, 2010, Jun. 29, 2010, 21 pages.
Delimarsky,"Sending Tile Push Notifications on Windows Phone 7", retrieved from <http://mobile.dzone.com/articles/sending-tile-push> on May 10, 2011, Aug. 25, 2010, 2 pages.
Demers,"In Depth: GO Launcher EX—Droid Life", http://www.droid-life.com/2011/01/26/in-depth-go-launcher-ex/, Jan. 26, 2011, 8 pages.
Denoue,"WebNC: Efficient Sharing of Web Applications", In Proceedings of WWW 2009—Available at <http://www.fxpal.com/publications/FXPAL-PR-09-495.pdf>, 2009, 2 pages.
Dixon,"Living in the Online Cloud: The T-Mobile G1 / Google Android Smartphone", Retrieved from <http://www.manifest-tech.com/media_pda/t-mobile_g1_android.htm>, Dec. 2008, 3 pages.
Dolcourt,"Webware", Retrieved from: <http://news.cnet.com/webware/?categoryId=2010> on May 5, 2009., May 5, 2009, 13 Pages.
Dunsmuir,"Selective Semantic Zoom of a Document Collection", Available at <http://www.cs.ubc.ca/~tmm/courses/533/projects/dustin/proposal.pdf>, Oct. 30, 2009, pp. 1-9.
Elliott,"First Dell, Then HP: What's Next for N-trig's Multitouch Screen Technology", Retrieved from: <http://news.cnet.com/8301-17938_105-10107886-1.html> on Nov. 11, 2009, Nov. 25, 2008, 5 pages.
Emigh,"Lenovo Launches Windows 7 ThinkPads with Multitouch and Outdoor Screens", Retrieved from: <http://www.betanews.com/article/Lenovo-launches-Windows-7-ThinkPads-with-multitouch-and-outdoor-screens/1253017166> on Nov. 11, 2009, Sep. 15, 2009, 3 pages.
Farrugia,"Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, Oct. 21, 2008, 2 pages.
Fisher,"Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.
Gade,"Samsung Alias u740", Retrieved from: <http://www.mobiletechreview.com/phones/Samsung-U740.htm> on Nov. 20, 2008, Mar. 14, 2007, 6 pages.
Gao,"A General Logging Service for Symbian based Mobile Phones", Retrieved from: <http://www.nada.kth.se/utbildning/grukth/exjobb/rapportlistor/2007/rapporter07/gao_rui_0_7132.pdf.> on Jul. 17, 2008, Feb. 2007, pp. 1-42.
Gladisch,"MultiStates:Monitoring Databases With Acoustic and Intuitive Perspective Wall Interaction", In Proceedings of 2nd International Workshop on Design & Evaluation of e-Government Applications and Services, Aug. 24, 2009, 7 pages.
Gralla,"Windows XP Hacks, Chapter 13—Hardware Hacks", O'Reilly Publishing, Feb. 23, 2005, 25 pages.
Gross,"Stretch-A-Sketch: A Dynamic Diagrammer", IEEE Symposium on Visual Languages, Available at <http://depts.washington.edu/dmachine/PAPER/VL94/vl.html>, Oct. 1994, 11 pages.
Ha,"SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.
Harrison,"Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press, Jun. 16, 2003, 4 pages.
Hickey,"Google Android has Landed; T-Mobile, HTC Unveil G1", Retrieved from: <http://www.crn.com/retail/210603348> on Nov. 26, 2008., Sep. 23, 2008, 4 pages.
Hinckley,"Codex: A Dual Screen Tablet Computer", Conference on Human Factors in Computing Systems, Apr. 9, 2009, 10 pages.
Hinckley,"Stitching: Pen Gestures that Span Multiple Displays", CHI 2004, Available at <http://www.cs.cornell.edu/~francois/Papers/2004-Hinckley-AVI04-Stitching.>, 2004, pp. 1-8.
Hollister,"Windows 8 Primer: How to Navigate Microsoft's New Operating System", retrieved from <http://www.theverge.com/2012/10/28/3562172/windows-8-gestures-keyboard-shortcuts-tips-tricks-how-to-guide> on Aug. 7, 2014, Oct. 28, 2012, 30 pages.
Horowitz,"Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.
Janecek,"An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf> , Feb. 15, 2005, pp. 1-15.
Jetter,"Materializing the Query with Facet-Streams—A Hybrid Surface for Collaborative Search on Tabletops", May 7, 2011, 10 pages.
Johnson,"Create an Awesome Zooming Web Page With jQuery", Retrieved from <http://designshack.net/articles/javascript/create-an-awesome-zooming-web-page-with-jquery/> on Aug. 20, 2015, May 25, 2011, 11 pages.
Johnson,"Samsung Galaxy Tab Pro 10.1 Review", Retrieved From:<http://hothardware.com/Reviews/Samsung-Galaxy-Tab-Pro-101-Review/?page=3#!baG2DY > Jul. 9, 2014, Mar. 21, 2014, 10 Pages.
Kandogan,"Elastic Windows: Improved Spatial Layout and Rapid Multiple Window Operations", In Proceedings of the Workshop on Advanced Visual Interfaces, May 27, 1996, 10 Pages.
Kcholi,"Windows CE .NET Interprocess Communication", Retrieved from http://msdn.microsoft.com/en-us/library/ms836784.aspx on Jul. 17, 2008., Jan. 2004, 15 Pages.
Keranen,"OpenGL-based User Interface Toolkit for Symbian Mobile Devices", Master of Science Thesis, Tamere University of Technology, Department of Information Technology, Apr. 6, 2005, 88 pages.
Kishore,"Split or Divide Your Desktop Screen into Multiple Parts", retrieved from <http://www.online-tech-tips.com/free-software-downloads/split-or-divide-your-desktop-screen-into-multiple-parts/> on Jul. 7, 2014, Oct. 18, 2008, 7 pages.
Krazit,"Has Apple Found the Magic Touch?", Retrieved from: <http://news.cnet.com/8301-13579_3-9879471-37.html> on Nov. 10, 2009, Feb. 26, 2008, 2 pages.
Kurdi,"Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.
Kurdi,"WinSplit Revolution", Retrieved from <http://www.freewaregenius.com/winsplit-revolution/> on Jun. 30, 2013, Aug. 22, 2007, 4 Pages.
La,"Parallax Gallery", Available at <http://webdesignerwall.comtutorials/parallax-gallery/comment-page-1>, Apr. 25, 2008, 16 pages.
Livingston,"Windows 95 Secrets", 1995, I DG Books Worldwide, 3rd Edition, 1995, pp. 121-127.
Long,"Gmail Manager 0.6", Retrieved from: <https://addons.mozilla.org/en-US/firefox/addon/1320/> on Sep. 29, 2010, Jan. 27, 2010, 4 pages.
Mann,"Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.
Mantia,"Multitasking: What Does It Mean?", retrieved from <http://mantia.me/blog/multitasking/> on Sep. 23, 2011, 3 pages.
Mao,"Comments of Verizon Wireless Messaging Services, LLC", Retrieved from: http://www.ntia.doc.gov/osmhome/warnings/comments/verizon.htm on May 6, 2009., Aug. 18, 2000, 5 Pages.
Marie,"MacBook Trackpad Four Fingers Swipe Left/Right to Switch Applications", MacBook Junkie—retrieved from <http://www.macbookjunkie.com/macbook-trackpad-four-fingers-swipe-left-right-to-switch-applications/> on May 11, 2011, Nov. 13, 2010, 4 pages.

(56) References Cited

OTHER PUBLICATIONS

Mei,"Probabilistic Multimodality Fusion for Event Based Home Photo Clustering", Retrieved from: <http://ieeexplore.ieee.org/stamp/stamp.jsp?tp=&arnumber=04036960.>, Dec. 26, 2006, pp. 1757-1760.

Minsky,"Manipulating Simulated Objects with Real-world Gestures using a Force and Position Sensitive Screen", Computer Graphics, vol. 18, No. 3, Available at <http://delivery.acm.org/10.1145/810000/808598/p195-minsky.pdf?key1=808598&key2=2244955521&coll=GUIDE&dl=GUIDE&CFID=57828830&CFTOKEN=43421964>, Jul. 1984, pp. 195-203.

Mullender,"Digital Dashboards: Web Parts Integrate with Internet Explorer and Outlook to Build Personal Portals", Retrieved from: < http://technet.microsoft.com/en-us/query/bb985692> on, Jan. 2001, 5 pages.

Muller,"MultiSplitPane: Splitting without Nesting", Java.net, retrieved from <http://today.java.net/pub/a/today/2006/03/23/multi-split-pane.html> on Mar. 23, 2006, Mar. 23, 2006, 6 pages.

Nordgren,"Development of a Touch Screen Interface for Scania Interactor", Master's Thesis in C—Available at <http://www.es.umu.se/education/examina/Rapporter/PederNordgren.pdf>omputing Science, UMEA University, Apr. 10, 2007, pp. 1-59.

Oliver,"Potential iPhone Usability and Interface Improvements", Retrieved from: <http://www.appleinsider.com/articles/08/09/18/potential_iphone_usability_and_interface_improvements.html> on Nov. 12, 2008, AppleInsider, Sep. 18, 2008, 4 pages.

Olwal,"Rubbing and Tapping for Precise and Rapid Selection on Touch-Screen Displays", Conference on Human Factors in Computing Systems, Available at <http://www.csc.kth.se/~alx/projects/research/rubbing/olwal_rubbing_tapping_chi_2008.pdf>, Apr. 2008, 10 pages.

O'Reilly,"How to Use the Microsoft Surface Touch Screen and Keyboard", Retrieved From: <http://www.cnet.com/how-to/how-to-use-the-microsoft-surface-touch-screen-and-keyboard/> Jul. 5, 2014, Nov. 6, 2012, 5 Pages.

Oryl,"Review: Asus P527 Smartphone for North America", Retrieved from: <http://www.mobileburn.com/review.jsp?Id=4257> on Dec. 17, 2008., Mar. 5, 2008, 1 Page.

Padilla,"Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.

Paul,"Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 10, Aug. 2010, 3 pages.

Paul,"Three Windows Multitasking Features That Help Maximize Your Screen Space", Retrieved From: <http://www.pcworld.com/article/2094124/three-windows-multitasking-features-that-help-maximize-your-screen-space.html> Jul. 4, 2014, Feb. 4, 2014, 4 Pages.

Perry,"Teach Yourself Windows 95 in 24 Hours", 1997, Sams Publishing, 2nd Edition, 1997, pp. 193-198.

Pierce,"Toolspaces and Glances: Storing, Accessing, and Retrieving Objects in 3D Desktop Applications", 1999 Symposium on Interactive 3D Graphics, Available at <http://delivery.acm.org/10.1145/310000/300545/p163-pierce.pdf?key1=300545&key2=8792497521&coll=GUIDE&dl=GUIDE&CFID=61004073& CFTOKEN=28819248>, Apr. 1999, pp. 163-168.

Raghaven,"Model Based Estimation and Verification of Mobile Device Performance", Available at http://alumni.cs.ucsb.edu/~raimisl/emsoft04_12.pdf., Sep. 27-29, 2004, 10 Pages.

Ray,"Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.

Reed,"Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.

Remond,"Mobile Marketing Solutions", Retrieved from: <http://www.mobilemarketingmagazine.co.uk/mobile_social_networking/> on May 5, 2009., Apr. 28, 2009, 16 Pages.

Rice,"A System for Searching Sound Palettes", Proceedings of the Eleventh Biennial Symposium on Arts and Technology,, Available at <http://www.comparisonics.com/FindSoundsPalettePaper.pdf>, Feb. 2008, 6 pages.

Ritchie,"iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.

Ritscher,"Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.

Roberts,"Touching and Gesturing on the iPhone", Available at <http://www.sitepen.com/blog/2008/07/10/touching-and-gesturing-on-the-iphone/comments-pare-1>, Jul. 10, 2008, 16 pages.

Roth,"Bezel Swipe: Conflict-Free Scrolling and Multiple Selection on Mobile Touch Screen Devices", CHI 2009, Available at <http://www.volkerroth.com/download/Roth2009a.pdf>, Apr. 2009, 4 pages.

Sakumi,"Browse/Creation Tool for Hierarchy Contents with Concept Pad System: Zoomable User Interface", In Lecture Note/Software Science 23 Interactive System and Software VIII, Dec. 20, 1999, 8 pages.

Sandoval,"A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf>, 2004, 18 pages.

Saugat,"Access Multiple Cloud Files from Single Application", Retrieved from: <http://freshtutorial.com/access-multiple-cloud-files-single-application/> on Feb. 15, 2012, Sep. 26, 2011, 7 pages.

Singh,"CINEMA: Columbia InterNet Extensible Multimedia Architecture", Available at <http://www1.cs.columbia.edu/~library/TR-repository/reports/reports-2002/cucs-011-02.pdf>, Sep. 3, 2002, 83 Pages.

Smith,"GroupBar: The TaskBar Evolved", Proceedings of OZCHI 2003—Available at <http://research.microsoft.com/pubs/64316/ozchi2003-groupbar.pdf>, Nov. 2003, pp. 1-10.

Stebih,"Windows 8 Mouse and Keyboard Commands", retrieved from <http://www.helpdesktv.ca/windows/windows-8-mouse-and-keyboard-commands.html> on Nov. 23, 2011, Sep. 21, 2011, 5 pages.

Stein,"Growing Beautiful Code in BioPerl", In Beautiful Code—Leading Programmers Explain How They Think, Oreilly, 2007, 32 pages.

Steinicke,"Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>, Jun. 15, 2008, 4 Pages.

Suror,"PocketShield-New Screenlock App for the HTC Diamond and Pro", Retrieved from: <http://wmpoweruser.com/?tag=htc-touch-diamond> on Jun. 28, 2011, Oct. 23, 2008, 2 pages.

Takahiro,"Let's Manage the Installed Applications", In Easy to Use Mini, Exhaustion Utilization of iPhone, vol. 1, p. 25 Memo, Mar. 10, 2011, 6 pages.

Terpstra,"Beta Beat: Grape, a New Way to Manage Your Desktop Clutter", Retrieved from: http://www.tuaw.com/2009/04/14/beta-beat-grape-a-new-way-to-manage-your-desktop-clutter/, Apr. 14, 2009, 4 pages.

Toshiyuki,"User Interaction Technique for Mobile Terminal (First Part)- Display Interaction Technique—Information Processing", In Information Processing Society of Japan, vol. 48, No. 6, Jun. 15, 2007, 12 pages.

Vallerio,"Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.

Vermeulen,"BlackBerry PlayBook Hands-on", retrieved from <http://mybroadband.co.za/news/gadgets/20104-BlackBerry-PlayBook-hands-.html> on May 11, 2011, May 8, 2011, 4 pages.

(56) References Cited

OTHER PUBLICATIONS

Vigil,"Methods for Controlling a Floating Cursor on a Multi-touch Mobile Phone or Tablet in Conjunction with Selection Gestures and Content Gestures", U.S. Appl. No. 61/304,972, filed Feb. 16, 2010, 54 pages.
Viticci,"Growl 1.3 To Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011, Jul. 6, 2011, 6 pages.
Vornberger,"Bluetile", Retrieved from: <http://www.bluetile.org> on Sep. 29, 2010, 5 pages.
Webmonkey"HTML Cheatsheet", Retrieved From: <http://www.webmonkey.com/2010/02/html_cheatsheet> on Nov. 7, 2014, Feb. 15, 2010, 5 pages.
Webster,"VsNotepad: An Improved Way To Jot Down On Windows Mobile", Retrieved from <http://pocketnow.com/index.php/index.php?a=portal_detail&t=news&id=7424>, May 19, 2009, 2 pages.
Wilson,"How the iPhone Works", Retrieved from: <http://electronics.howstuffworks.com/iphone2.htm> on Apr. 24, 2009, Jan. 2007, 9 pages.
Wilson,"Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.
Wobbrock,"User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.
Wu,"Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.
Wyatt,"/Flash/the art of parallax scrolling", .net Magazine, Aug. 1, 2007, pp. 74-76.
Yang,"Dual-Surface Input: Augmenting One-Handed Interaction with Coordinated Front and Behind-the-Screen Input", Proceedings: MobileHCI '09, Sep. 15-18, 2009, Bonn, Germany—retrieved from <http://www.cs.ualberta.ca/~wfb/publications/C-2009-MobileHCI-Yang.pdf>, Sep. 18, 2009, 10 pages.
Yang,"Semantic Photo Album Based on MPEG-4 Compatible Application Format", Retrieved from: <http://ieeexplore.ieee.org/stamp/stamp.jsp?arnumber=04146254.>, 2007, 2 Pages.
Yee,"Two-Handed Interaction on a Tablet Display", Retrieved from: <http://zesty.ca/tht/yee-tht-chi2004-short.pdf>, Conference on Human Factors in Computing Systems, Apr. 2004, 4 pages.
"Corrected Notice of Allowance", U.S. Appl. No. 13/228,931, dated Nov. 30, 2016, 2 pages.
"Corrected Notice of Allowance", U.S. Appl. No. 13/228,931, dated Dec. 29, 2016, 2 pages.
"Corrected Notice of Allowance", U.S. Appl. No. 13/657,621, dated Dec. 1, 2016, 3 pages.
"Foreign Notice of Allowance", CN Application No. 201180071190.0, dated Sep. 8, 2016, 6 pages.
"Foreign Notice of Allowance", JP Application No. 2014-529685, dated Oct. 19, 2016, 4 pages.
"Foreign Office Action", AU Application No. 2011376310, dated Nov. 7, 2016, 3 pages.
"Foreign Office Action", EP Application No. 11866772.4, dated Nov. 21, 2016, 6 pages.
"Non-Final Office Action", U.S. Appl. No. 14/586,364, dated Dec. 28, 2016, 7 pages.
"Notice of Allowance", U.S. Appl. No. 13/550,432, dated Jan. 3, 2017, 5 pages.
"Corrected Notice of Allowance", U.S. Appl. No. 13/118,314, dated Apr. 27, 2017, 2 pages.
"Corrected Notice of Allowance", U.S. Appl. No. 14/919,607, dated May 8, 2017, 2 pages.
"Final Office Action", U.S. Appl. No. 13/118,302, dated May 4, 2017, 43 pages.
"Final Office Action", U.S. Appl. No. 14/918,358, dated Apr. 27, 2017, 8 pages.
"Final Office Action", U.S. Appl. No. 14/918,359, dated May 17, 2017, 7 pages.
"Non-Final Office Action", U.S. Appl. No. 14/522,420, dated Apr. 28, 2017, 31 pages.
"Non-Final Office Action", U.S. Appl. No. 14/558,666, dated May 4, 2017, 13 pages.
"Notice of Allowance", U.S. Appl. No. 14/850,347, dated May 5, 2017, 5 pages.

* cited by examiner

MANAGING AN IMMERSIVE INTERFACE IN A MULTI-APPLICATION IMMERSIVE ENVIRONMENT

RELATED APPLICATIONS

This application is a continuation of and claims priority under 35 U.S.C. § 120 to U.S. patent application Ser. No. 13/657,621 filed Oct. 22, 2012, entitled "Managing An Immersive Interface in a Multi-Application Immersive Environment", the disclosure of which is incorporated by reference herein in its entirety. U.S. patent application Ser. No. 13/657,621 is a continuation of and claims priority under 35 U.S.C. § 120 to U.S. patent application Ser. No. 13/118,333 filed May 27, 2011, entitled "Managing An Immersive Interface in a Multi-Application Immersive Environment", now U.S. Pat. No. 9,158,445, and additionally, is a continuation of and claims priority under 35 U.S.C. § 120 to U.S. patent application Ser. No. 13/118,321 filed May 27, 2011, entitled "Managing An Immersive Interface in a Multi-Application Immersive Environment" the disclosure of each of which are incorporated by reference herein in their entirety.

BACKGROUND

Conventional techniques permit users to view multiple computing applications through multiple windows. Each of these windows generally includes a frame having controls for moving, sizing, or otherwise managing the layout of the window. Moving, sizing, or otherwise managing windows through these controls, however, can be time consuming or result in a poor user experience.

SUMMARY

This document describes techniques and apparatuses for managing an immersive interface in a multi-application immersive environment. In some embodiments, these techniques and apparatuses enable a user to alter sizes and/or a layout of multiple immersive interfaces with as little as one selection.

This summary is provided to introduce simplified concepts for managing an immersive interface in a multi-application immersive environment that are further described below in the Detailed Description. This summary is not intended to identify essential features of the claimed subject matter, nor is it intended for use in determining the scope of the claimed subject matter. Techniques and/or apparatuses for managing an immersive interface in a multi-application immersive environment are also referred to herein separately or in conjunction as the "techniques" as permitted by the context, though techniques may include or instead represent other aspects described herein.

BRIEF DESCRIPTION OF THE DRAWINGS

Embodiments for managing an immersive interface in a multi-application immersive environment are described with reference to the following drawings. The same numbers are used throughout the drawings to reference like features and components.

DETAILED DESCRIPTION

Overview

This document describes techniques and apparatuses for managing an immersive interface in a multi-application immersive environment. These techniques, in some embodiments, enable a user to quickly and easily size, select, and layout one or multiple immersive interfaces.

Consider first a conventional case where a user wishes to view two applications using as much of her display as possible when working in a windows-based environment. To view her two applications using as much display as possible, she will likely need to find a sizing control on one of the windows, carefully drag out the sizing control to expand the window, and then move the window to the desired area of the display. After doing so, she may then selects the other window to make it primary and thus interact with it, then move the window, then find and select the sizing control on the window, and then drag the sizing control to expand the window. Even after doing so, there can be parts of the display not occupied by one of the windows or some overlap of the windows, thereby occluding a window. Further, some of her display will be taken up with frames of the windows that might otherwise have been used to view content of the applications. Furthermore, in some cases an application can be unaware of the size at which an interface is displayed, thereby further causing content to be laid out in a less-than-optimal fashion.

Assume again that the user wishes to view two applications using as much of her display as possible. In contrast to the conventional case, however, she is working in a multi-application immersive environment managed by the described techniques. In this example, her display is occupied by a single immersive user interface occupying all or nearly all of her display as part of the multi-application immersive environment. To view the two applications, the techniques enable the user to simply select the other application in response to which an immersive interface for the other application will automatically be sized to fit a region of the multi-application immersive environment and the currently displayed immersive interface resized to fit another region of the environment.

The techniques also enable the user to resize interfaces for applications that are already presented. Assume in this second case that both of the two applications are part of the multi-application immersive environment and that the user wishes to change their sizes. The techniques permit her to resize both of them simultaneously with as little as one simple selection. She may slide an immersive interface divider between the two immersive interfaces, for example, with a simple select-and-move gesture. In response, the techniques resize both immersive interfaces.

These are but two examples of many ways in which the techniques enabling managing an immersive interface in a multi-application immersive environment, others of which are described below.

Example System

Figure 1:
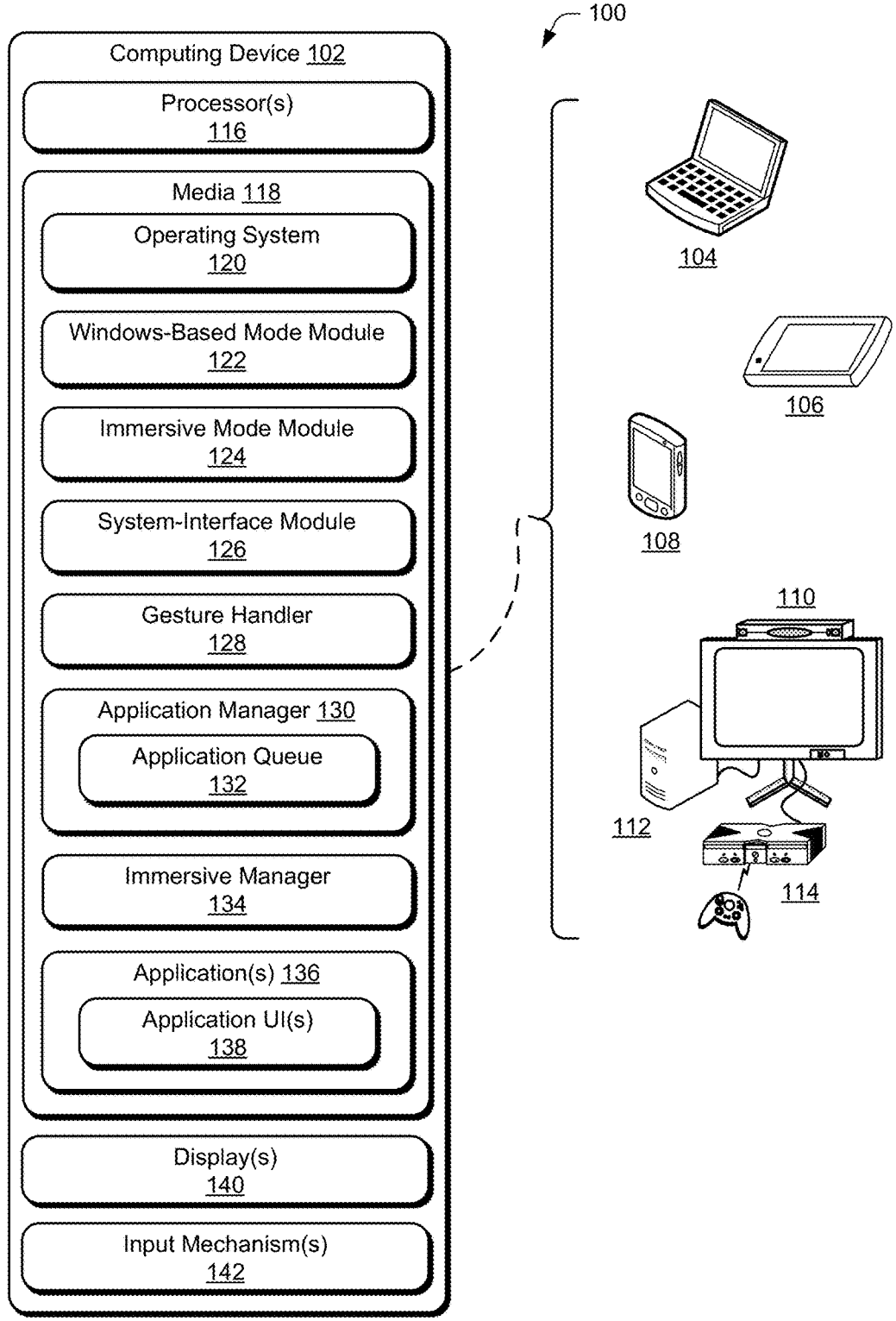
FIG. 1 illustrates an example system in which techniques for managing an immersive interface in a multi-application immersive environment can be implemented.

FIG. 1 illustrates an example system 100 in which techniques for managing an immersive interface in a multi-application immersive environment can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, windows-based mode module 122, immersive mode module 124, system-interface module 126, gesture handler 128, application manager 130, which includes or has access to application queue 132, immersive manager 134, and one or more applications 136, each having one or more application user interfaces 138.

Computing device 102 also includes or has access to one or more displays 140 and input mechanisms 142. Four example displays are illustrated in FIG. 1. Input mechanisms 142 may include gesture-sensitive sensors and devices, such as touch-based sensors and movement-tracking sensors (e.g., camera-based), as well as mice (free-standing or integral with a keyboard), track pads, and microphones with accompanying voice recognition software, to name a few. Input mechanisms 142 may be separate or integral with displays 140; integral examples include gesture-sensitive displays with integrated touch-sensitive or motion-sensitive sensors.

Windows-based mode module 122 presents application user interfaces 138 through windows having frames. These frames may provide controls through which to interact with an application and/or controls enabling a user to move and resize the window.

Immersive mode module 124 provides an environment by which a user may view and interact with one or more of applications 136 through application user interfaces 138. In some embodiments, this environment presents content of, and enables interaction with, applications with little or no window frame and/or without a need for a user to manage a window frame's layout or primacy relative to other windows (e.g., which window is active or up front) or manually size or position application user interfaces 138.

This environment can be, but is not required to be, hosted and/or surfaced without use of a windows-based desktop environment. Thus, in some cases immersive mode module 124 presents an immersive environment that is not a window (even one without a substantial frame) and precludes usage of desktop-like displays (e.g., a taskbar). Further still, in some embodiments this immersive environment is similar to an operating system in that it is not closeable or capable of being un-installed. While not required, in some cases this immersive environment enables use of all or nearly all of the pixels of a display by applications. Examples of immersive environments are provided below as part of describing the techniques, though they are not exhaustive or intended to limit the techniques described herein.

System-interface module 126 provides one or more interfaces through which interaction with operating system 120 is enabled, such as an application-launching interface, a start menu, or a system tools or options menu, to name just a few.

Operating system 120, modules 122, 124, and 126, as well as gesture handler 128, application manager 130, and immersive manager 134 can be separate from each other or combined or integrated in any suitable form.

Example Methods

Example methods 200, 800, and 900 address edge gestures, example methods 1400 and 1700 address switching back to a previously-interacted-with application, and example methods 1900 and 2200 address managing an immersive interface in a multi-application immersive environment. The methods may be used separately or in combination with each other, in whole or in part. For example, an edge gesture may be used to select and size applications in a multi-application immersive environment. Or an application queue may be used to select a previously-interacted-with application which is then sized to fit a region of the multi-application immersive environment. Use of an edge gesture or an application queue, however, is not required by methods 1900 and/or 2200.

Figure 2:
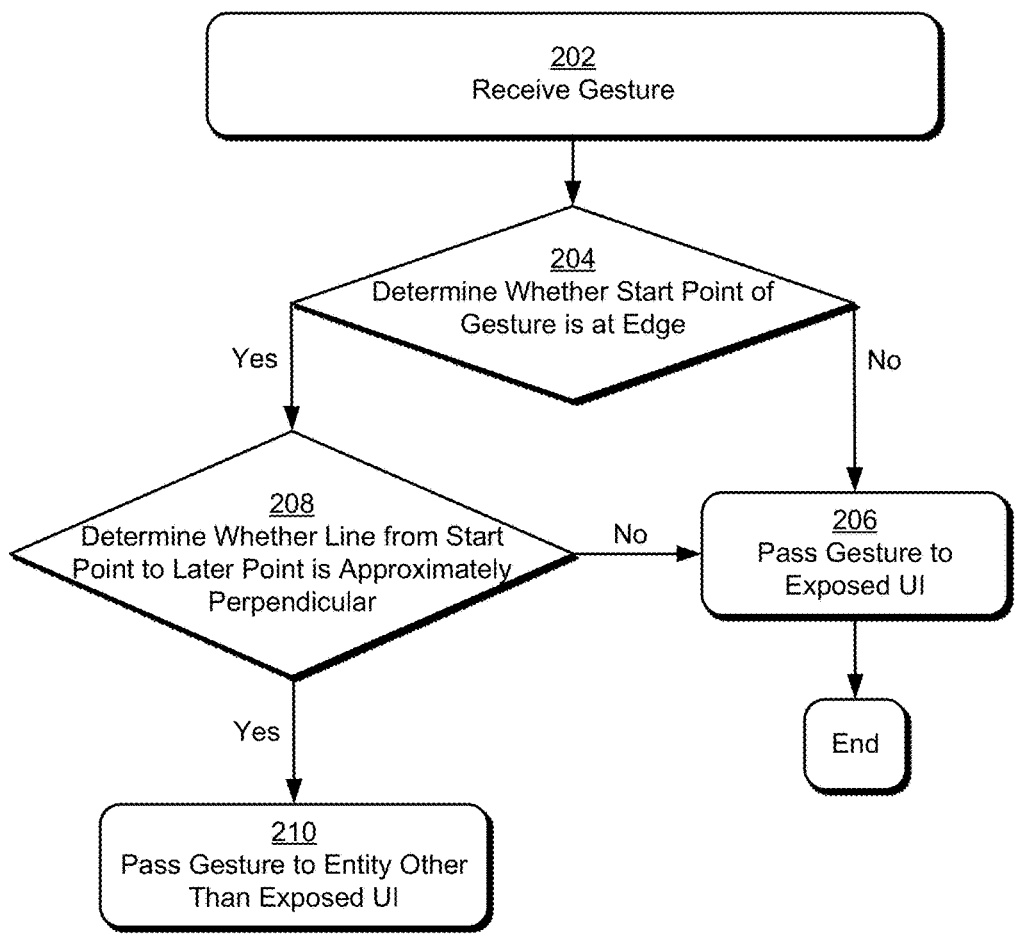
FIG. 2 illustrates an example method for enabling edge gestures that can be used to select to switch back to a previously-interacted-with application, the edge gestures being approximately perpendicular to an edge in which the gesture begins.

FIG. 2 depicts a method 200 for enabling edge gestures based on the edge gesture being approximately perpendicular to an edge in which the gesture begins. In portions of the following discussion reference may be made to system 100 of FIG. 1, reference to which is made for example only.

Block 202 receives a gesture. This gesture may be received at various parts of a display, such as over a windows-based interface, an immersive interface, or no interface. Further, this gesture may be made and received in various manners, such as a pointer tracking a movement received through a touch pad, mouse, or roller ball or a physical movement made with arm(s), finger(s), or a stylus received through a motion-sensitive or touch-sensitive mechanism.

Figure 3:
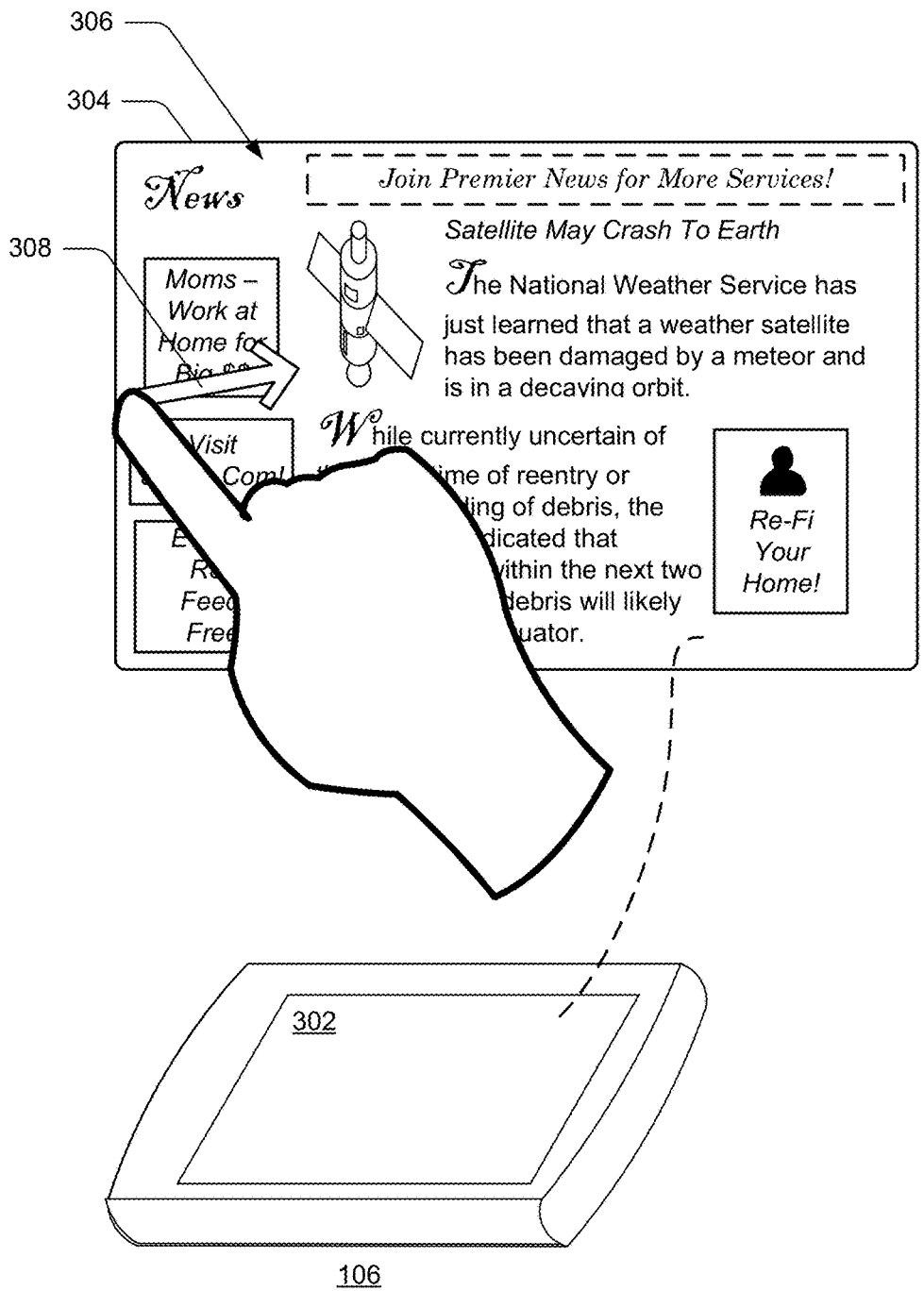
FIG. 3 illustrates an example tablet computing device having a touch-sensitive display presenting an immersive interface.

By way of example consider FIG. 3, which illustrates a tablet computing device 106. Tablet 106 includes a touch-sensitive display 302 shown displaying an immersive interface 304 that includes a webpage 306. As part of an ongoing example, at block 202 gesture handler 128 receives gesture 308 as shown in FIG. 3.

Block 204 determines whether a start point of the gesture is at an edge. As noted above, the edge in question can be an edge of a user interface, whether immersive or windows-based, and/or of a display. In some cases, of course, an edge of a user interface is also an edge of a display. The size of the edge can vary based on various factors about the display or interface. A small display or interface may have a smaller size in absolute or pixel terms than a large display or interface. A highly sensitive input mechanism permits a smaller edge as well. Example edges are rectangular and vary between one and twenty pixels in one dimension and an interface limit of the interface or display in the other dimension, though other sizes and shapes, including convex and concave edges may instead be used.

Figure 4:
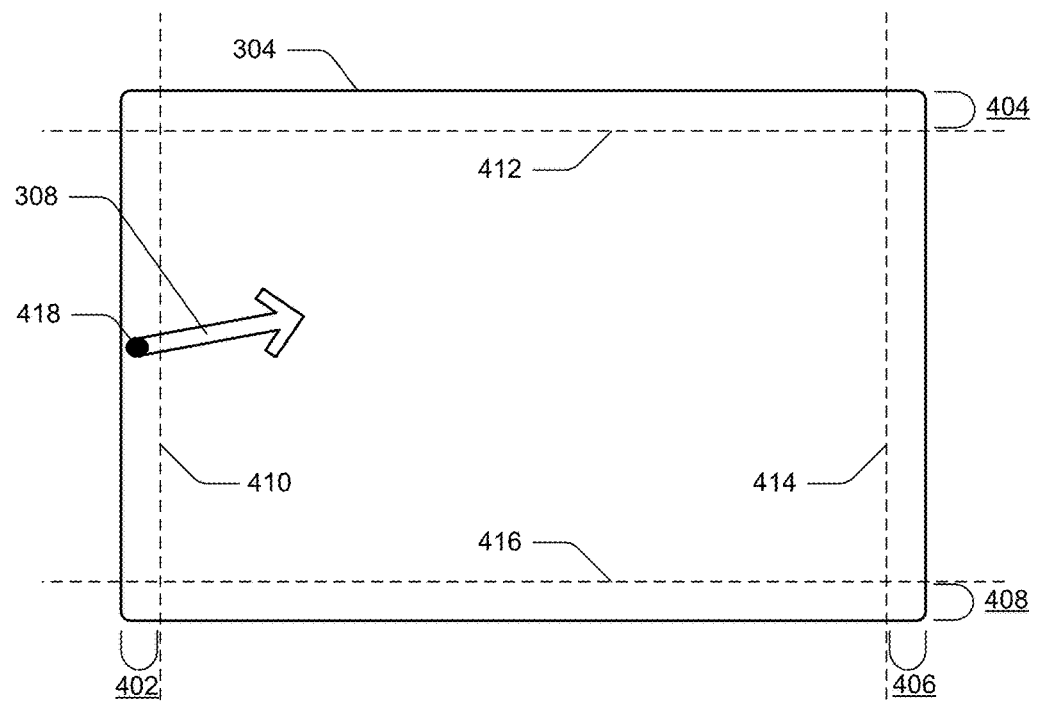
FIG. 4 illustrates the example immersive interface of FIG. 3 along with example edges.

Continuing the ongoing example, consider FIG. 4, which illustrates immersive interface 304 and gesture 308 of FIG. 3 as well as left edge 402, top edge 404, right edge 406, and bottom edge 408. For visual clarity webpage 306 is not shown. In this example the dimensions of the interface and display are of a moderate size, between that of smart phones and that of many laptop and desktop displays. Edges 402, 404, 406, and 408 have a small dimension of twenty pixels, an area of each shown bounded by dashed lines at twenty pixels from the display or interface limit at edge limit 410, 412, 414, and 416, respectively.

Gesture handler 128 determines that gesture 308 has a start point 418 and that this start point 418 is within left edge 402. Gesture handler 128 determines the start point in this case by receiving data indicating [X,Y] coordinates in pixels at which gesture 308 begins and comparing the first of these coordinates to those pixels contained within each edge 402-408. Gesture handler 128 often can determine the start point and whether it is in an edge faster than a sample rate, thereby causing little or no performance downgrade from techniques that simply pass gestures directly to an exposed interface over which a gesture is made.

Returning to method 200 generally, if block 204 determines that the start point of the gesture is not at an edge, method 200 proceeds along a "No" path to block 206. Block 206 passes the gestures to an exposed user interface, such as an underlying interface over which the gesture was received. Altering the ongoing example, assume that gesture 308 was determined not to have a start point within an edge. In such a case gesture handler 128 passes buffered data for gesture 308 to immersive user interface 304. After passing the gesture, method 200 ends.

If block 204 determines that the start point of the gesture is in an edge, method 200 proceeds along a "Yes" path to block 208. Block 208 responds to the positive determination of block 204 by determining whether a line from the start point to a later point of the gesture is approximately perpendicular from the edge.

Block 208, in some embodiments, determines the later point used. Gesture handler 128, for example, can determine the later point of the gesture based on the later point being received a preset distance from the edge or the start point, such as past edge limit 410 for edge 402 or twenty pixels from start point 418, all of FIG. 4. In some other embodiments, gesture handler 128 determines the later point based on it being received a preset time after receipt of the start point, such an amount of time slightly greater than used generally by computing device 102 to determine that a gesture is a tap-and-hold or hover gesture.

For the ongoing embodiment, gesture handler 128 uses a later-received point of gesture 308 received outside of edge 402 so long as that later-received point is received within a preset time. If no point is received outside of the edge within that preset time, gesture handler 128 proceeds to block 206 and passes gesture 308 to immersive interface 304.

Using the start point, block 208 determines whether a line from the start point to the later point of the gesture is approximately perpendicular to the edge. Various angles of variance can be used in this determination by block 208, such as five, ten, twenty, or thirty degrees.

Figure 5:
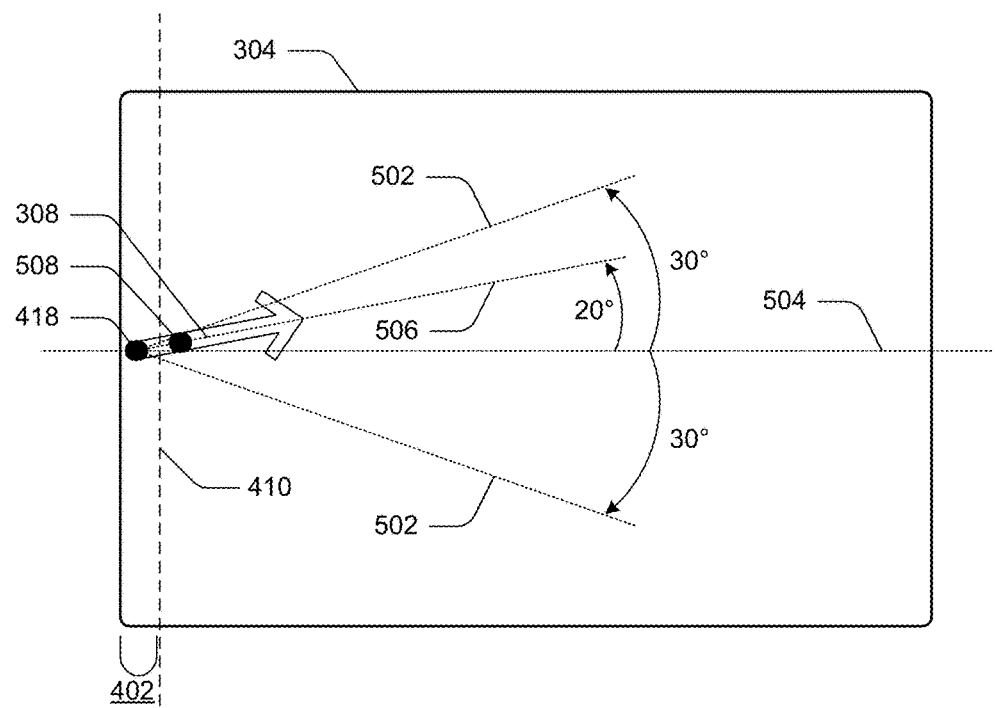
FIG. 5 illustrates the example immersive interface of FIGS. 3 and 4 along with angular variance lines from a perpendicular line and a line from a start point to a later point of a gesture.

By way of example, consider an angle of variance of thirty degrees from perpendicular. FIG. 5 illustrates this example variance, showing immersive interface 304, gesture 308, left edge 402, left edge limit 410, and start point 418 of FIGS. 3 and 4 along with a thirty-degree variance lines 502 from perpendicular line 504. Thus, gesture handler 128 determines that line 506 from start point 418 to later point 508 (which is at about twenty degrees from perpendicular) is approximately perpendicular based on being within the example thirty-degree variance line 502.

Generally, if block 208 determines that the line is not approximately perpendicular to the edge, method 200 proceeds along a "No" path to block 206. As noted in part above, block 208 may also determine that a later point or other aspect of a gesture disqualifies the gesture. Examples include when a later point is within the edge, such as due to a hover, tap, press-and-hold, or up-and-down gesture (e.g., to scroll content in the user interface), or when the gesture is set to be a single-input gesture and a second input is received (e.g., a first finger starts at an edge but a second finger then lands anywhere).

If block 208 determines that the line is approximately perpendicular based a later point outside the edge, method 200 proceeds along a "Yes" path to block 210.

Figure 6:
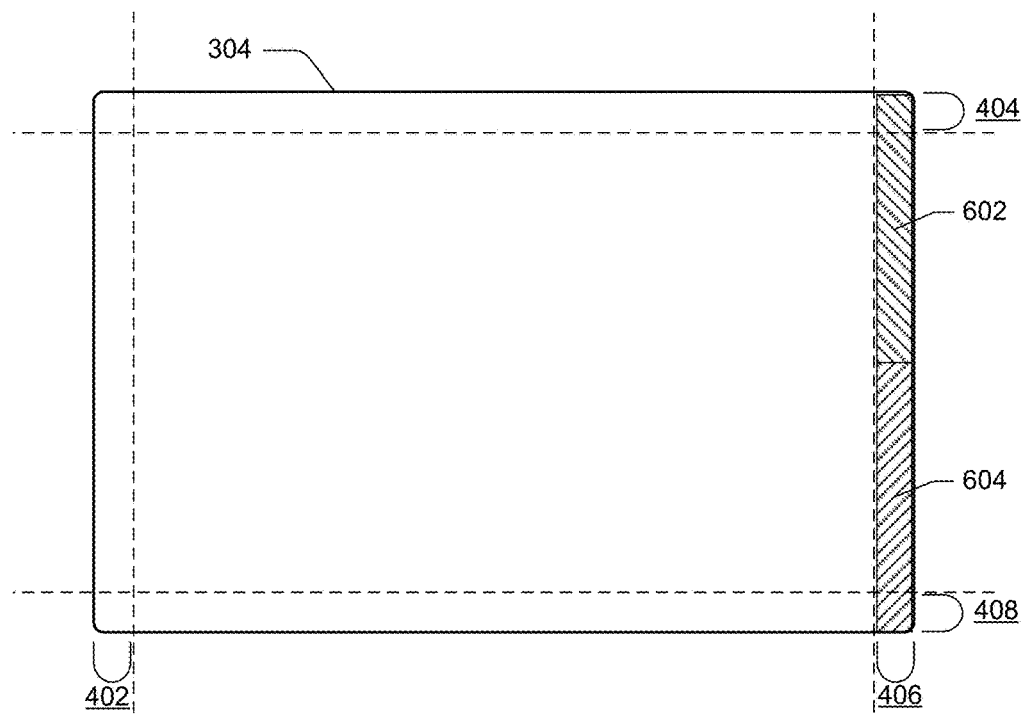
FIG. 6 illustrates the edges of the immersive interface shown in FIG. 4 along with two regions in the right edge.

Block 210 responds to the positive determination of block 208 by passing the gesture to an entity other than the exposed user interface. This entity is not a user interface over which the gesture was received, assuming it was received over a user interface at all. Block 210 may determine to which entity to pass the gesture as well, such as based on an edge or region of an edge in which the start point of the gesture is received. Consider FIG. 6, for example, which illustrates immersive interface 304 and edges 402, 404, 406, and 408 of FIG. 4 but adds top region 602 and bottom region 604 to right edge 406. A start point in top region 602 can result in a different entity (or even a same entity but a different user interface provided in response) than a start point received to bottom region 604. Likewise, a start point in top edge 404 can result in a different entity or interface than left edge 402 or bottom edge 408.

In some cases, this entity is an application associated with the user interface. In such a case, passing the gesture to the entity can be effective to cause the application to present a second user interface enabling interaction with the application. In the movie example above, the entity can be the media player playing the movie but not the immersive interface displaying the movie. The media player can then present a second user interface enabling selection of subtitles or a director's commentary rather than selections enabled by the interface displaying the movie, such as "pause," "play," and "stop." This capability is permitted in FIG. 1, where one of applications 136 can include or be capable of presenting more than one application user interface 138. Thus, block 210 can pass the gesture to system-interface module 126, the one of applications 136 currently presenting the user interface, or another of applications 136, to name just three possibilities.

Figure 7:
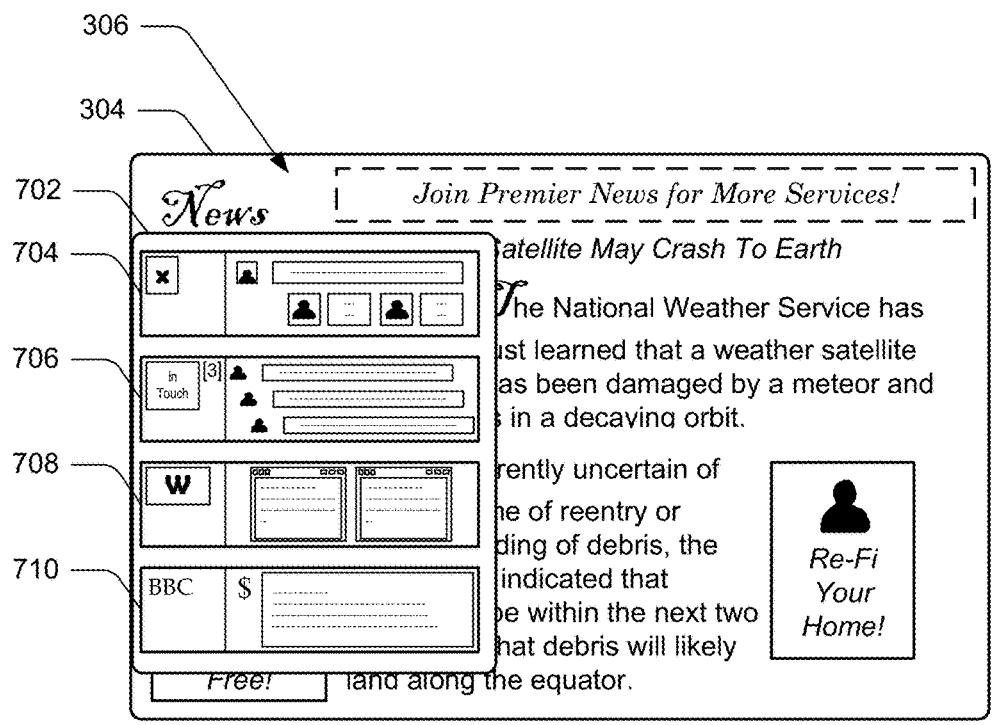
FIG. 7 illustrates an application-selection interface presented by a system-interface module in response to an edge gesture made over the immersive interface and webpage of FIG. 3.

Concluding the ongoing embodiment, at block 210 gesture handler 128 passes gesture 308 to system-interface module 126. System-interface module 126 receives the buffered portion of gesture 308 and continues to receive the rest of gesture 308 as it is made by the user. FIG. 7 illustrates a possible response upon receiving gesture 308, showing an application-selection interface 702 presented by system-interface module 126 and over immersive interface 304 and webpage 306 from FIG. 3. Application-selection interface 702 enables selection of various other applications and their respective interfaces at selectable application tiles 704, 706, 708, and 710.

The example application-selection interface 702 is an immersive user interface presented using immersive mode module 124, though this is not required. Presented interfaces may instead be windows-based and presented using windows-based module 122. Both of these modules are illustrated in FIG. 1.

Block 210 may also or instead determine to pass the gesture to different entities and/or interfaces based on other factors about the gesture received. Example factors are described in greater detail in method 800 below.

Note that method 200 and other methods described hereafter can be performed in real-time, such as while a gesture is being made and received. This permits, among other things, a user interface presented in response to a gesture to be presented prior to completion of the gesture. Further, the user interface can be presented progressively as the gesture is received. This permits a user experience of dragging out the user interface from the edge as the gesture is performed with the user interface appearing to "stick" to the gesture (e.g., to a mouse point or person's finger making the gesture).

Figure 8:
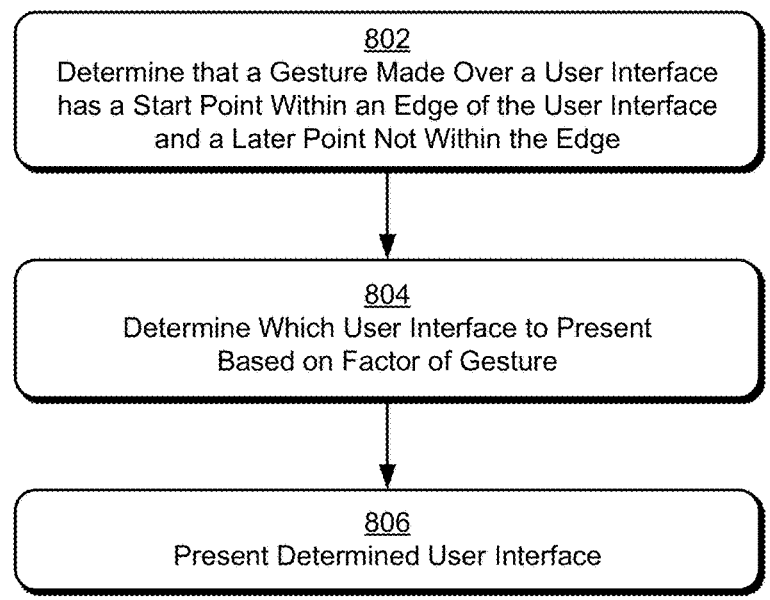
FIG. 8 illustrates an example method for enabling edge gestures including determining an interface to present based on some factor of the gesture.

FIG. 8 depicts a method 800 for enabling edge gestures including determining an interface to present based on some factor of the gesture. In portions of the following discussion reference may be made to system 100 of FIG. 1, reference to which is made for example only. Method 800 may act wholly or partly separate from or in conjunction with other methods described herein.

Block 802 determines that a gesture made over a user interface has a start point at an edge of the user interface and a later point not within the edge. Block 802 may operate similarly to or use aspects of method 200, such as determining a later point on which to base block 802's determination. Block 802 may act differently as well.

In one case, for example, block 802 determines that a gesture is a single-finger swipe gesture starting at an edge of an exposed immersive user interface and having a later point not at the edge but not based on an angle of the gesture. Based on this determination, block 802 proceeds to block 804 rather than pass the gesture to the exposed immersive user interface.

Block 804 determines which interface to present based on one or more factors of the gesture. Block 804 may do so based on a final or intermediate length of the gesture, whether the gesture is single or multi-point (e.g., a single-finger or multi-finger gesture), or a speed of the gesture. Thus, block 804 may determine to present a start menu in response to a multi-finger gesture, an application-selection interface in response to a relatively short single-finger gesture, or a system-control interface permitting selection to shut down computing device 102 in response to relatively long single-finger gesture, for example. To do so, gesture handler 128 may determine the length of the gesture or a number of inputs (e.g., fingers). In response, block 806 presents the determined user interface.

Assume, by way of example, that gesture handler 128 determines, based on a factor of the gesture, to present a user interface enabling interaction with operating system 120. In response system-interface module 126 presents this user interface. Presentation of the user interface can be similar to manners described in other methods, such as with a progressive display of application-selection user interface 702 of FIG. 7.

Figure 9:
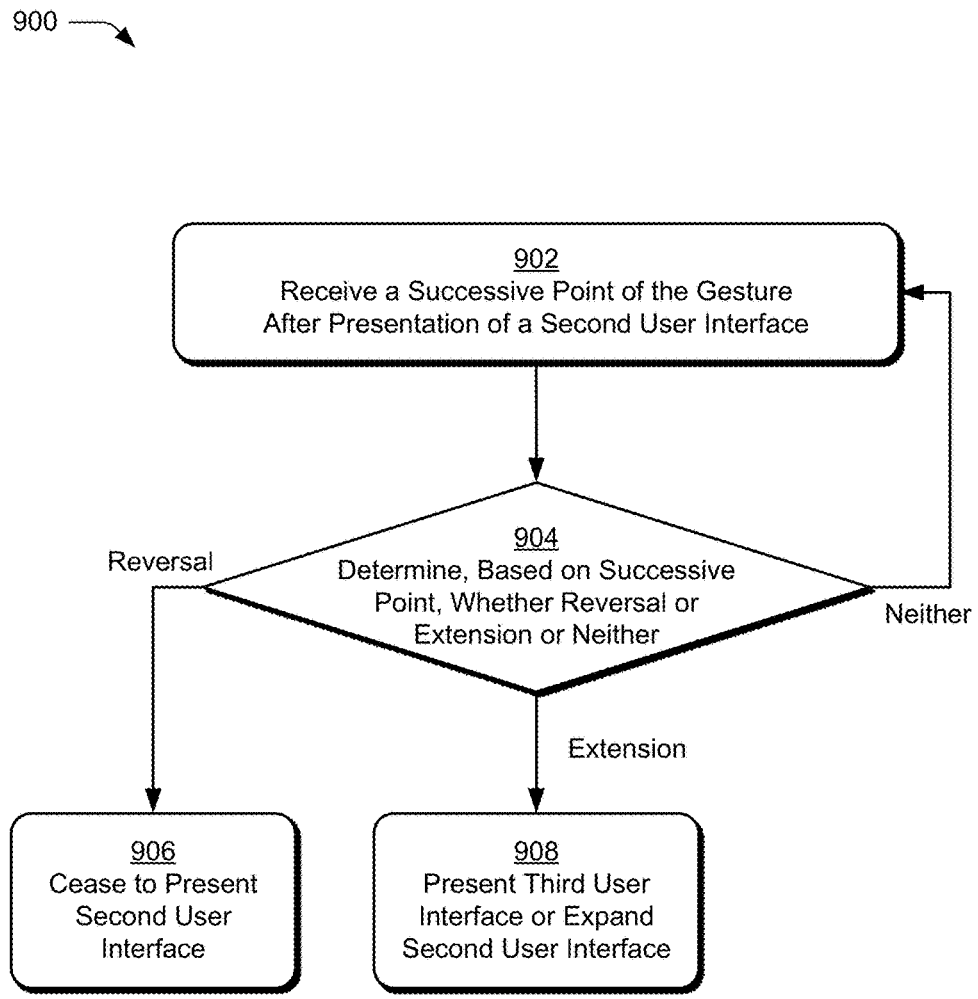
FIG. 9 illustrates an example method enabling expansion of, or ceasing presentation of, a user interface presented in response to an edge gesture or presentation of another user interface.

Following method 200 and/or method 800 in whole or in part, the techniques may proceed to perform method 900 of FIG. 9. Method 900 enables expansion of a user interface, presentation of another interface, or ceasing presentation of the user interface presented in response to an edge gesture.

Block 902 receives a successive point of the gesture and after presentation of at least some portion of the second user interface. As noted in part above, methods 200 and/or 800 are able to present or cause to be presented a second user interface, such as a second user interface for the same application associated with a current user interface, a different application, or a system user interface.

Figure 10:
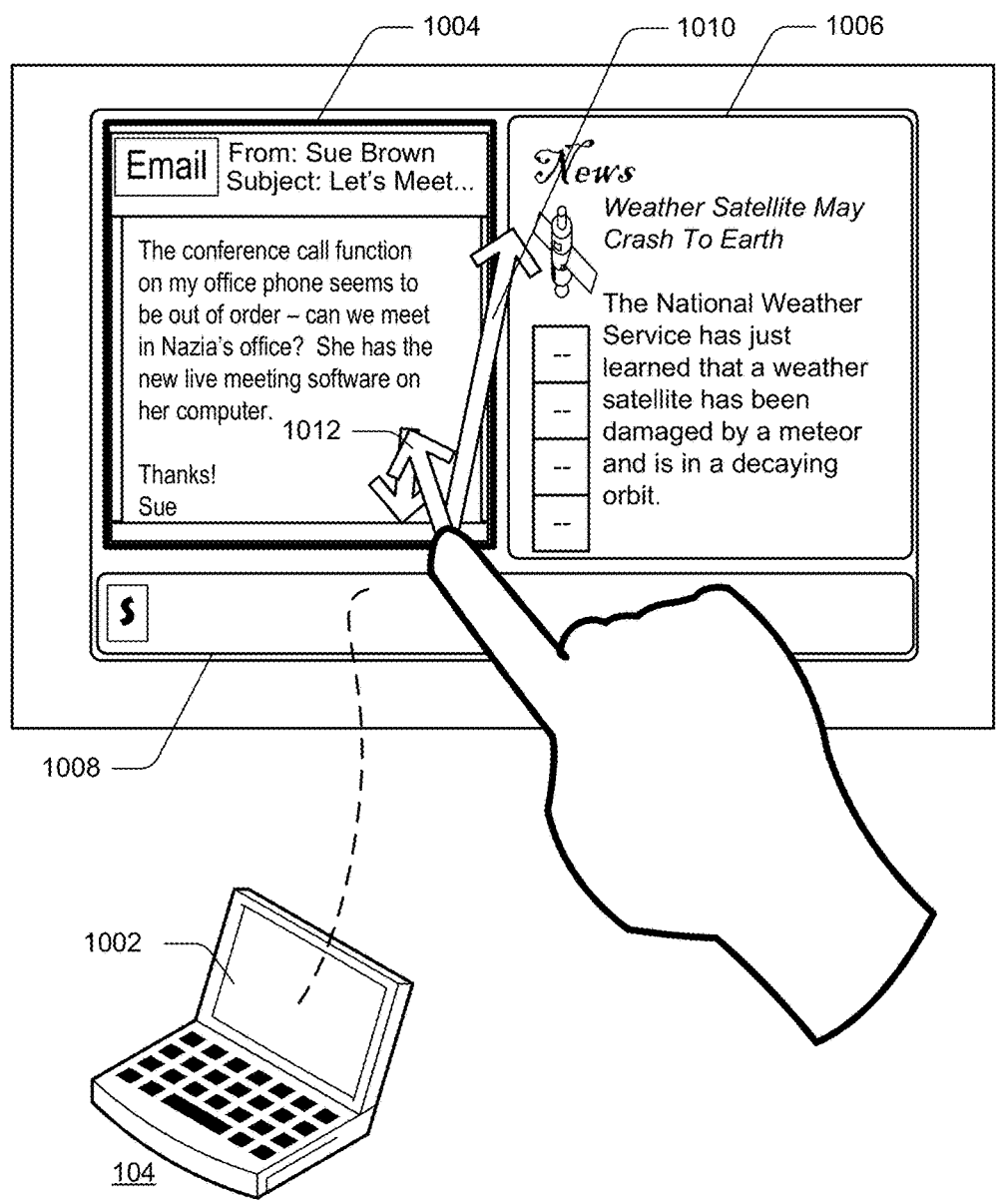
FIG. 10 illustrates a laptop computer having a touch-sensitive display having a windows-based email interface and two immersive interfaces.

By way of example, consider FIG. 10, which illustrates a laptop computer 104 having a touch-sensitive display 1002 displaying a windows-based email interface 1004 and two immersive interfaces 1006 and 1008. Windows-based email interface 1004 is associated with an application that manages email, which can be remote or local to laptop computer 104. FIG. 10 also illustrates two gestures, 1010 and 1012. Gesture 1010 proceeds in a straight line while gesture 1012 reverses back (shown with two arrows to show two directions).

Figure 11:
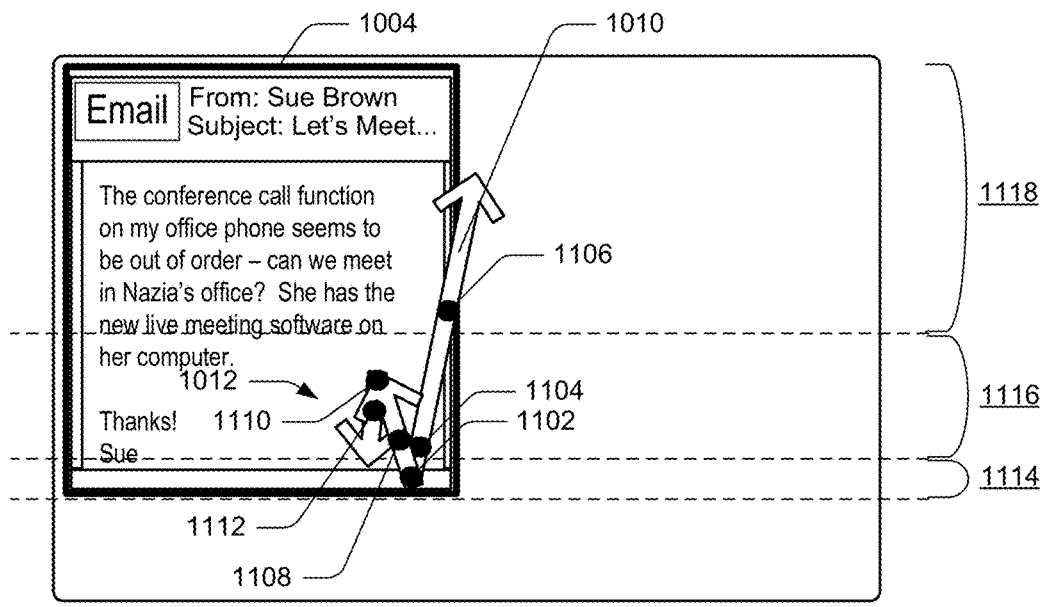
FIG. 11 illustrates the interfaces of FIG. 10 along with two gestures having a start point, later points, and one or more successive points.

FIG. 11 illustrates gesture 1010 having a start point 1102, a later point 1104, and a successive point 1106, and gesture 1012 having a same start point 1102, a later point 1108, and a first successive point 1110, and a second successive point 1112. FIG. 11 also shows a bottom edge 1114, a later-point area 1116, and an interface-addition area 1118.

Block 904 determines, based on the successive point, whether the gesture includes a reversal, an extension, or neither. Block 904 may determine a reversal by determining that a successive point is at the edge or is closer to the edge than a prior point of the gesture. Block 904 may determine that the gesture extends based on the successive point being a preset distance from the edge or the later point. If neither of these is determined to be true, method 900 may repeat blocks 902 and 904 to receive and analyze additional successive points until the gesture ends. If block 904 determines that there is a reversal, method 900 proceeds along "Reversal" path to block 906. If block 904 determines that the gesture is extended, method 900 proceeds along an "Extension" path to block 908.

In the context of the present example, assume that gesture handler 128 receives first successive point 1110 of gesture 1012. Gesture handler 128 then determines that first successive point 1110 is not at edge 1114, is not closer than a prior point of the gesture to edge 1114 (e.g., is not closer than later point 1108), and is not a preset distance from the edge or later point by not being within interface-addition region 1118. In such a case method 900 returns to block 902.

Figure 12:
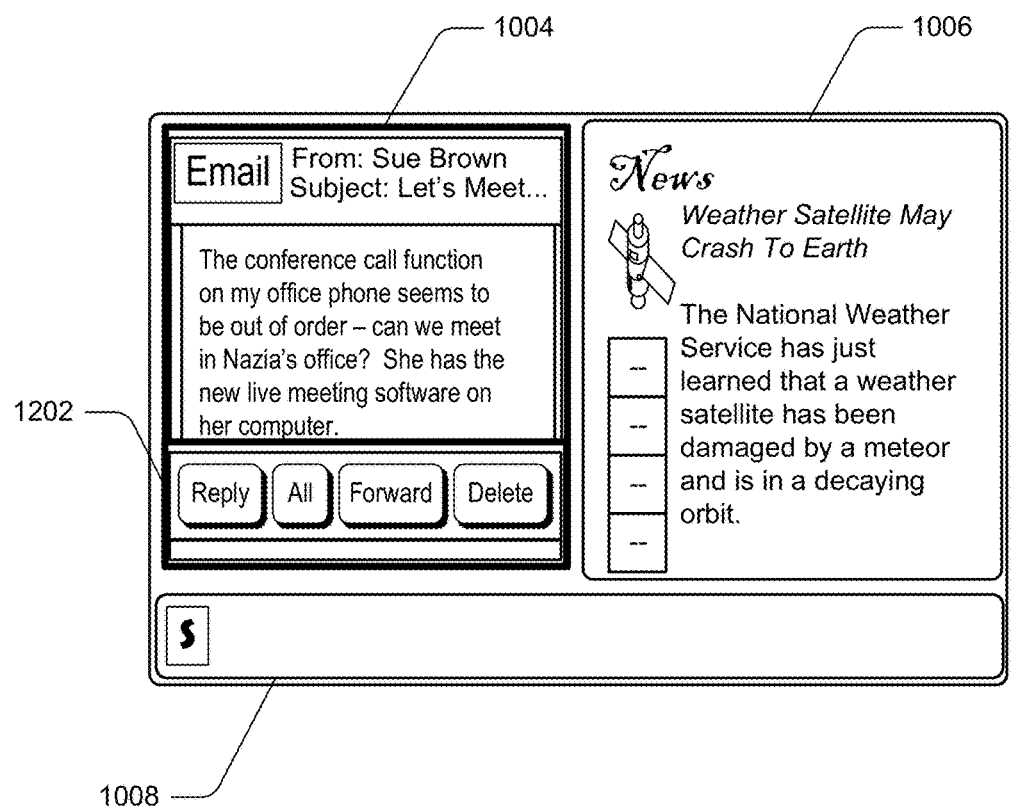
FIG. 12 illustrates the windows-based email interface of FIGS. 10 and 11 along with an email handling interface presented in response to an edge gesture.

On a second iteration of block 902, assume that gesture handler 128 receives second successive point 1112. In such a case, gesture handler 128 determines that second successive point 1112 is closer to edge 1114 than first successive point 1110 and thus gesture 1012 includes a reversal. Gesture handler 128 then proceeds to block 906 to cease to present the second user interface previously presented in response to the gesture. By way of example, consider FIG. 12, which illustrates an email handling interface 1202. In this example case of block 906, gesture handler 128 causes the email application to cease to present interface 1202 in response to a reversal of gesture 1012 (not shown removed).

Figure 13:
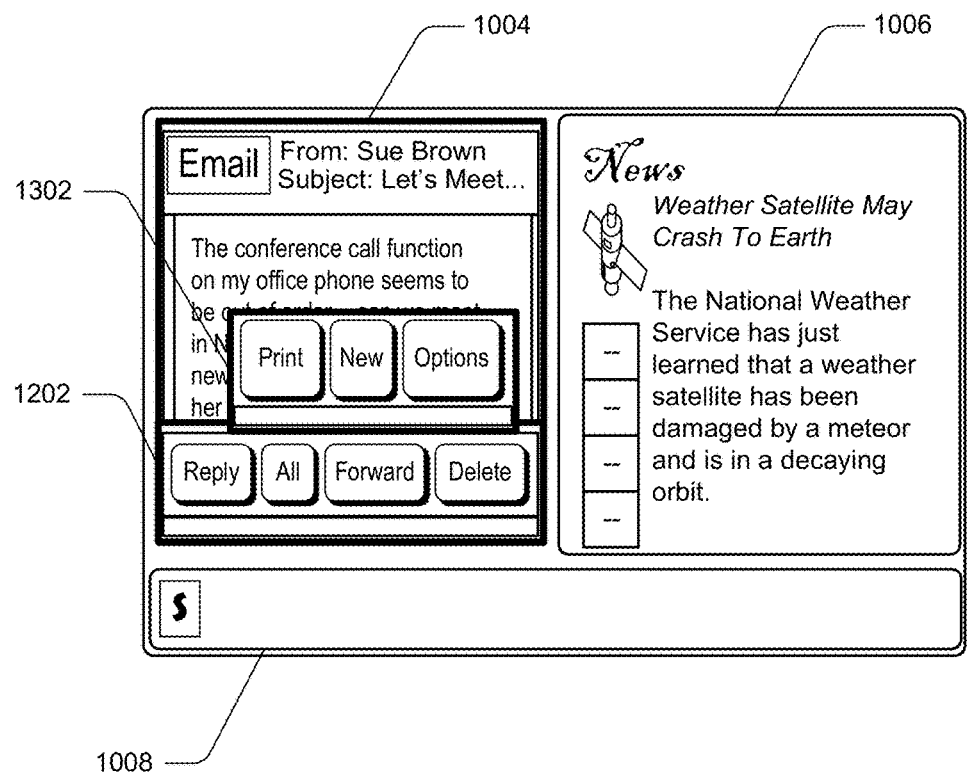
FIG. 13 illustrates the interfaces of FIG. 12 along with an additional-email-options interface presented in response to a gesture determined to have a successive point a preset distance from the edge.

Block 908, however, presents or causes presentation of a third user interface or expansion of the second user interface. Continuing the ongoing example, consider FIG. 13, which illustrates additional-email-options interface 1302 in response to gesture 1010 determined to have successive point 1106 a preset distance from edge 1104, in this case being within interface-addition region 1118 of FIG. 11. This region and preset distance can be set based on a size of the user interface previously presented in response to the gesture. Thus, a user wishing to add additional controls may simply extend the gesture past the user interface presented in response to an earlier portion of the gesture.

Method 900 can be repeated to add additional user interfaces or expand a presented user interface. Returning to the example interface 702 of FIG. 7, for example, gesture handler 128 can continue to add interfaces or controls to interface 702 as gesture 308 extends past interface 702, such as by presenting an additional set of selectable application tiles. If gesture 308 extends past the additional tiles, gesture handler 128 may cause system-interface module 124 to present another interface adjacent the tiles to enable the user to select controls, such as to suspend, hibernate, switch modes (immersive to windows-based and the reverse), or shut down computing device 102.

While the above example user interfaces presented in response to an edge gesture are opaque, they may also be partially transparent. This can be useful by not obscuring content. In the movie example described above, a user interface presented can be partially transparent thereby permitting the movie to be only partially obscured during use of the user interface. Similarly, in the example of FIGS. 12 and 13, interfaces 1202 and 1302 may be partially transparent, thereby enabling a user to see the text of the email while also selecting a control in one of the interfaces.

As noted above, example methods 200, 800, and 900 address edge gestures and are described prior to methods 1400 and 1700, which address switching back to a previously-interacted-with application. Any one or more of the method may be used separately or in combination with, in whole or in part, others of the methods.

Figure 14:
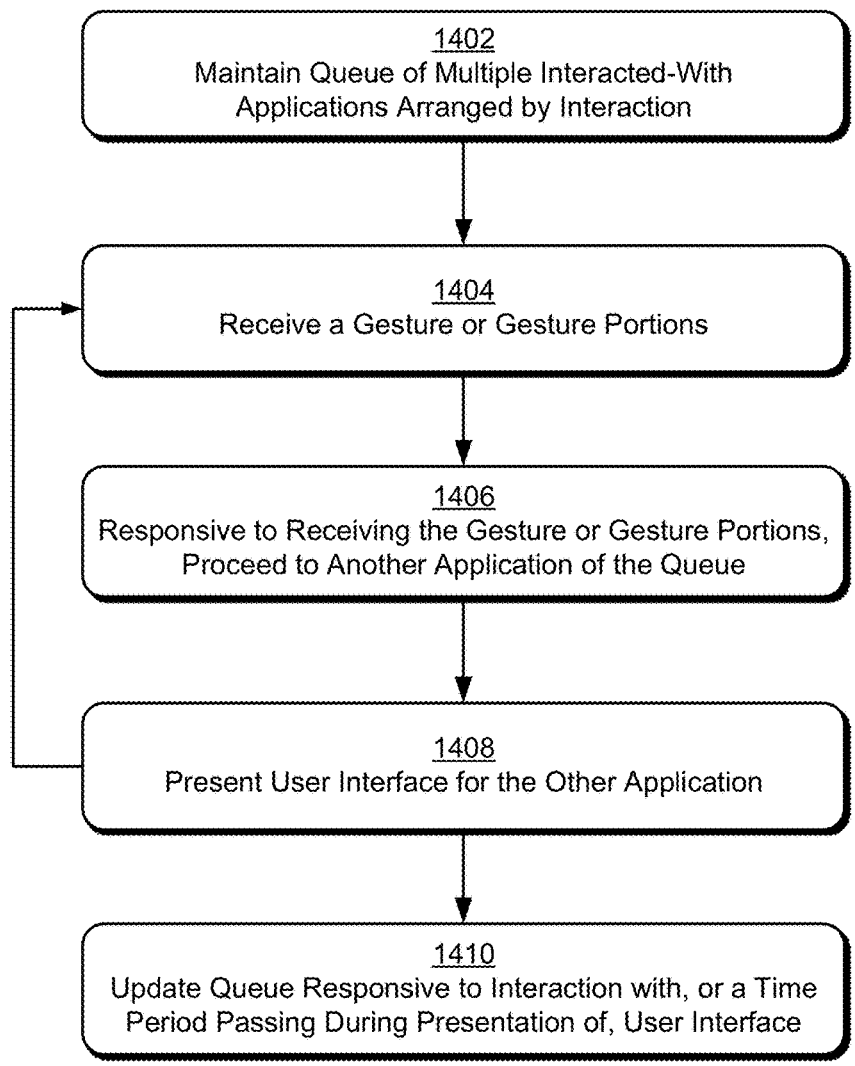
FIG. 14 illustrates a method for switching back to a previously-interacted-with application using a queue.

FIG. 14 depicts a method 1400 for switching back to a previously-interacted-with application using a queue. In portions of the following discussion reference may be made to system 100 of FIG. 1, methods 200, 800, and/or 900, and example embodiments described above, reference to which is made for example only.

Block 1402 maintains a queue of multiple interacted-with applications, the queue arranged by most-recently-interacted-with to least-recently-interacted-with applications other than a current application. Consider, for example, FIG. 15, which illustrates an interaction order 1502 in which a user interacts with various applications. First, the user interacts with a web-searching application 1504 through its interface. Second, the user interacts with a web-enabled media application 1506 through a web browser. Third, the user interacts with a local (non-web) photo application 1508 through its interface. Fourth, the user interacts with a social-networking application 1510 through the web browser. Fifth, the user returns to interacting with the web-enabled media application 1506. Sixth, the user interacts with a web-enabled news application 1512 again through the web browser.

For the first interaction no queue is maintained as no other applications have been interacted with prior to this first interaction. For the second through sixth interactions of interaction order 1502, consider queues 1514, 1516, 1518, 1520, and 1522, which correspond to each interaction in interaction order 1502 after the first interaction, respectively. Queues 1514 to 1522 are example iterations of application queue 132 maintained by application manager 130, both of FIG. 1.

Figure 15:
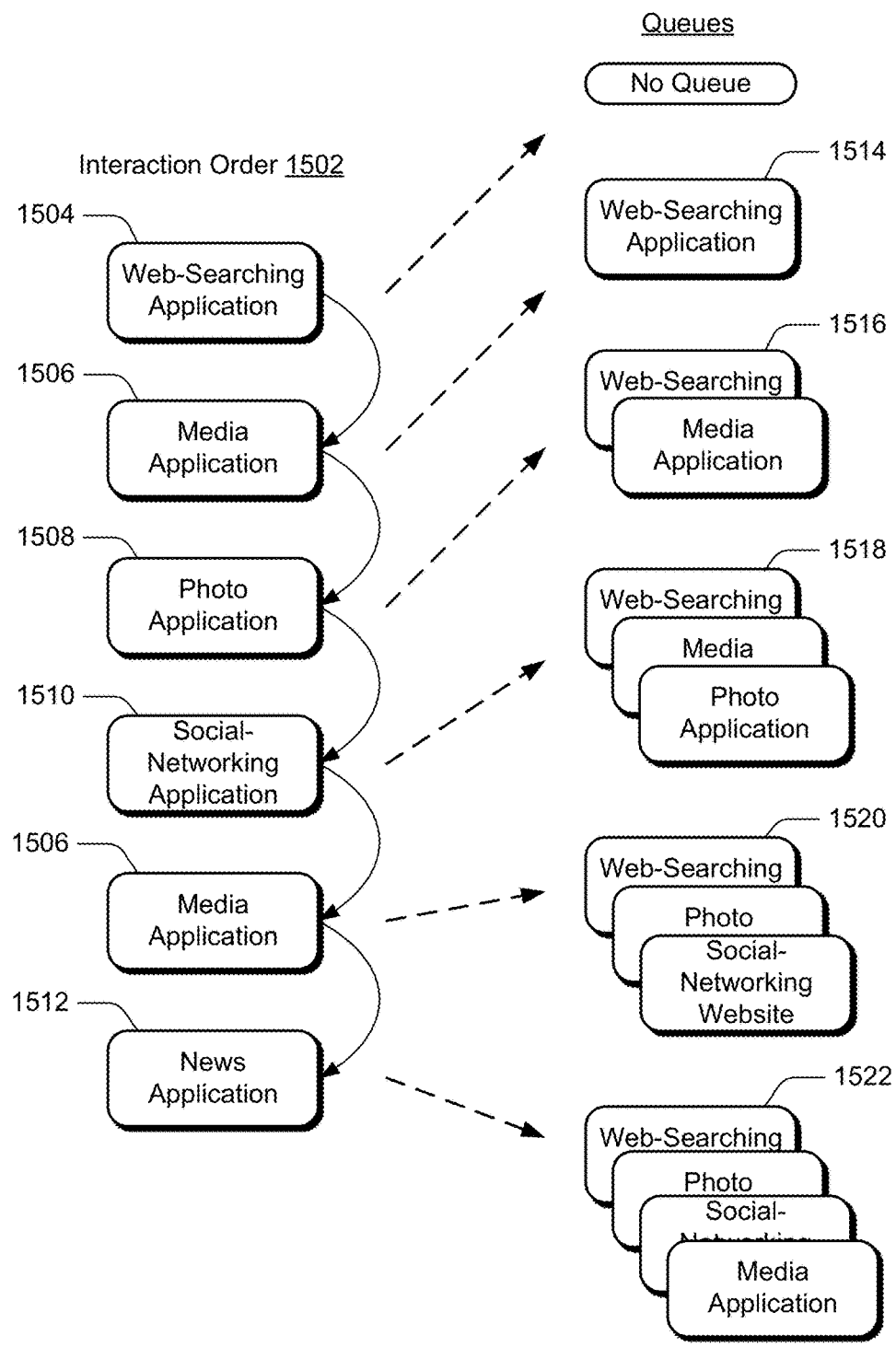
FIG. 15 illustrates an example interaction order in which a user interacts with various applications.

As shown in FIG. 15, application manager 130 keeps application queue 132 up-do-date based on a user's interactions. Queue 1522, for example, includes media application 1506 as the most-recently-interacted application, followed by social-networking application 1510, photo application 1508, and ending with web-searching application 1504. As the user interacts with media application 1506 twice (at the second and fifth interaction) application manager 130 removes it from application queue 130 at the fifth interaction and reorders the other applications to reflect an up-to-date order of interactions but excluding currently-interacted-with applications.

Block 1404 receives a gesture or gesture portions. This gesture or gesture portions can include one or more of the various gestures or portions described elsewhere herein, such as a pointer tracking a movement received through a touch pad, mouse, or roller ball or a physical movement made with arm(s), finger(s), or a stylus received through a motion-sensitive or touch-sensitive mechanism. In some embodiments, gesture portions are received, each portion being part of one gesture and each resulting in presentation of an application in the queue. Each of these portions may have, but are not required to have, a start point at an edge of a display, a later point not at the edge of the display, and a successive point at the edge of the display. A gesture having multiple portions in this case would look something like a multi-loop spiral, multiple circles, or a back-and-forth (e.g., zigzag) where each loop, circle, or back-and-forth starts, leaves, and returns to an edge of a user interface or display. Optionally, block 1404 may receive a number of gestures or gesture portions. These gestures or gesture portions can include one or more of the various gestures or gestures portions described elsewhere herein.

Continuing the ongoing embodiment, consider again FIG. 3, which illustrates tablet computing device 106 having touch-sensitive display 302 shown displaying immersive interface 304 including webpage 306. For this example, assume that immersive interface 304 is associated with news application 1512 and that webpage 306 is content from news application 1512.

As part of this example, at block 1404, gesture handler 128 receives gesture 308 as shown in FIG. 3, which gesture handler 128 passes to application manager 130. For the ongoing example, assume that gesture 308 is determined to be associated with switching back to a previously-interacted-with application rather than some other function or application.

Block 1406, responsive to receiving the gesture or gesture portions, proceeds through the queue to another application of the multiple interacted-with applications. Thus, on receiving the gesture or gesture portion(s), application manager 130 may proceed to the first, and thus the most-recently-interacted-with of the applications of application queue 132. In some embodiments, on receiving two gestures or portions, application manager 130 may proceed to the second most-recently-interacted-with application of application queue 132, though method 1400 may do so by repeating blocks 1404, 1406 and/or 1408, and so forth as described below.

Continuing the ongoing embodiment, assume that gesture 308 is received after the sixth interaction at which time the currently-interacted-with application is news application 1512 and that application queue 132 is up-to-date and represented by queue 1522 of FIG. 15. In such a case, application manager 130 proceeds to media application 1506 on receiving the gesture or gesture portion.

Block 1408 presents a user interface associated with the other application. This user interface, in some embodiments, is the same user interface through which interaction with the application was previously made. In some embodiments, the user interface is presented as a thumbnail or transparent overlay above the currently presented user interface. Application manager 130 presents this user interface alone or in combination with the associated application, such as by causing the associated application to present the user interface with which the user last interacted.

For this example, application manager 130 presents a thumbnail image of the user interface for the application progressively as gesture 308 is received and then expands the thumbnail to encompass the available real estate of the display when the gesture ends. Application manager 130 thereby replaces webpage 306 in immersive interface 304 or replaces immersive interface 304 with another interface, which can be immersive or windows-based.

Figure 16:
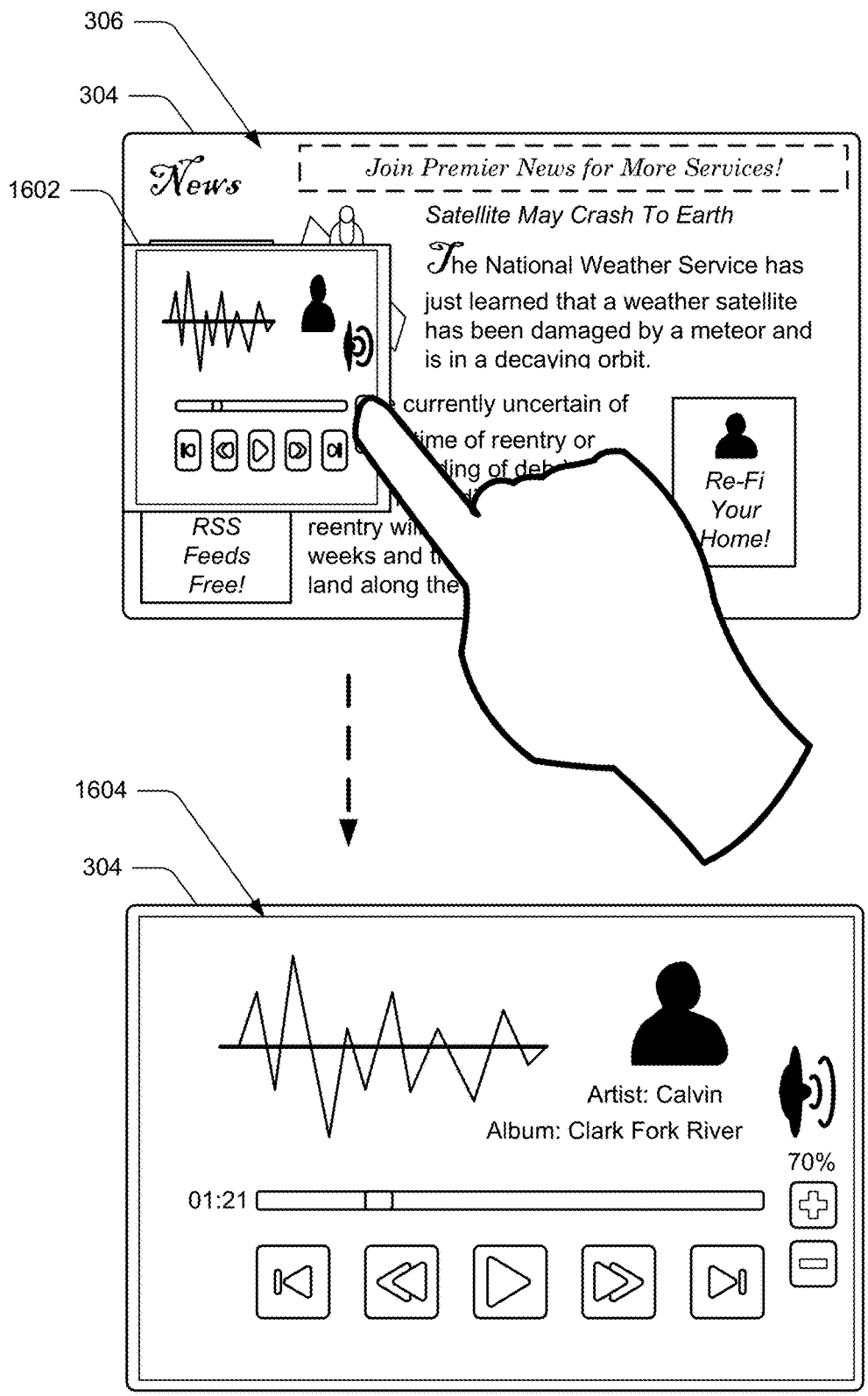
FIG. 16 illustrates the immersive interface of FIG. 3 along with a thumbnail image of a user interface of a prior application.

This is illustrated in FIG. 16 with thumbnail image 1602 of a user interface of media application 1506 presented over immersive interface 304 and webpage 306 of news application 1510. After gesture 308 ends, thumbnail image 1602 expands into full image 1604, replacing webpage 306 in immersive interface 304. Note that application manager 130 may keep the thumbnail image of the user interface "live." In effect, the thumbnail image may simply be a smaller version of the user interface; a video clip playing on the user interface may still be playing on the thumbnail image of the user interface, and even during movement of that thumbnail image.

This is but one example manner for presenting the user interface for the selected application, others manners for responding progressively or otherwise are described elsewhere herein.

In some embodiments, block 1408 shrinks the current user interface to a second thumbnail image and passes the second thumbnail image toward a region of a display from which the first-mentioned thumbnail image is progressively presented. Thus, block 1408 expands thumbnail image 1602 into full image 1604 while shrinking webpage 306 to a thumbnail image and passing that thumbnail to the edge from which thumbnail image 1602 was selected.

During the presentation of the user interface at block 1408, another gesture or gesture portion may be received, returning to block 1404. In some cases, the other gesture or gesture portion is received within an amount of time while the user interface is presented by block 1408. Following the return to block 1404, block 1406 may then proceed to yet another or subsequent application of the multiple interacted-with applications. Continuing this progression, block 1408 then presents a user interface associated with the subsequent application of the multiple interacted-with applications.

Thus, by repeating blocks 1404, 1406, and 1408 user interfaces associated with previously interacted-with applications can be successively presented. In some cases, a user interface associated with a previously-interacted with application can be presented responsive to each gesture received. In the context of the present example, when another gesture is received while presenting the user interface of media application 1506, a user interface associated with social-networking application 1510 (the second most-recently interacted with application of queue 1522) is presented. Receiving yet another gesture or gesture portion during the presentation of the user interface associated with social-networking application 1510 results in a presentation of a user interface associated with photo application 1508 (the third most-recently interacted with application of queue 1522) and so forth.

Following this switch from presenting a current application to a presenting another selected, prior application, block 1410 updates the queue responsive to interaction with, or a time period passing during presentation of, the user interface associated with the other application. In some cases a prior application may be selected and then another quickly selected after it, effectively a scanning through of the applications in the queue. In such cases, block 1410 may forgo updating the queue, as a quick viewing may not be considered an interaction.

Example interactions with which application manager 130 updates application queue 132 include an explicit selection to interact with the newly presented interface, such as to control playback or edit information relating to currently playing media using controls shown in the user interface of media player 1604 of FIG. 16. In other cases an interaction is determined based on a time period passing. Assume, for example, that the news application's webpage is presented on selection rather than being the current application. After some period, such as one, two, or three seconds, for example, application manager 130 determines that the delay is effectively an interaction based on a likelihood that the user is reading the news article in the webpage. Similarly, presentation of a user interface for a media application at block 1408 that is playing media and remains on the display without another selection of applications in application queue 132 can also be considered an interaction.

As noted in part above, application queue 132 can be circular. In so doing, selection of applications is not stopped but rather rolls if a user reaches a least-recently-interacted with application of application queue 132. For example, on selecting to switch back to a prior application from social-networking application 1510 and thus using queue 1518, switching back once results in selecting photo application 1508, twice results in media application 1506, and three times to web-searching application 1504. A fourth selection to switch back returns, in a circular fashion, to again result in presenting photo application 1508.

Method 1400 describes various ways in which the techniques can enable selection of previously-interacted-with applications and determine which to present based on a queue. Method 1700 may operate in conjunction with method 1400 and other methods described herein, though using a queue is not required. Therefore, method 1400 is not intended to limit the techniques as described in example method 1700.

Figure 17:
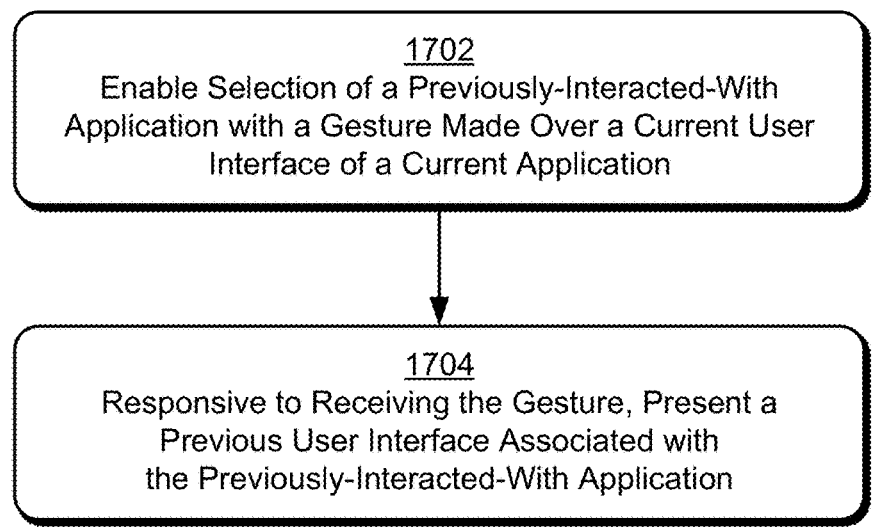
FIG. 17 illustrates a method for switching back to a previously-interacted-with application, which may or may not use a queue.

FIG. 17 depicts a method 1700 for switching back to a previously-interacted-with application, which may or may not use a queue. In portions of the following discussion reference may be made to system 100 of FIG. 1, methods 200, 800, 900, 1400, and example embodiments described above, reference to which is made for example only.

Block 1702 enables selection of a previously-interacted-with application through a gesture made over a current user interface associated with a current application. Block 1702 may do so in various manners described above, such as with an edge gesture or portion thereof, as but one example.

Block 1704, responsive to receiving the gesture and without further selection, presents a previous user interface associated with the previously-interacted-with application.

Assume, for example, that a portion of a gesture is received associated with selection of a prior application, such as an edge gesture starting at an edge of the current user interface and proceeding approximately perpendicularly away from the edge. In response, block 1704 presents the user interface for the previously-interacted-with application or a thumbnail image of the interface, or some indicator that selection has successfully been made along with an indicator of the application or the interface selected.

Example thumbnail images or indicators include any of selectable application tiles 704, 706, 708, and 710 of FIG. 7 some of which include a thumbnail image of an interface while others indicate the application selected. Another example is thumbnail image 1602 of FIG. 16.

Block 1704 presents the user interface of the selected, previously-interacted-with application, as shown in FIG. 16 at full image 1604. In so doing, block 1704 may enable interaction with photo application 1508 through immersive interface 304 without further selection. Thus, a user after selecting, with as little as one gesture, a prior application may interact without needing to make another selection. The user need not select to exit an application-selection mode, for example, or make the presented interface "live" or primary or on top of the stack. Simply put, the techniques enable selection of a prior application and further interaction with that prior application with a single input.

In this example of FIG. 16, immediately after full image 1604 is presented and replaces webpage 306, a next input to immersive interface 304 is passed immediately to photo application 1508. Thus, a tap, hot key, or other input is passed directly to photo application 1508, thereby enabling an immediate response by photo application 1508 to the input.

In some embodiments, the gesture made over the current user interface includes portions, each of which indicates a selection of a prior application. In such a case, block 1704 presents the previous user interface in response to the first portion and then, responsive to block 1702 receiving the second portion of the gesture, presents a further-previous user interface associated with a further previously-interacted-with application, and so forth.

Figure 18:
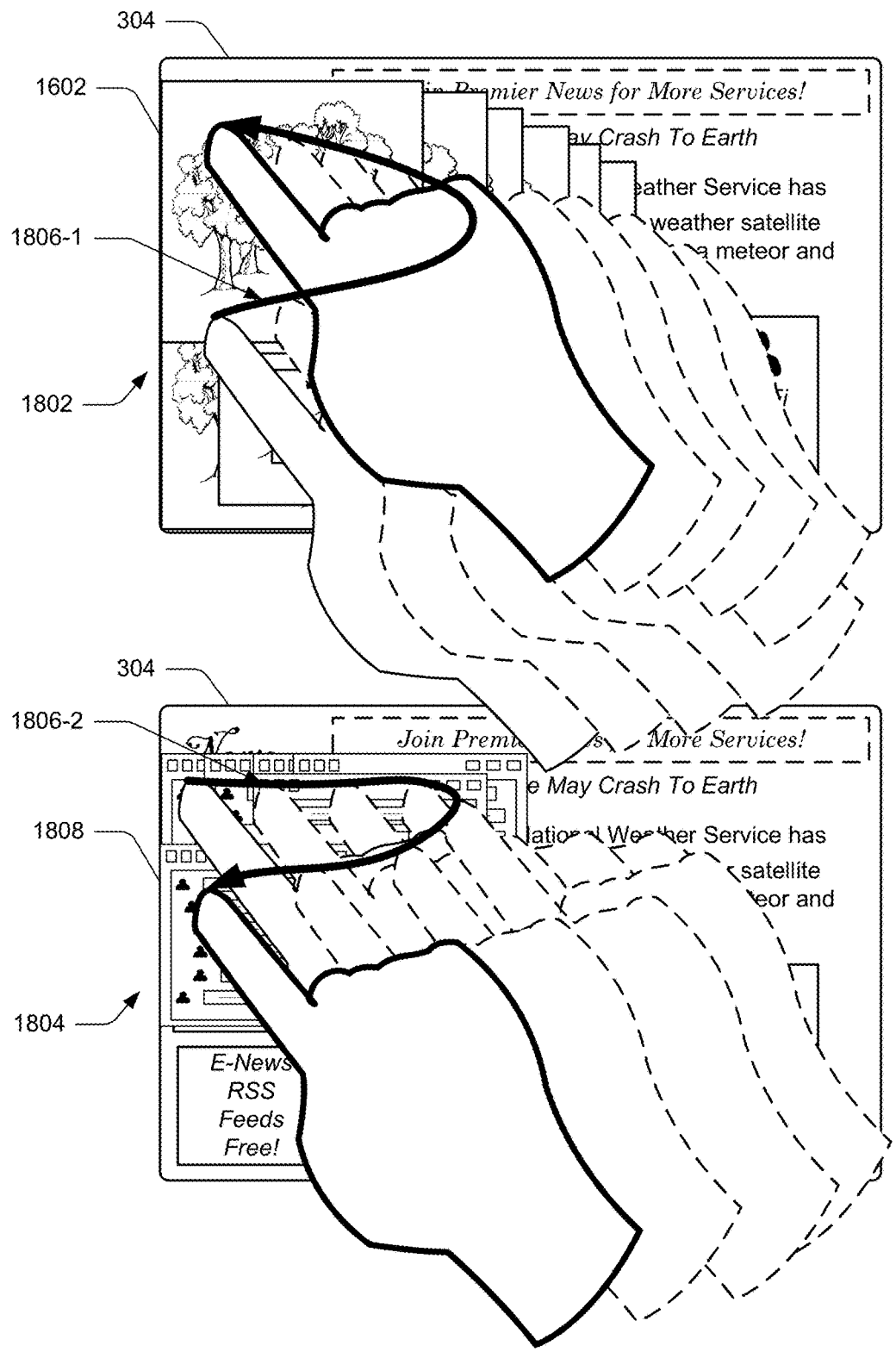
FIG. 18 illustrates the immersive interface of FIGS. 3 and 16, two progressive presentations, and two gesture portions.

This is illustrated in FIG. 18, which presents immersive interface 304 of FIG. 16 (shown twice for visual clarity), and ways in which block 1704 can respond to multiple gestures or portions of a single gesture. FIG. 18 illustrates two progressive presentations, 1802 and 1804, and gesture 1806 having two gesture portions 1806-1 and 1806-2, respectively. First progressive presentation 1802 illustrates a drag from a left edge of immersive interface 304 of thumbnail image 1602, and thus selection of the previously-interacted with photo application 1508. Note that thumbnail image 1602 "sticks" to gesture portion 1806-1. Note also that gesture 1806, unlike gesture 308 of FIGS. 3 and 16, returns to the left edge. In response, rather than gesture 308 ending and full image 1604 replacing webpage 306, gesture portion 1806-1 of gesture 1806 returns to the edge at which it began. In this case thumbnail image 1602 is progressively displayed with gesture portion 1806-1 but then disappears when gesture portion 1806-1 returns to the edge.

Gesture 1806 continues with second portion 1806-2. In response, block 1704 presents second progressive presentation 1804, illustrating a second drag from the left edge of immersive interface 304. Here a social network thumbnail image 1808 of a further prior application, social-networking application 1510, is progressively presented. Gesture 1806 returns to the left edge as part of second portion 1806-2. In response, block 1704 drops off thumbnail image 1808 when gesture portion 1806-2 returns to the edge. This is but one example of ways in which the techniques enable users to select and view prior applications, even all of the previously-interacted-with applications, with only a single gesture. At any point in this example, gesture 1806 may end or indicate selection to present the full user interface for the selected application, at which time block 1704 presents the user interface (e.g., full image 1604 of FIG. 16 or a full user interface for the social-networking application).

As noted above, example methods 200, 800, and 900 address edge gestures and are described prior to methods 1400 and 1700, which address switching back to a previously-interacted-with application, which are in turn described prior to methods 1900 and 2200. Any one or more of the method may be used separately or in combination with, in whole or in part, others of the methods.

Figure 19:
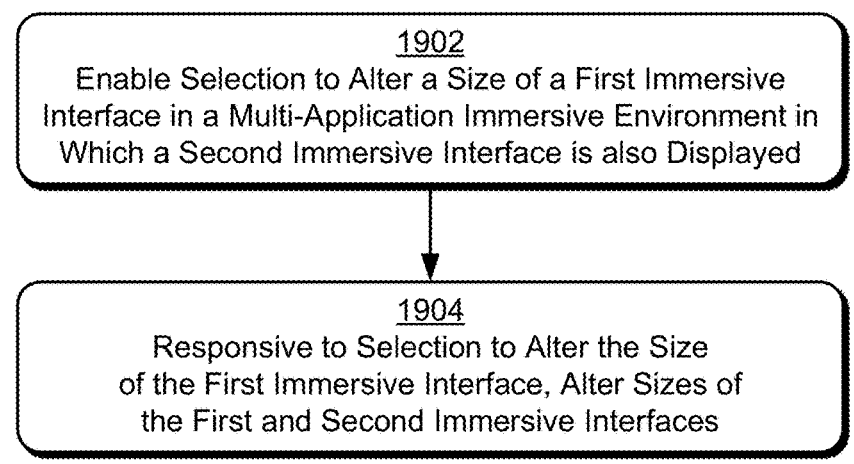
FIG. 19 illustrates a method for managing an immersive interface in a multi-application immersive environment, including altering sizes of multiple immersive interfaces responsive to a single selection.

FIG. 19 depicts a method 1900 for managing an immersive interface in a multi-application immersive environment, including altering sizes of multiple immersive interfaces responsive to a single selection. In portions of the following discussion reference may be made to system 100 of FIG. 1, methods 200, 800, 900, 1400, and 1700, and example embodiments described above, reference to which is made for example only.

Block 1902 enables selection to alter a first size of a first immersive interface of a first application displayed in a multi-application immersive environment in which a second immersive interface of a second application is displayed at a second size.

Block 1902 can enable this selection in various manners set forth above, such as with a gesture, whether made through a gesture-sensitive display or a track pad or mouse, or with a hardware button or hot keys, to name just a few.

Figure 20:
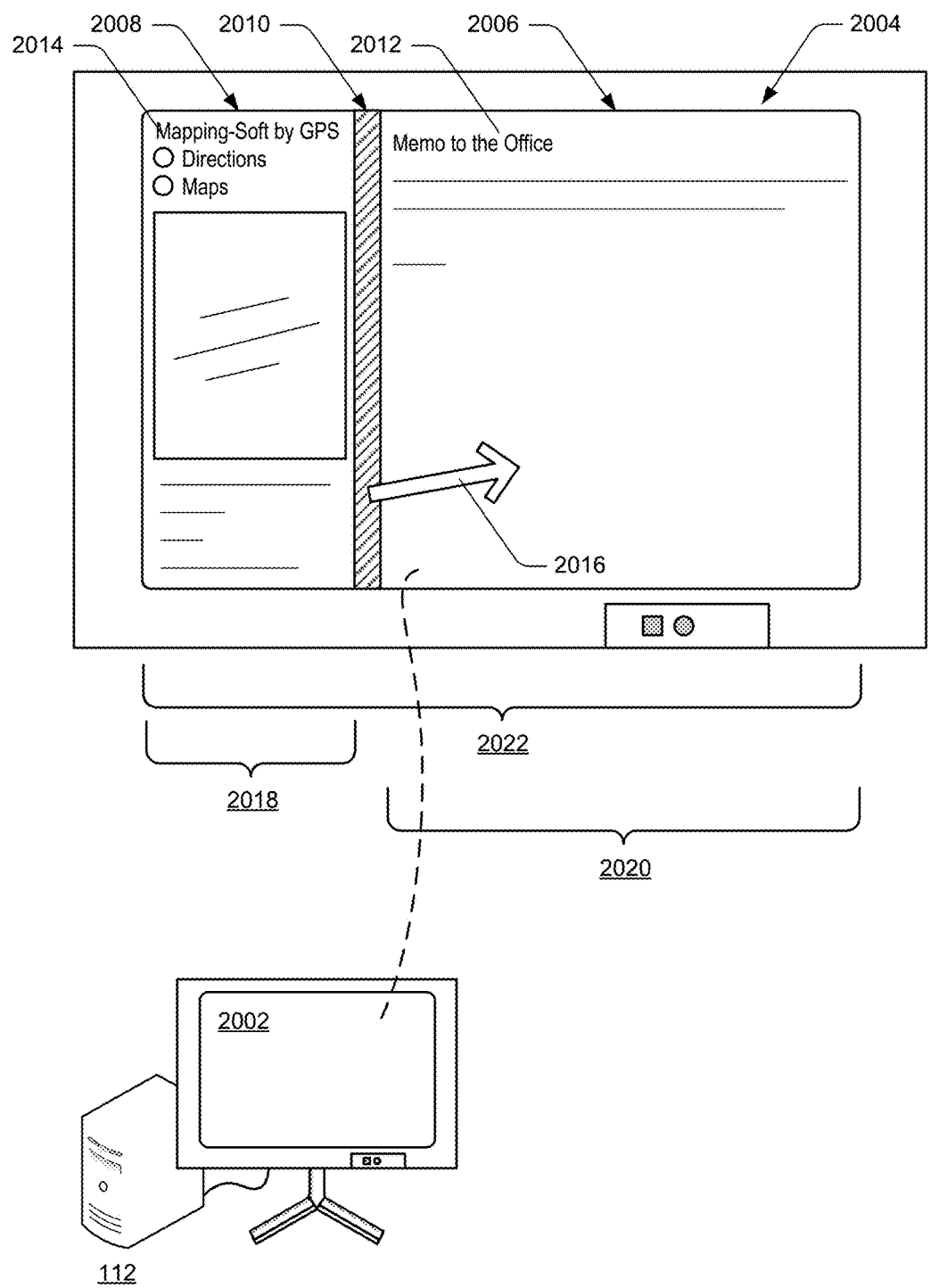
FIG. 20 illustrates the desktop computing device of FIG. 1 having a touch-sensitive display shown displaying a multi-application immersive environment with two immersive interfaces divided by an interface divider region.

Consider, by way of example, a case where block 1902 enables a select-and-move gesture selection through a gesture-sensitive display, the select-and-move gesture of an interface divider region between immersive interfaces of a multi-application immersive environment. This example is illustrated in FIG. 20, which illustrates a desktop computing device 112 having a touch-sensitive display 2002 shown displaying a multi-application immersive environment 2004. Multi-application immersive environment 2004 includes a larger immersive interface 2006 and a smaller immersive interface 2008 separated by an immersive interface divider 2010. Larger immersive interface 2006 is associated with a word-processing application and presents document content 2012. Smaller immersive interface 2008 is associated with a software mapping application and presents mapping content 2014. As part of an ongoing example, at block 1902 immersive manager 134 receives gesture 2016 as shown in FIG. 20, shown with an arrow but omitting an input actor (e.g., a finger or stylus).

Block 1904, responsive to selection to alter the first size of the first immersive interface, alters the first size of the first immersive interface and the second size of the second immersive interface. Block 1904, therefore, may alter sizes of multiple immersive interfaces responsive to as few as one selection. Further, block 1904 may do so concurrently and without occluding either of the interfaces. Further, in some embodiments, block 1904 notifies the application associated with the immersive interface about the change in size, thereby enabling the application to reflow the content.

Figure 21:
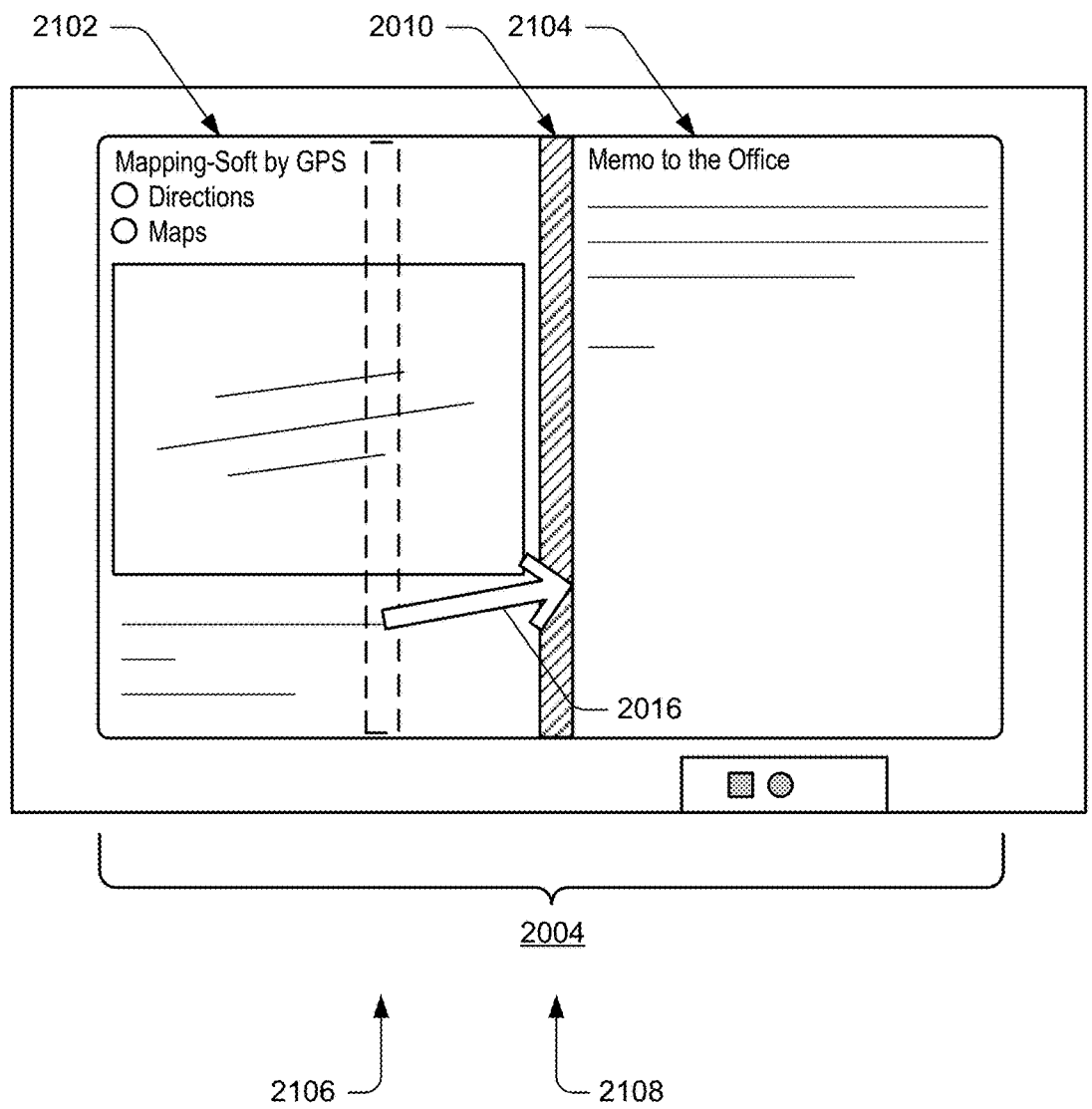
FIG. 21 illustrates the multi-application immersive environment of FIG. 20 with sizes of the two immersive interfaces altered and the interface divider region moved.

By way of example, consider the ongoing example of FIG. 20. Responsive to select-and-move gesture 2016 of interface divider region 2010, immersive manager 134 reduces one interface and increases the other concurrently, here increasing smaller immersive interface 2008 and decreasing, at the same time, larger immersive interface 2006. The result of this alteration is illustrated in FIG. 21 at altered smaller immersive interface 2102 and altered larger immersive interface 2104. The prior position of interface divider region 2010 is shown at prior position 2106. Note also that select-and-move gesture 2016 starts at prior position 2106 of interface divider region 2010 and ends at final position 2108 of interface divider region 2010. While not illustrated, a user may select to move the interface divider region to an edge of the multi-application immersive environment. In response, block 1904 removes the interface being reduced from the environment.

Note that in this example, multi-application immersive environment 2004 is fully occupied with the immersive interfaces, both prior to and after altering sizes of the immersive interfaces, without unused real estate or real estate occluded with controls for managing the immersive interfaces.

This particular example illustrates one way in which the techniques permit a user to select sizes of immersive interfaces, here to increase a map presented by the mapping application.

The techniques also permit users to "snap" immersive interfaces to automatically fill a predetermined region of multi-application immersive environment 2004. By so doing, gestures and other selections can be used that are fast and easy for users. Further, these regions can have a predetermined size across multiple devices, thereby permitting application developers to prepare for the region sizes. This is especially useful for smaller region sizes, as smaller sizes are often more challenging to present in a user-friendly manner. Consider again FIG. 20, for example, which illustrates a predetermined small-region width 2018 having a width of 320 pixels (though other widths may instead be used). In this example, three widths in which to present content are shown, width 2018, remainder width 2020, and a full width 2022 of multi-application immersive environment 2004. Note that remainder width 2020 can vary across displays, as can full width 2022.

Block 1902 may also enable selection through a drag-and-drop gesture of one of the immersive interfaces from one region to another region. In such a case block 1904 may switch the interfaces between the regions or automatically move a divider (e.g., immersive interface divider 2010 of FIG. 20) such that resulting sizes are switched. By so doing, immersive manager 134 automatically reduces larger immersive interface 2006 to fully occupy a region previously occupied by smaller immersive interface 2008 and vice-versa.

In some cases selection to alter a size of an interface is enabled through an edge gesture. Consider, for example, an edge gesture starting at an edge of larger immersive interface 2006 and having a later point not at the edge of larger immersive interface 2006. Immersive manager 134, alone or in conjunction with gesture handler 128 and/or application manager 130, shrinks larger immersive interface 2006 to a reduced size. Selection to resize interface 2006, then, can be performed by dropping the reduced-size image over smaller immersive interface 2008. In response, immersive manager 134 resizes both interfaces.

Method 1900 describes various ways for managing an immersive interface in a multi-application immersive environment, including altering sizes of multiple immersive interfaces responsive to a single selection. Method 2200 may operate in conjunction with method 1900 and other methods described herein, though using a queue is not required. Therefore, method 1900 is not intended to limit the techniques as described in example method 2200.

Figure 22:
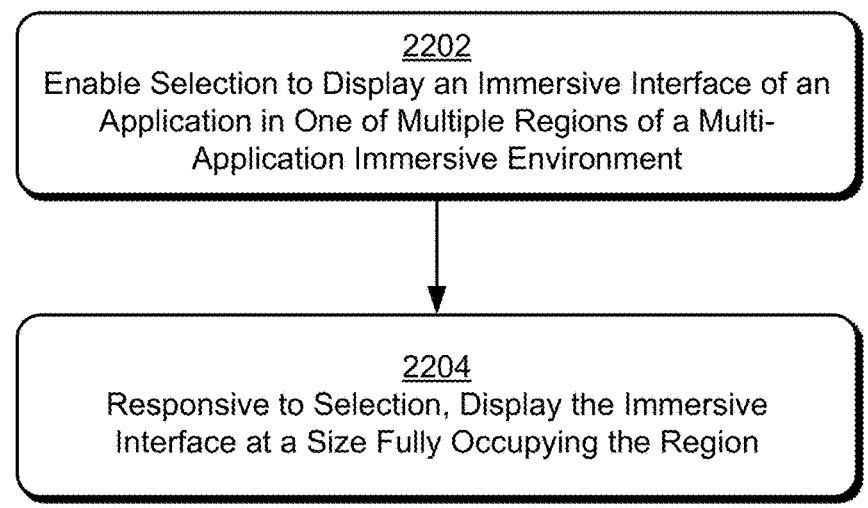
FIG. 22 illustrates a method for displaying an immersive interface of an application in a region responsive to as little as one selection and at a size fully occupying the region.

FIG. 22 depicts a method 2200 for displaying an immersive interface of an application in a region, including responsive to as little as one selection and at a size fully occupying the region. In portions of the following discussion reference may be made to system 100 of FIG. 1, methods 200, 800, 900, 1400, 1700, and 1900, and example embodiments described above, reference to which is made for example only.

Block 2202 enables selection to display an immersive interface of an application in one of multiple regions of a multi-application immersive environment displaying one or more current immersive interfaces of one or more current applications. Block 2202 may do so in various manners described above, such as with an edge gesture or portion thereof, as but one example. Further, the application selected can be a previously-interacted with application determined in various manners, such as by application manager 130 using application queue 132, both of FIG. 1.

The multi-application immersive interface can, at block 2202, present one, two, or even three current immersive interfaces. Thus, block 2202 permits selection of an application to place in regions currently occupied or that exist but are occupied by a larger immersive interface, such as in cases where one immersive interface fully occupies a multi-application immersive environment.

Figure 23:
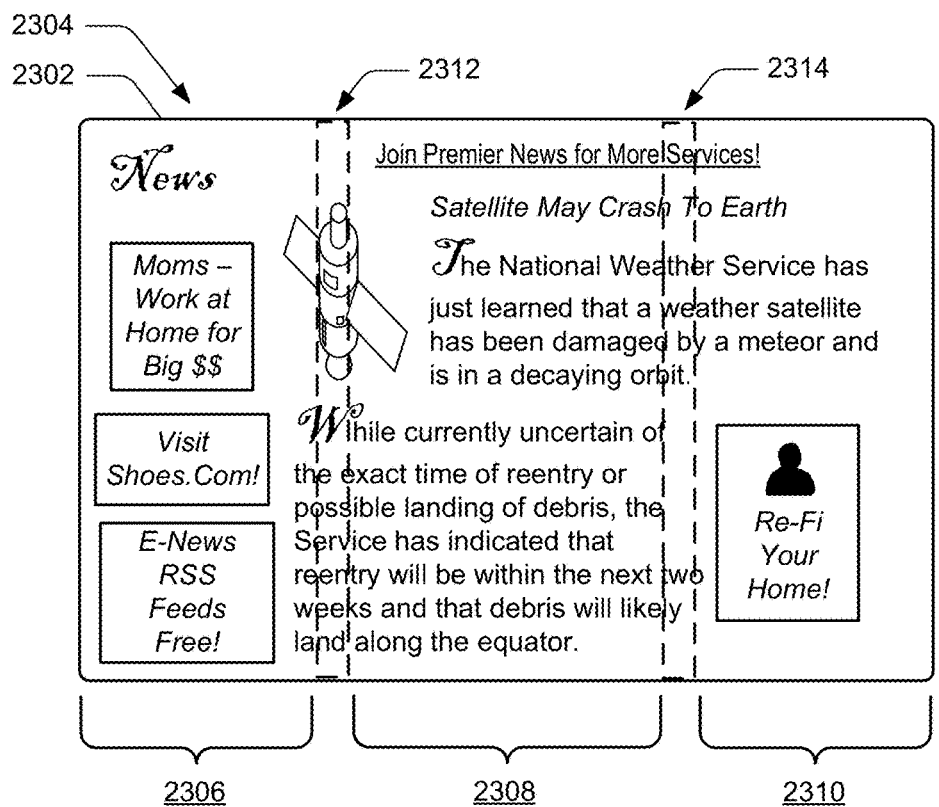
FIG. 23 illustrates a current immersive interface fully occupying a multi-application immersive environment having three regions.

By way of example, consider FIG. 23, which illustrates a current immersive interface 2302 fully occupying multi-application immersive environment 2304. Note here that there are three regions, 2306, 2308, and 2310. These regions may be indicated or not. In cases where an application has been selected and is hovered or moved over one of the regions, the region can be indicated. In one example this indication is made with partially transparent immersive interface dividers 2312 and 2314.

By way of example, assume that immersive manager 134 receives a previously-interacted-with application selected according to method 1700 and following the example illustrated in FIG. 18. In such as case, assume that thumbnail image 1808 for social-networking application 1510 is selected and hovered over region 2306 (not shown but similar to FIG. 18). In response, immersive manager 134 indicates that region 2306 is or is about to be selected and the size of region 2306 by displaying partially transparent immersive interface divider 2312. Alternatively, immersive manager 134 may indicate that region 2306 is or is about to be selected by showing region 2306 as empty, which may include reducing another interface to make room for region 2306.

By way of another example, assume that immersive manager 134 receives selection of a currently displayed immersive interface, such as with an edge gesture starting at a top edge of the currently displayed immersive interface. In response, method 2200 may reduce the size of the displayed immersive interface (e.g., to a thumbnail as noted above), which method 2200 may then permit the user to move progressively with the gesture. On completion of the gesture or a portion thereof, method 2200 may then move the displayed immersive interface and expand it to fully occupy the selected region.

Returning to method 2200, block 2204, responsive to the selection to display the immersive interface in the region, displays the immersive interface at a size fully occupying the region. Note that the user, with a little as the one selection of the application, can select and have presented an immersive interface at a size fully occupying a selected region.

Figure 24:
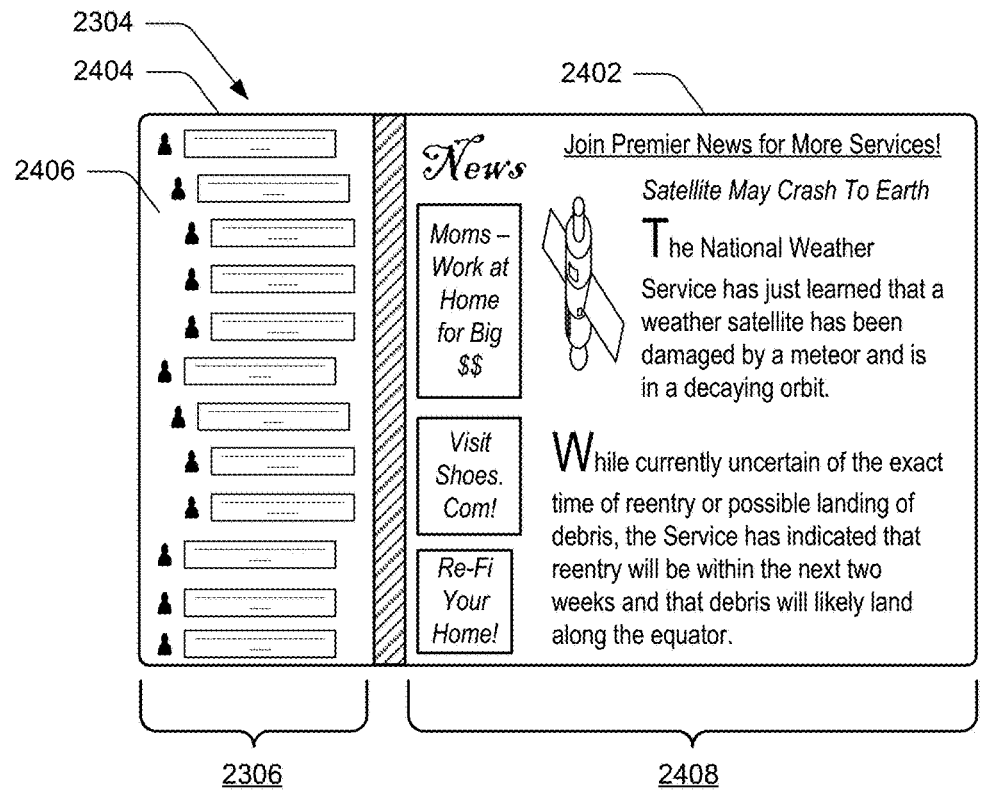
FIG. 24 illustrates the multi-application immersive environment of FIG. 23 with a reduced-size immersive interface instead of the current immersive interface of FIG. 23 and a second immersive interface.

Continuing the example, consider FIG. 24, which illustrates multi-application immersive environment 2304 but now with a reduced-size immersive interface 2402 instead of current immersive interface 2302 of FIG. 23, and with a second immersive interface 2404 showing a social-networking webpage 2406 for social-networking application 1510 of FIG. 15. Second immersive interface 2404 fully occupies region 2306 and without user selection other than selection of the region.

Note that the arrangement of content in reduced-size immersive interface 2402 and social-networking webpage 2406 are both changed. Size changes can be made more quickly or allow for better content arrangements applications and/or developers of those applications having these region sizes in advance, which are provided by the techniques as predetermined region widths. Here the predetermined region width provided is region 2306, though a fill-width region 2408 may also be provided.

Following block 2204, method 2200 may repeat blocks 2202 and 2204, thereby enabling selection of additional immersive interfaces. For example, immersive manager 134 can enable selection of a third immersive interface for presentation in region 2310 or 2308 of FIG. 23. In response to such a selection, immersive manager 134 reduces the size of, or replaces, reduced-size immersive interface 2402. Thus, immersive manager 134 may present two interfaces by replacing one of the two interfaces with a third, selected interface or shrink one or both of the two interfaces to present the third interface.

Note that any of these methods may be combined in whole or in part. Thus, a gesture portion, for example, may be used to select an immersive interface and another portion of the same gesture select to place and/or size the immersive interface. In response to this single gesture, the techniques can resize multiple interfaces currently presented in a multi-application immersive environment.

The preceding discussion describes some methods in which the techniques manage immersive interfaces in a multi-application immersive environment, some other methods that enable switching back to a previously-interacted-with application, and still other methods that describe ways in which the techniques enable and/or use edge gestures. These methods are shown as sets of blocks that specify operations performed but are not necessarily limited to the order shown for performing the operations by the respective blocks.

Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 25:
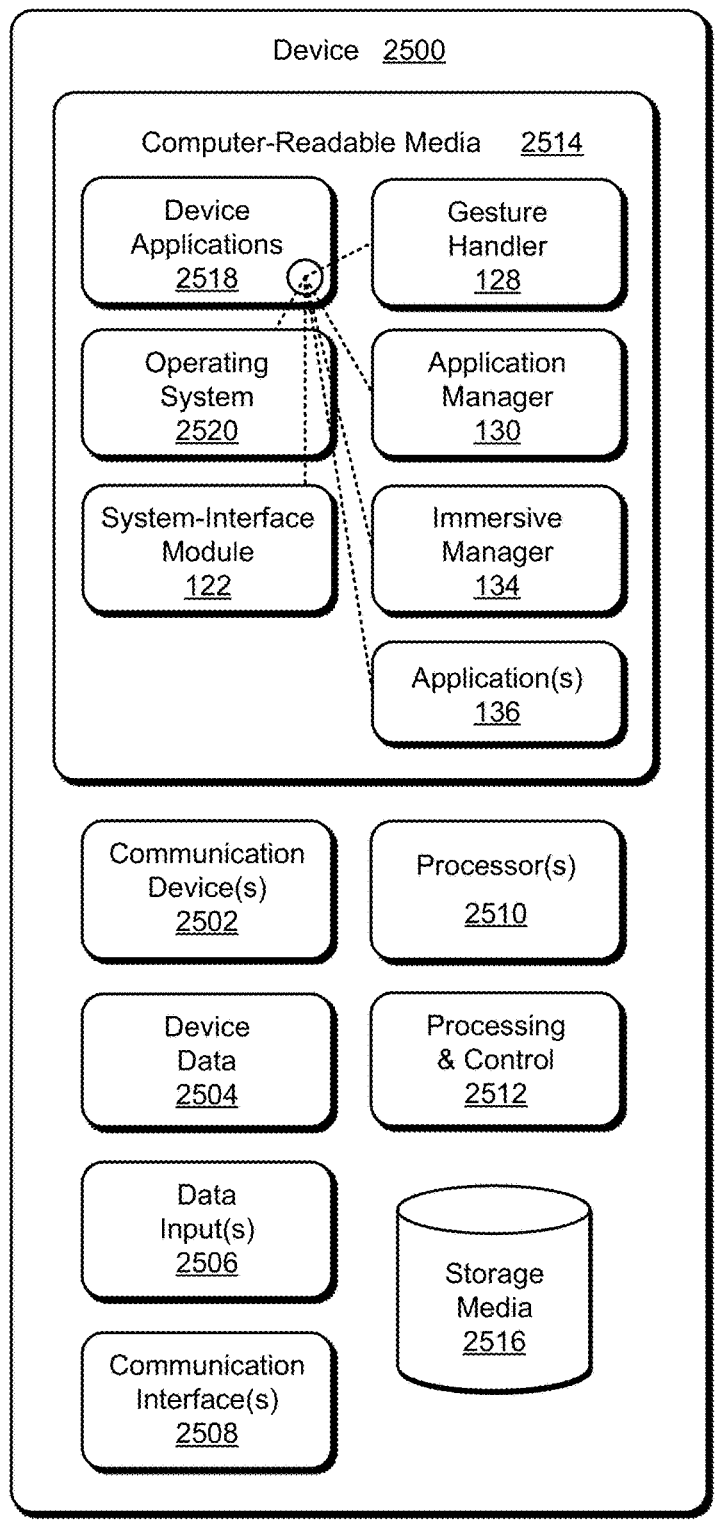
FIG. 25 illustrates an example device in which techniques for managing an immersive interface in a multi-application immersive environment can be implemented.

FIG. 25 illustrates various components of example device 2500 that can be implemented as any type of client, server, and/or computing device as described with reference to the previous FIGS. 1-24 to implement techniques enabling and using edge gestures, switching back to a previously-interacted with application, and/or managing an immersive interface in a multi-application immersive environment. In embodiments, device 2500 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 2500 may also be associated with a user (e.g., a person) and/or an entity that operates the device such that a device describes logical devices that include users, software, firmware, and/or a combination of devices.

Device 2500 includes communication devices 2502 that enable wired and/or wireless communication of device data 2504 (e.g., received data, data that is being received, data scheduled for broadcast, data packets of the data, etc.). The device data 2504 or other device content can include configuration settings of the device, media content stored on the device, and/or information associated with a user of the device. Media content stored on device 2500 can include any type of audio, video, and/or image data. Device 2500 includes one or more data inputs 2506 via which any type of data, media content, and/or inputs can be received, such as user-selectable inputs, messages, music, television media content, recorded video content, and any other type of audio, video, and/or image data received from any content and/or data source.

Device 2500 also includes communication interfaces 2508, which can be implemented as any one or more of a serial and/or parallel interface, a wireless interface, any type of network interface, a modem, and as any other type of communication interface. The communication interfaces 2508 provide a connection and/or communication links between device 2500 and a communication network by which other electronic, computing, and communication devices communicate data with device 2500.

Device 2500 includes one or more processors 2510 (e.g., any of microprocessors, controllers, and the like), which process various computer-executable instructions to control the operation of device 2500 and to enable techniques for managing an immersive interface in a multi-application immersive environment. Alternatively or in addition, device 2500 can be implemented with any one or combination of hardware, firmware, or fixed logic circuitry that is implemented in connection with processing and control circuits which are generally identified at 2512. Although not shown, device 2500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2500 also includes computer-readable storage media 2514, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2500 can also include a mass storage media device 2516.

Computer-readable storage media 2514 provides data storage mechanisms to store the device data 2504, as well as various device applications 2518 and any other types of information and/or data related to operational aspects of device 2500. For example, an operating system 2520 can be maintained as a computer application with the computer-readable storage media 2514 and executed on processors 2510. The device applications 2518 may include a device manager, such as any form of a control application, software application, signal-processing and control module, code that is native to a particular device, a hardware abstraction layer for a particular device, and so on.

The device applications 2518 also include any system components or modules to implement the techniques, such as device applications 2518 including system-interface module 122, gesture handler 128, application manager 130, immersive manager 134, and application(s) 136.

CONCLUSION

Although embodiments of techniques and apparatuses for managing an immersive interface in a multi-application immersive environment have been described in language specific to features and/or methods, it is to be understood that the subject of the appended claims is not necessarily limited to the specific features or methods described. Rather, the specific features and methods are disclosed as example implementations for managing an immersive interface in a multi-application immersive environment.

What is claimed is:

1. A computer-implemented method for a display environment implemented as a multi-application immersive environment, the method comprising:
   presenting a first immersive interface for executing a first application in a first interface region of the display environment, the first immersive interface presenting content in an arrangement corresponding to a size of the first interface region;
   receiving a selection of a second application for executing within a second immersive interface in a second interface region of the display environment, the second interface region having a size different than the size of the first interface region;
   presenting the second immersive interface in the second interface region of the display environment concurrently with the first immersive interface in the first interface region;
   receiving a drag-and-drop gesture to drag the first immersive interface into the second interface region; and
   based on receiving the drag-and-drop gesture:
      altering the size of the first interface region and the second interface region by adjusting a divider of the first interface region, based on the size of the second interface region;
      displaying the first immersive interface in the altered first interface region; and
      displaying the second immersive interface in the altered second interface region.

2. The computer-implemented method as described in claim 1, wherein the first immersive interface and the second immersive interface are concurrently displayed without occluding either of the first or the second immersive interfaces.

3. The computer-implemented method as described in claim 2,
   wherein the first interface region and the second interface region fill an entirety of the display environment.

4. The computer-implemented method as described in claim 1, wherein the application within the second immersive interface reflows content based on the resizing.

5. The computer-implemented method as described in claim 1, further comprising:
   presenting a third immersive interface in a third interface region concurrently with the first immersive interface and the second immersive interface; and
   wherein said altering the size of both the first immersive interface and the second immersive interface does not alter a size of the third immersive interface.

6. The computer-implemented method as described in claim 1, wherein altering the size of the first interface region reduces the size of the first interface region.

7. A computing device implementing a display environment as a multi-application immersive environment, the computing device comprising:
   a display device configured to present a first immersive interface for executing a first application in a first interface region of the display environment, the first immersive interface including content in an arrangement corresponding to a size of the first interface region;
   an immersive mode module configured to:
      receive a selection of a second application for executing within a second immersive interface in a second interface region of the display environment, the second interface region having a size different than the size of the first interface region;

present the second immersive interface in the second interface region of the display environment concurrently with the first immersive interface in the first interface region;

receive a drag-and-drop gesture to drag the first immersive interface into the second interface region; and based on receiving the drag-and-drop gesture:
alter the size of the first interface region by adjusting a divider between the first interface region and the second interface region, based on the size of the second interface region;
display the first immersive interface in the altered first interface region;
alter a size of the second interface region by adjusting the divider, based on the size of the first interface region; and
display the second immersive interface in the altered second interface region.

8. The computing device as described in claim 7, wherein the immersive mode module is configured to alter the size of both the first immersive interface and the second immersive interface concurrently and without occluding either of the first or the second immersive interfaces.

9. The computing device as described in claim 7, wherein the first interface region and the second interface region fill an entirety of the display environment.

10. The computing device as described in claim 7, wherein the first interface region has a predetermined region width that specifies a predetermined pixel width, and the first interface region has a variable length.

11. The computing device as described in claim 7, wherein the first interface region and the second interface region fully occupy a dimension of the display device on which the multi-application immersive environment is presented.

12. The computing device as described in claim 7, wherein:
the display device is configured to present a third immersive interface in a third interface region concurrently with the first immersive interface and the second immersive interface; and
the immersive mode module is configured to alter the size of both the first immersive interface and the second immersive interface without altering a size of the third immersive interface.

13. The computing device as described in claim 7, wherein altering the size of the first interface region increases the size of the first interface region.

14. A computer readable storage medium storing instructions that when executed by a processor cause the processor to perform a method for a display environment implemented as a multi-application immersive environment, the method comprising:

presenting a first immersive interface for executing a first application in a first interface region of the display environment, the first immersive interface presenting content in an arrangement corresponding to a size of the first interface region;

receiving a selection of a second application for executing within a second immersive interface in a second interface region of the display environment, the second interface region having a size different than the size of the first interface region and a divider between the first interface region and the second interface region;

presenting the second immersive interface in the second interface region of the display environment concurrently with the first immersive interface in the first interface region;

receiving a drag-and-drop gesture to drag the first immersive interface into the second interface region; and based on receiving the drag-and-drop gesture:
based on the sizes of the first interface region and the second interface region, altering the size of the first interface region and the second interface region by adjusting the divider;
displaying the first immersive interface in the altered first interface region; and
displaying the second immersive interface in the altered second interface region.

15. The computer-readable storage medium of claim 14, wherein altering the size of the first interface region reduces the size of the first interface region.

16. The computer-readable storage medium of claim 14, wherein altering the size of the first interface region increases the size of the first interface region.

17. The computer-readable storage medium of claim 14, wherein the first interface region and the second interface region fully occupy a dimension of the display environment.

18. The computer-readable storage medium of claim 14, wherein the first immersive interface and the second immersive interface are concurrently displayed without occluding either of the first or the second immersive interfaces.

19. The computer-readable storage medium of claim 14, wherein the application within the second immersive interface reflows content based on the resizing.

20. The computer-readable storage medium of claim 14, wherein the first interface region has a predetermined region width that specifies a predetermined pixel width, and the first interface region has a variable length.

* * * * *